United States Patent
Rosu et al.

(10) Patent No.: US 11,447,870 B2
(45) Date of Patent: Sep. 20, 2022

(54) METHOD FOR FORMING WATER REPELLENT, LONG-TERM DURABLE AND BIOMIMETIC COATINGS FROM METHYLTRIMETHOXYSILANE

(71) Applicant: Georgia Tech Research Corporation, Atlanta, GA (US)

(72) Inventors: Cornelia Rosu, Atlanta, GA (US); Laurens Victor Breedveld, Atlanta, GA (US); Dennis W. Hess, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/962,003

(22) PCT Filed: Jan. 16, 2019

(86) PCT No.: PCT/US2019/013815
§ 371 (c)(1),
(2) Date: Jul. 14, 2020

(87) PCT Pub. No.: WO2019/143698
PCT Pub. Date: Jul. 25, 2019

(65) Prior Publication Data
US 2021/0079528 A1    Mar. 18, 2021

Related U.S. Application Data

(60) Provisional application No. 62/617,673, filed on Jan. 16, 2018.

(51) Int. Cl.
C23C 18/00    (2006.01)
C23C 18/12    (2006.01)
(Continued)

(52) U.S. Cl.
CPC ........ *C23C 18/122* (2013.01); *C23C 18/1245* (2013.01); *D06M 13/503* (2013.01); *D06M 13/513* (2013.01); *D06M 2200/12* (2013.01)

(58) Field of Classification Search
CPC ............. C23C 18/122; C23C 18/1245; D06M 13/503; D06M 13/513; D06M 2200/12
See application file for complete search history.

(56) References Cited

U.S. PATENT DOCUMENTS

2001/0024719 A1    9/2001 Lewis
2008/0200432 A1    8/2008 Suzuki et al.
(Continued)

FOREIGN PATENT DOCUMENTS

| CN | 103290674 A | * | 9/2013 | |
| WO | WO-2016178560 A1 | * | 11/2016 | ......... C01B 33/1585 |
| WO | 2017029735 | | 2/2017 | |

OTHER PUBLICATIONS

International Search Report and Written Opinion from Application No. PCT/US2019/013815 dated May 10, 2019, (20 pages).

*Primary Examiner* — Nathan H Empie
(74) *Attorney, Agent, or Firm* — Troutman Pepper Hamilton Sanders LLP; Ryan A. Schneider

(57) ABSTRACT

Embodiments of the present disclosure relates generally to methods of providing biomimetic superhydrophobic coatings to substrates, and more specifically to providing biomimetic inorganic silica or silane-based coatings that enable tunable hierarchical surface structures with high coating-to-substrate adhesion, resistance to various mechanical abradents, durability, shelf stability, and enhanced non-wettability or water-repellency.

10 Claims, 53 Drawing Sheets

(51) Int. Cl.
*D06M 13/503* (2006.01)
*D06M 13/513* (2006.01)

(56) References Cited

U.S. PATENT DOCUMENTS

| | | | | |
|---|---|---|---|---|
| 2009/0011222 A1* | 1/2009 | Xiu | ............... | C23C 18/00 |
| | | | | 428/323 |
| 2010/0129750 A1* | 5/2010 | Briehn | ............ | C09C 3/12 |
| | | | | 430/108.24 |
| 2014/0238263 A1* | 8/2014 | Scheonfisch | ...... | C01B 33/142 |
| | | | | 106/2 |

* cited by examiner 101.0° ± 4.0°   119.0° ± 6.5°   97.4° ± 4.5°

ICA           PSCA            PICA

1:4:22, 120-2 immersed in water (air bubbles at the fabric surface)

101.0° ± 4.0°   119.0° ± 6.5°   97.4° ± 4.5°

ICA   PSCA   PICA

METHOD FOR FORMING WATER REPELLENT, LONG-TERM DURABLE AND BIOMIMETIC COATINGS FROM METHYLTRIMETHOXYSILANE

CROSS-REFERENCE TO RELATED APPLICATIONS

This application claims priority to U.S. Provisional Application No. 62/617,673, filed on 16 Jan. 2018, the disclosure of which is herein incorporated by reference in its entirety.

BACKGROUND OF THE DISCLOSURE

1. Field of the Disclosure

Embodiments of the present disclosure relates generally to methods of providing biomimetic superhydrophobic coatings to substrates, and more specifically to providing biomimetic inorganic silica or silane-based coatings that enable tunable hierarchical surface structures with high coating-to-substrate adhesion, resistance to various mechanical abradents, long-term durability, shelf stability, and enhanced non-wettability or water-repellency.

2. Background

Polymeric fabrics are an important component in manufacturing of many modern commercial products for both indoor and outdoor activities. [Rosu C, Lin H, Jiang L, Breedveld V, Hess D W, Sustainable and long-time 'rejuvenation' of biomimetic water-repellent silica coating on polyester fabrics induced by rough mechanical abrasion. J Colloid Interface Sci. 2018 Apr. 15; 516:202-214; Lin H, Rosu, C, Jiang L, Sundar V A, Breedveld V, Hess D W, Non-fluorinated superhydrophobic chemical coatings on polyester fabric prepared by kinetically-controlled hydrolyzed methyltrimethoxysilane, forthcoming.] Therefore, textile processing generally focuses on developing materials with specific properties, including fire retardancy, UV resistance, (super)hydrophobicity, (super)oleophobicity, (super)amphiophobicity, antimicrobial properties and self-cleaning abilities. Many challenging tasks in the textile industry are double-edged: engineering multifunctional fabrics and, most importantly, designing appropriate protocols that validate their performance and functionality. A key to achieve and control these features is the rational modification of surface chemistry and morphology through protective coatings. Superhydrophobicity is attributed to a combination of properly sized micro- and nanostructures and low-surface energy materials that are adsorbed or bound on a substrate.

The economical use of water-repellent coatings on polymeric materials in commercial and industrial applications is generally limited by their mechanical wear robustness and long-term durability. Inorganic, in particular silica-based coatings, have received increased interest in the fabric industry because of their economic potential and versatility when compared to popular organic coating processes largely using fluorine-based polymers which are possibly toxic. Silica has remarkable fire retardancy, UV resistance and antibacterial properties. While some silicates such as tetraethylorthosilicate (TEOS) have been used to modify substrates such as polyurethane, cotton, knitted cellulose, and polyester fabrics, other, more chemically preferable inorganic silicates such as for example and not limitation, methyltrimethoxysilane, (MTMS), have not been explored individually for the design of coatings to enhance textile moisture resistance, wearability and durability.

Additionally, improvements to methods of applying hydrophobic coatings are desirable. Many silane coatings require toxic solvents or complex, multi-step coating processes. A simple coating process in an aqueous environment under ambient conditions is favored and would be readily compatible with existing large-scale textile finish manufacturing processes. Non-fluorinated organosilanes offer an economic and viable alternative to fluorinated products in the development of water repellents and surface protection, such as for example and not limitation, MTMS, an organosilane with one methyl group and three hydrolyzable methoxy substituents. The coating process should enable tunable hydrophobicity via controlling the surface-coated silica morphologies, ranging from smooth thin film to hierarchical structures, by varying certain parameters of the coating process. Additionally, the coating mixture should be shelf-stable, meaning that the mixture comprising the inorganic silica or silane should be stable under ambient conditions for a period of about 10 days. When applied to a substrate, the coating should be durable over a long period of time.

What is needed, therefore, is biomimetic inorganic silica or silane-based coatings that provide enhanced moisture resistance, shelf stability, wearability and durability, and methods of applying such coatings. Such coatings also have biomimetic, tunable hierarchical surface structures with high coating-to-substrate adhesion. The coating methods should enable facile, consistent, repeatable, and easily scalable application of the coating to a wide variety of substrates. It is to such a process that embodiments of the present disclosure are directed.

BRIEF SUMMARY OF THE DISCLOSURE

As specified in the Background Section, there is a great need in the art to identify technologies for improved coatings and use this understanding to develop novel inorganic silica or silane-based coatings that provide enhanced moisture resistance, wearability and durability, and methods of applying such coatings. The present disclosure satisfies this and other needs.

Embodiments of the present disclosure relate generally to methods of providing biomimetic superhydrophobic coatings to substrates, and more specifically to providing biomimetic inorganic silica or silane-based coatings that enable tunable hierarchical surface structures with high coating-to-substrate adhesion, resistance to various mechanical abradents, and enhanced non-wettability or water-repellency.

In one aspect, the present disclosure provides a method of applying an inorganic silica- or silane-based coating to a substrate, comprising the steps of: mixing an inorganic silica or silane, a catalyst, and a dispersion medium in a ratio of from about 1:2:22 to about 1:30:25; wherein the inorganic silica or silane; adding a substrate to the mixture and submerging the substrate in the mixture for a soaking time to enable the mixture to coat the substrate; optionally removing excess mixture from the coated substrate; drying the coated substrate; and optionally annealing or curing the coated substrate.

In one aspect, the present disclosure provides an inorganic silica- or silane-based coating comprising: an inorganic silica or silane, a catalyst, and a dispersion medium in a ratio of from about 1:2:22 to about 1:30:25, wherein the inorganic silica or silane is hydrolyzed and condensed.

In one aspect, the present disclosure provides a method of forming an inorganic silica- or silane-based coating comprising the steps of: mixing an inorganic silica or silane, a catalyst, and a dispersion medium in a ratio of from about 1:2:22 to about 1:30:25 to form a reaction mixture; allowing the mixing to occur for a reaction time to enable hydrolysis and condensation of the inorganic silica or silane.

In one aspect, the present disclosure provides a coated substrate, comprising: a substrate, wherein at least a portion of the substrate is coated by a mixture, the mixture comprising an inorganic silica or silane, a catalyst, and a dispersion medium in a ratio of from about 1:2:22 to about 1:30:25, wherein the inorganic silica or silane is hydrolyzed and condensed.

In any of the foregoing, one or more of the steps of the method, ingredients of the mixture, and/or conditions of the method step(s) may be varied. It is understood and specifically contemplated that any one of the following embodiments describing such variations can be included in combination with one or more of any other such embodiments.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

DETAILED DESCRIPTION OF THE DISCLOSURE

Figure 1A:
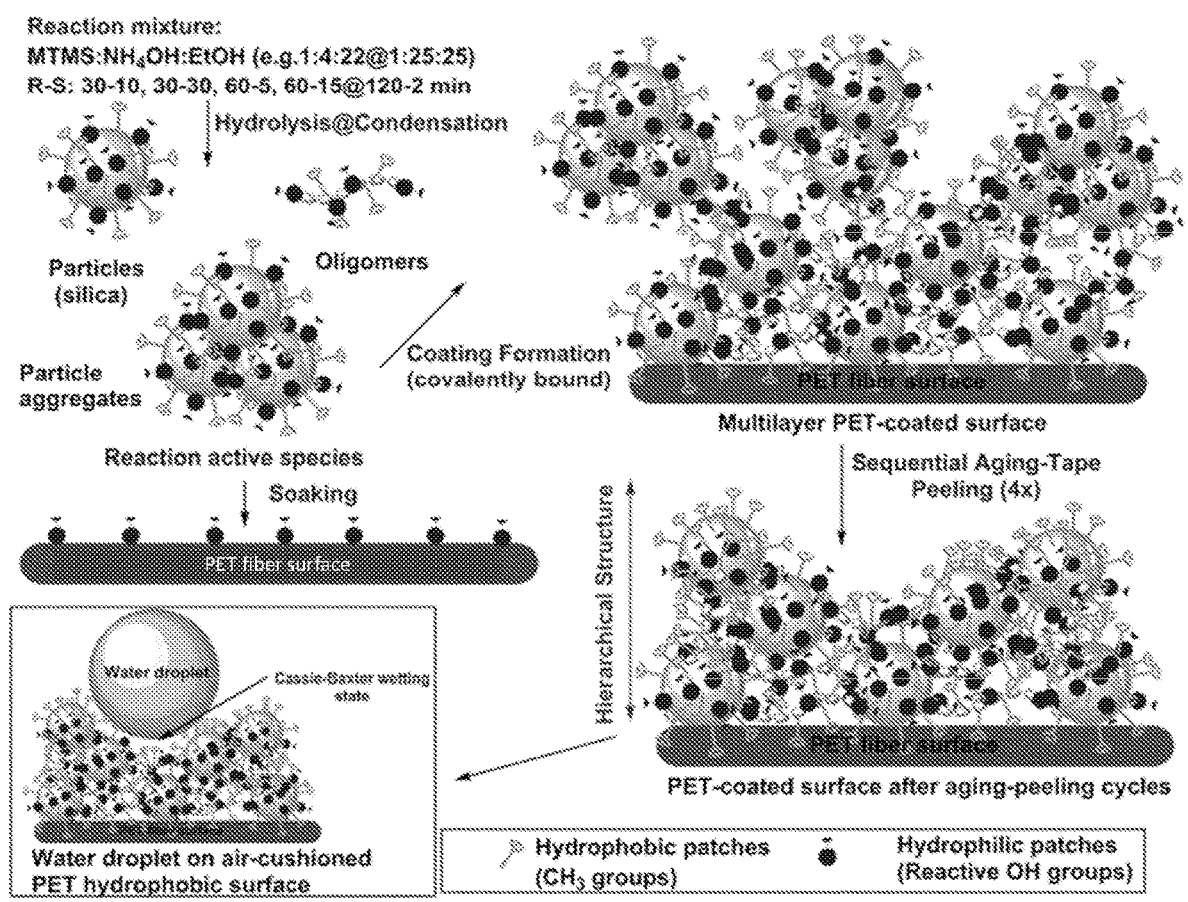
FIG. 1A-1B depict a process for coating a substrate according to the invention. (1A) Schematic illustration of steps involved in one method of processing of biomimetic MTMS-based coated PET fabric. (1B) Scanning electron microscope (SEM) images of 1:4:22 (120-2 min) (top panel) and 1:25:25 (120-2 min) (bottom panel) formulations. Top left insets show high magnification images of coated fibers. Bottom right insets display the appearance of water droplets (4 µL) used to measure SCA.

As specified in the Background Section, there is a great need in the art to identify technologies for improved coatings and use this understanding to develop novel inorganic silica or silane-based coatings that provide enhanced moisture resistance, wearability and durability, and methods of applying such coatings. The present disclosure satisfies this and other needs. Embodiments of the present disclosure relate generally to methods of providing biomimetic superhydrophobic coatings to substrates, and more specifically to providing biomimetic inorganic silica or silane-based coatings that enable tunable hierarchical surface structures with high coating-to-substrate adhesion, resistance to various mechanical abradants, and enhanced non-wettability or water-repellency.

To facilitate an understanding of the principles and features of the various embodiments of the disclosure, various illustrative embodiments are explained below. Although exemplary embodiments of the disclosure are explained in detail, it is to be understood that other embodiments are contemplated. Accordingly, it is not intended that the disclosure is limited in its scope to the details of construction and arrangement of components set forth in the following description or examples. The disclosure is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value. It should also be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented. The terms "first," "second," and the like, "primary," "secondary," and the like, do not denote any order, quantity, or importance, but rather are used to distinguish one element from another.

It is noted that terms like "specifically," "preferably," "typically," "generally," and "often" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean "about 50 mm."

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure, for example. Any dimensions listed in the various drawings are for illustrative purposes only and are not intended to be limiting. Other dimensions and proportions are contemplated and intended to be included within the scope of the disclosure.

Methods of the Disclosure

In one aspect, the present disclosure provides a method of applying an inorganic silica- or silane-based coating to a substrate, comprising the steps of:

mixing an inorganic silica or silane, a catalyst, and a dispersion medium in a ratio of from about 1:2:22 to about 1:30:25;

allowing the mixing to occur for a reaction time to enable hydrolysis and condensation of the inorganic silica or silane;

adding a substrate to the mixture and submerging the substrate in the mixture for a soaking time to enable the mixture to coat the substrate;

optionally removing excess mixture from the coated substrate;

drying the coated substrate; and optionally annealing or curing the coated substrate.

In any of the foregoing methods, one or more of the steps of the method, ingredients of the mixture, and/or conditions of the method step(s) may be varied. It is understood and specifically contemplated that any one of the following embodiments describing such variations can be included in combination with one or more of any other such embodiments.

In some embodiments, the ratio of inorganic silica or silane:catalyst:dispersion medium is varied. In some embodiments, the ratio ranges from 1:2:22 to 1:30:25. In certain embodiments, the ratio is selected from the group consisting of about 1:4:22, about 1:7:22, about 1:10:22, about 1:5:25, about 1:25:25, and about 1:30:25. In some embodiments, the ratio of inorganic silica or silane:dispersion medium is about 1:4.

In some embodiments, the inorganic silica or silane, catalyst, and dispersion medium are mixed in a single step. In some embodiments, the catalyst and dispersion medium are mixed in one solution and the inorganic silica or silane and dispersion medium are mixed in a second solution, and the two solutions are subsequently mixed together. In some embodiments, the catalyst and dispersion medium are mixed in one solution and the inorganic silica or silane and dispersion medium are mixed in a second solution in a ratio of about 1:4, and the two solutions are subsequently mixed together.

In some embodiments, the inorganic silica or silane is a non-fluorinated inorganic silica or silane. In certain embodiments, the inorganic silica or silane is MTMS. In some embodiments, the catalyst is used to provide a desired pH to the reaction mixture. In some embodiments, the catalyst comprises a base. In some embodiments, the catalyst comprises a hydroxide, such as for example and not limitation, ammonium hydroxide ($NH_4OH$), sodium hydroxide (NaOH), and potassium hydroxide (KOH). In some embodiments, the catalyst comprises a strong acid, such as for example and not limitation, hydrochloric acid (HCl). In some embodiments, the catalyst comprises a weak acid, such as for example and not limitation, a carboxylic acid (including but not limited to acetic acid ($CH_3COOH$)). In some embodiments, the dispersion medium comprises an alcohol. In certain embodiments, the dispersion medium comprises ethanol (EtOH) or methanol (MeOH).

In some embodiments, the reaction time is at most about 10 days (240 hours). In some embodiments, the reaction time is at least about 30 seconds. In some embodiments, the reaction time is from at least about 30 seconds to at most about 10 days (240 hours). In some embodiments, the reaction time is from about 5 minutes to about 6 days (144 hours). In some embodiments, the reaction time is from about 5 minutes to about 3 days (72 hours). In some embodiments, the reaction time is from about 5 minutes to about 1 day (24 hours). In some embodiments, the reaction time is about 5 minutes, about 15 minutes, about 30 minutes, about 45 minutes, about 60 minutes, about 90 minutes, about 120 minutes, about 240 minutes, about 12 hours, about 24 hours, about 48 hours, about 36 hours, about 72 hours, about 84 hours, about 96 hours, about 108 hours, about 120 hours, about 132 hours, about 144 hours, about 156 hours, about 168 hours, about 180 hours, about 192 hours, about 204 hours, about 216 hours, or about 228 hours.

In some embodiments, the mixture is stable in ambient conditions for at most about 10 days, at most about 9 days, at most about 8 days, at most about 7 days, at most about 6 days, at most about 5 days, at most about 4 days, at most about 3 days, at most about 2 days, or at most about 1 day. In some embodiments, the mixture is stable in ambient conditions for at least about 1 day to at most about 10 days.

In some embodiments, the soaking time is at most about 15 minutes. In some embodiments, the soaking time is at least about 30 seconds. In some embodiments, the soaking time is about 30 seconds to about 15 minutes. In some embodiments, the soaking time is about 2 minutes to about 10 minutes. In some embodiments, the soaking time is about 2 minutes, about 5 minutes, about 10 minutes, or about 15 minutes. In some embodiments, a shorter reaction time (e.g., about 5 minutes to about 60 minutes) followed by a longer soaking time (e.g., about 10 minutes to about 15 minutes) can increase hydrophobicity.

In some embodiments, excess coating mixture is optionally removed from the substrate. In other embodiments, excess coating mixture is not removed from the substrate. In some embodiments, the excess coating mixture is removed by dilution, such as for example and not limitation, by rinsing the substrate in a rinsing medium. In some embodiments, the rinsing medium comprises an alcohol, such as for example and not limitation, ethanol. In some embodiments, the rinsing medium comprises water. In other embodiments, the excess coating mixture is removed by gravity (e.g., by hanging the substrate and allowing the excess mixture to drip off the substrate). In some embodiments, the excess coating mixture is removed by physical and/or mechanical means (e.g., by squeezing, twisting, and/or compressing the substrate).

In some embodiments comprising a rinsing step, the rinsing time is at most about 5 minutes. In some embodiments, the rinsing time is at least about 30 seconds. In some embodiments, the rinsing time is about 30 seconds to 5 minutes. In some embodiments, the rinsing time is 2 minutes.

In some embodiments, the coated substrate is dried. In some embodiments, the drying is performed at ambient temperature. In some embodiments, the drying is performed at elevated temperature, such as from about 80° C. to about 100° C.

In some embodiments, the coated substrate is optionally cured or annealed after the drying step. In other embodiments, the coated substrate is not cured or annealed. In some embodiments, the curing or annealing occurs at elevated temperatures, such as from about 100° C. to about 130° C. In some embodiments, the curing or annealing occurs for up to 24 hours.

In some embodiments, a reaction mixture with a basic pH is desired. The pH of such reaction mixtures ranges from about 8 to about 12, and preferably from about 8.9 to about 11.0. In some embodiments, a strong base is used as the catalyst to achieve the basic pH. In some embodiments, a weak base is used as the catalyst to achieve the basic pH. When using reaction mixtures with a basic pH, it is possible to increase the reaction time to affect the roughness of the substrate's surface. Without wishing to be bound by theory, it is suggested that the increased reaction time results in a hierarchical structure with nanoparticles well embedded in a thin film that is adsorbed onto the substrate's surface. Increased reaction times can lead to increased structures at the surface, and thus increased roughness of the surface, measured by an increase in static water contact angle (SCA) and impact water contact angle (ICA) values. In embodiments where the substrate comprises fibers, the diameter of the fibers may increase due to the hierarchical structure of the inorganic silica or silane. Further, the increase in diameter is directly proportional to the reaction time, such that longer reaction times yield fibers with larger diameters.

In some embodiments, a reaction mixture with an acidic pH is desired. The pH of such reaction mixtures ranges from about 1 to about 5, and preferably from about 1 to about 3. In some embodiments, a strong acid is used as the catalyst to achieve the acidic pH. In some embodiments, a weak acid is used as the catalyst to achieve the acidic pH. When using reaction mixtures with an acidic pH, any of the reaction times discussed herein yield a substrate with a smooth surface without any distinct nanoscale roughness and no increase in fiber diameter. The SCA and ICA values for substrates coated in acid-catalyzed reactions did not change with increasing reaction times, reflecting the smoothness of the substrate surface.

In some embodiments, the substrate is porous. In some embodiments, the substrate is fibrous. In some embodiments, the substrate is a fabric. In certain embodiments, the fabric substrate comprises a polymeric fabric. Non-limiting examples of polymeric fabrics suitable for use as substrates include polyester (polyethylene terephthalate or PET), Lycra®, Pestdor, viscose, polypropylene, Tencel™, cotton, and combinations thereof Coatings of the Disclosure In one aspect, the present disclosure provides an inorganic silica- or silane-based coating comprising:

an inorganic silica or silane, a catalyst, and a dispersion medium in a ratio of from about 1:2:22 to about 1:30:25, wherein the inorganic silica or silane is condensed.

In the foregoing embodiment, one or more ingredients of the coating and/or steps or conditions of preparing the coating may be varied. It is understood and specifically contemplated that any one of the following embodiments describing such variations can be included in combination with one or more of any other such embodiments.

In some embodiments, the ratio of inorganic silica or silane:catalyst:dispersion medium is varied. In some embodiments, the ratio ranges from 1:2:22 to 1:30:25. In certain embodiments, the ratio is selected from the group consisting of about 1:4:22, about 1:7:22, about 1:10:22, about 1:5:25, about 1:25:25, and about 1:30:25. In some embodiments, the ratio of inorganic silica or silane:dispersion medium is about 1:4.

In some embodiments, the inorganic silica or silane, catalyst, and dispersion medium are mixed in a single step. In some embodiments, the catalyst and dispersion medium are mixed in one solution and the inorganic silica or silane and dispersion medium are mixed in a second solution, and the two solutions are subsequently mixed together. In some embodiments, the catalyst and dispersion medium are mixed in one solution and the inorganic silica or silane and dispersion medium are mixed in a second solution in a ratio of about 1:4, and the two solutions are subsequently mixed together.

In some embodiments, the inorganic silica or silane is a non-fluorinated inorganic silica or silane. In certain embodiments, the inorganic silica or silane is MTMS. In some embodiments, the catalyst is used to provide a desired pH to the reaction mixture. In some embodiments, the catalyst comprises a base. In some embodiments, the catalyst comprises a hydroxide, such as for example and not limitation, ammonium hydroxide ($NH_4OH$), sodium hydroxide (NaOH), and (KOH). In some embodiments, the catalyst comprises a strong acid, such as for example and not limitation, hydrochloric acid (HCl). In some embodiments, the catalyst comprises a weak acid, such as for example and not limitation, a carboxylic acid (including but not limited to acetic acid ($CH_3COOH$)). In some embodiments, the dispersion medium comprises an alcohol. In certain embodiments, the dispersion medium comprises ethanol (EtOH) or methanol (MeOH).

In some embodiments, the mixture is stable for at most about 10 days (240 hours). In some embodiments, the mixture is stable for at least about 30 seconds. In some embodiments, the mixture is stable for at least about 30 seconds to at most about 10 days (240 hours). In some embodiments, the stability is from about 5 minutes to about 6 days (144 hours). In some embodiments, the stability is from about 5 minutes to about 3 days (72 hours). In some embodiments, the stability is from about 5 minutes to about 1 day (24 hours). In some embodiments, the stability is about 5 minutes, about 15 minutes, about 30 minutes, about 45 minutes, about 60 minutes, about 90 minutes, about 120 minutes, about 240 minutes, about 12 hours, about 24 hours, about 48 hours, about 36 hours, about 72 hours, about 84 hours, about 96 hours, about 108 hours, about 120 hours, about 132 hours, about 144 hours, about 156 hours, about 168 hours, about 180 hours, about 192 hours, about 204 hours, about 216 hours, or about 228 hours.

In some embodiments, the mixture is stable in ambient conditions for at most about 10 days, at most about 9 days, at most about 8 days, at most about 7 days, at most about 6 days, at most about 5 days, at most about 4 days, at most about 3 days, at most about 2 days, or at most about 1 day. In some embodiments, the mixture is stable in ambient conditions for at least about 1 day to at most about 10 days.

In some embodiments, a substrate is added to and submerged in the coating. In some embodiments, the substrate is added to the coating mixture after the reaction time and allowed to soak in the coating for a soaking time.

In some embodiments, the soaking time is at most about 15 minutes. In some embodiments, the soaking time is at least about 30 seconds. In some embodiments, the soaking time is about 30 seconds to about 15 minutes. In some embodiments, the soaking time is about 2 minutes to about 10 minutes. In some embodiments, the soaking time is about 2 minutes, about 5 minutes, about 10 minutes, or about 15 minutes. In some embodiments, a shorter reaction time (e.g., about 5 minutes to about 60 minutes) followed by a longer soaking time (e.g., about 10 minutes to about 15 minutes) can increase hydrophobicity.

In some embodiments, excess coating mixture is optionally removed from the substrate. In other embodiments, excess coating mixture is not removed from the substrate. In some embodiments, the excess coating mixture is removed by dilution, such as for example and not limitation, by rinsing the substrate in a rinsing medium. In some embodiments, the rinsing medium comprises an alcohol, such as for example and not limitation, ethanol. In some embodiments, the rinsing medium comprises water. In other embodiments, the excess coating mixture is removed by gravity (e.g., by hanging the substrate and allowing the excess mixture to drip off the substrate). In some embodiments, the excess coating mixture is removed by physical and/or mechanical means (e.g., by squeezing, twisting, and/or compressing the substrate).

In some embodiments comprising a rinsing step, the rinsing time is at most about 5 minutes. In some embodiments, the rinsing time is at least about 30 seconds. In some embodiments, the rinsing time is about 30 seconds to 5 minutes. In some embodiments, the rinsing time is 2 minutes.

In some embodiments, the coated substrate is dried. In some embodiments, the drying is performed at ambient temperature. In some embodiments, the drying is performed at elevated temperature, such as from about 80° C. to about 100° C.

In some embodiments, the coated substrate is optionally cured or annealed after the drying step. In other embodiments, the coated substrate is not cured or annealed. In some embodiments, the curing or annealing occurs at elevated temperatures, such as from about 100° C. to about 130° C. In some embodiments, the curing or annealing occurs for up to 24 hours.

In some embodiments, a reaction mixture with a basic pH is desired. The pH of such reaction mixtures ranges from about 8 to about 12, and preferably from about 8.9 to about 11.0. In some embodiments, a strong base is used as the catalyst to achieve the basic pH. In some embodiments, a weak base is used as the catalyst to achieve the basic pH. When using reaction mixtures with a basic pH, it is possible to increase the reaction time to affect the roughness of the substrate's surface. Without wishing to be bound by theory, it is suggested that the increased reaction time results in a hierarchical structure with nanoparticles well embedded in a thin film that is adsorbed onto the substrate's surface. Increased reaction times can lead to increased structures at the surface, and thus increased roughness of the surface, measured by an increase in static water contact angle (SCA) and impact water contact angle (ICA) values. In embodiments where the substrate comprises fibers, the diameter of the fibers may increase due to the hierarchical structure of the inorganic silica or silane. Further, the increase in diameter is directly proportional to the reaction time, such that longer reaction times yield fibers with larger diameters.

In some embodiments, a reaction mixture with an acidic pH is desired. The pH of such reaction mixtures ranges from about 1 to about 5, and preferably from about 1 to about 3. In some embodiments, a strong acid is used as the catalyst to achieve the acidic pH. In some embodiments, a weak acid is used as the catalyst to achieve the acidic pH. When using reaction mixtures with an acidic pH, any of the reaction times discussed herein yield a substrate with a smooth surface without any distinct nanoscale roughness and no increase in fiber diameter. The SCA and ICA values for substrates coated in acid-catalyzed reactions did not change with increasing reaction times, reflecting the smoothness of the substrate surface.

In some embodiments, the substrate is porous. In some embodiments, the substrate is fibrous. In some embodiments, the substrate is a fabric. In certain embodiments, the fabric substrate comprises a polymeric fabric. Non-limiting examples of polymeric fabrics suitable for use as substrates include polyester (polyethylene terephthalate or PET), Lycra®, Pestdor, viscose, polypropylene, Tencel™, cotton, and combinations thereof.

Methods of Forming Coatings of the Disclosure

In one aspect, the present disclosure provides a method of forming an inorganic silica- or silane-based coating, comprising the steps of:

mixing an inorganic silica or silane, a catalyst, and a dispersion medium in a ratio of from about 1:2:22 to about 1:30:25; and allowing the mixing to occur for a reaction time to enable hydrolysis and condensation of the inorganic silica or silane.

In any of the foregoing methods, one or more of the steps of the method, ingredients of the mixture, and/or conditions of the method step(s) may be varied. It is understood and specifically contemplated that any one of the following embodiments describing such variations can be included in combination with one or more of any other such embodiments.

In some embodiments, the ratio of inorganic silica or silane:catalyst:dispersion medium is varied. In some embodiments, the ratio ranges from 1:2:22 to 1:30:25. In certain embodiments, the ratio is selected from the group consisting of about 1:4:22, about 1:7:22, about 1:10:22, about 1:5:25, about 1:25:25, and about 1:30:25. In some embodiments, the ratio of inorganic silica or silane:dispersion medium is about 1:4.

In some embodiments, the inorganic silica or silane, catalyst, and dispersion medium are mixed in a single step. In some embodiments, the catalyst and dispersion medium are mixed in one solution and the inorganic silica or silane and dispersion medium are mixed in a second solution, and the two solutions are subsequently mixed together. In some embodiments, the catalyst and dispersion medium are mixed in one solution and the inorganic silica or silane and dispersion medium are mixed in a second solution in a ratio of about 1:4, and the two solutions are subsequently mixed together.

In some embodiments, the inorganic silica or silane is a non-fluorinated inorganic silica or silane. In certain embodiments, the inorganic silica or silane is MTMS. In some embodiments, the catalyst is used to provide a desired pH to the reaction mixture. In some embodiments, the catalyst comprises a base. In some embodiments, the catalyst comprises a hydroxide, such as for example and not limitation, ammonium hydroxide ($NH_4OH$), sodium hydroxide (NaOH), and (KOH). In some embodiments, the catalyst comprises a strong acid, such as for example and not limitation, hydrochloric acid (HCl). In some embodiments, the catalyst comprises a weak acid, such as for example and not limitation, a carboxylic acid (including but not limited to acetic acid ($CH_3COOH$)). In some embodiments, the dispersion medium comprises an alcohol. In certain embodiments, the dispersion medium comprises ethanol (EtOH) or methanol (MeOH).

In some embodiments, the reaction time is at most about 10 days (240 hours). In some embodiments, the reaction time is at least about 30 seconds. In some embodiments, the reaction time is from at least about 30 seconds to at most about 10 days (240 hours). In some embodiments, the reaction time is from about 5 minutes to about 6 days (144 hours). In some embodiments, the reaction time is from about 5 minutes to about 3 days (72 hours). In some embodiments, the reaction time is from about 5 minutes to about 1 day (24 hours). In some embodiments, the reaction time is about 5 minutes, about 15 minutes, about 30 minutes, about 45 minutes, about 60 minutes, about 90 minutes, about 120 minutes, about 240 minutes, about 12 hours, about 24 hours, about 48 hours, about 36 hours, about 72 hours, about 84 hours, about 96 hours, about 108 hours, about 120 hours, about 132 hours, about 144 hours, about 156 hours, about 168 hours, about 180 hours, about 192 hours, about 204 hours, about 216 hours, or about 228 hours.

In some embodiments, the mixture is stable in ambient conditions for at most about 10 days, at most about 9 days, at most about 8 days, at most about 7 days, at most about 6 days, at most about 5 days, at most about 4 days, at most about 3 days, at most about 2 days, or at most about 1 day.

In some embodiments, the mixture is stable in ambient conditions for at least about 1 day to at most about 10 days.

In some embodiments, the soaking time is at most about 15 minutes. In some embodiments, the soaking time is at least about 30 seconds. In some embodiments, the soaking time is about 30 seconds to about 15 minutes. In some embodiments, the soaking time is about 2 minutes to about 10 minutes. In some embodiments, the soaking time is about 2 minutes, about 5 minutes, about 10 minutes, or about 15 minutes. In some embodiments, a shorter reaction time (e.g., about 5 minutes to about 60 minutes) followed by a longer soaking time (e.g., about 10 minutes to about 15 minutes) can increase hydrophobicity In some embodiments, excess coating mixture is optionally removed from the substrate. In other embodiments, excess coating mixture is not removed from the substrate. In some embodiments, the excess coating mixture is removed by dilution, such as for example and not limitation, by rinsing the substrate in a rinsing medium. In some embodiments, the rinsing medium comprises an alcohol, such as for example and not limitation, ethanol. In some embodiments, the rinsing medium comprises water. In other embodiments, the excess coating mixture is removed by gravity (e.g., by hanging the substrate and allowing the excess mixture to drip off the substrate). In some embodiments, the excess coating mixture is removed by physical and/or mechanical means (e.g., by squeezing, twisting, and/or compressing the substrate).

In some embodiments comprising a rinsing step, the rinsing time is at most about 5 minutes. In some embodiments, the rinsing time is at least about 30 seconds. In some embodiments, the rinsing time is about 30 seconds to 5 minutes. In some embodiments, the rinsing time is 2 minutes.

In some embodiments, the coated substrate is dried. In some embodiments, the drying is performed at ambient temperature. In some embodiments, the drying is performed at elevated temperature, such as from about 80° C. to about 100° C.

In some embodiments, the coated substrate is optionally cured or annealed after the drying step. In other embodiments, the coated substrate is not cured or annealed. In some embodiments, the curing or annealing occurs at elevated temperatures, such as from about 100° C. to about 130° C. In some embodiments, the curing or annealing occurs for up to 24 hours.

In some embodiments, a reaction mixture with a basic pH is desired. The pH of such reaction mixtures ranges from about 8 to about 12, and preferably from about 8.9 to about 11.0. In some embodiments, a strong base is used as the catalyst to achieve the basic pH. In some embodiments, a weak base is used as the catalyst to achieve the basic pH. When using reaction mixtures with a basic pH, it is possible to increase the reaction time to affect the roughness of the substrate's surface. Without wishing to be bound by theory, it is suggested that the increased reaction time results in a hierarchical structure with nanoparticles well embedded in a thin film that is adsorbed onto the substrate's surface. Increased reaction times can lead to increased structures at the surface, and thus increased roughness of the surface, measured by an increase in static water contact angle (SCA) and impact water contact angle (ICA) values. In embodiments where the substrate comprises fibers, the diameter of the fibers may increase due to the hierarchical structure of the inorganic silica or silane. Further, the increase in diameter is directly proportional to the reaction time, such that longer reaction times yield fibers with larger diameters.

In some embodiments, a reaction mixture with an acidic pH is desired. The pH of such reaction mixtures ranges from about 1 to about 5, and preferably from about 1 to about 3. In some embodiments, a strong acid is used as the catalyst to achieve the acidic pH. In some embodiments, a weak acid is used as the catalyst to achieve the acidic pH. When using reaction mixtures with an acidic pH, any of the reaction times discussed herein yield a substrate with a smooth surface without any distinct nanoscale roughness and no increase in fiber diameter. The SCA and ICA values for substrates coated in acid-catalyzed reactions did not change with increasing reaction times, reflecting the smoothness of the substrate surface.

In some embodiments, the substrate is porous. In some embodiments, the substrate is fibrous. In some embodiments, the substrate is a fabric. In certain embodiments, the fabric substrate comprises a polymeric fabric. Non-limiting examples of polymeric fabrics suitable for use as substrates include polyester (polyethylene terephthalate or PET), Lycra®, Pestdor, viscose, polypropylene, Tencel™, cotton, and combinations thereof Coated Substrates of the Disclosure In another aspect, the disclosure provides a coated substrate, comprising: a substrate, wherein at least a portion of the substrate is coated by a mixture, the mixture comprising an inorganic silica or silane, a catalyst, and a dispersion medium in a ratio of from about 1:2:22 to about 1:30:25, wherein the inorganic silica or silane is hydrolyzed and condensed.

In this aspect, one or more of the steps of the method, ingredients of the mixture, and/or conditions of the method step(s) may be varied. It is understood and specifically contemplated that any one of the following embodiments describing such variations can be included in combination with one or more of any other such embodiments.

In some embodiments, the ratio of inorganic silica or silane:catalyst:dispersion medium is varied. In some embodiments, the ratio ranges from 1:2:22 to 1:30:25. In certain embodiments, the ratio is selected from the group consisting of about 1:4:22, about 1:7:22, about 1:10:22, about 1:5:25, about 1:25:25, and about 1:30:25. In some embodiments, the ratio of inorganic silica or silane:dispersion medium is about 1:4.

In some embodiments, the inorganic silica or silane, catalyst, and dispersion medium are mixed in a single step. In some embodiments, the catalyst and dispersion medium are mixed in one solution and the inorganic silica or silane and dispersion medium are mixed in a second solution, and the two solutions are subsequently mixed together. In some embodiments, the catalyst and dispersion medium are mixed in one solution and the inorganic silica or silane and dispersion medium are mixed in a second solution in a ratio of about 1:4, and the two solutions are subsequently mixed together.

In some embodiments, the inorganic silica or silane is a non-fluorinated inorganic silica or silane. In certain embodiments, the inorganic silica or silane is MTMS. In some embodiments, the catalyst is used to provide a desired pH to the reaction mixture. In some embodiments, the catalyst comprises a base. In some embodiments, the catalyst comprises a hydroxide, such as for example and not limitation, ammonium hydroxide ($NH_4OH$), sodium hydroxide (NaOH), and (KOH). In some embodiments, the catalyst comprises a strong acid, such as for example and not limitation, hydrochloric acid (HCl). In some embodiments, the catalyst comprises a weak acid, such as for example and not limitation, a carboxylic acid (including but not limited to acetic acid ($CH_3COOH$)). In some embodiments, the dispersion medium comprises an alcohol. In certain embodiments, the dispersion medium comprises ethanol (EtOH) or methanol (MeOH).

In some embodiments, the mixture is stable for at most about 10 days (240 hours). In some embodiments, the mixture is stable for at least about 30 seconds. In some embodiments, the mixture is stable for at least about 30 seconds to at most about 10 days (240 hours). In some embodiments, the stability is from about 5 minutes to about 6 days (144 hours). In some embodiments, the stability is from about 5 minutes to about 3 days (72 hours). In some embodiments, the stability is from about 5 minutes to about 1 day (24 hours). In some embodiments, the stability is about 5 minutes, about 15 minutes, about 30 minutes, about 45 minutes, about 60 minutes, about 90 minutes, about 120 minutes, about 240 minutes, about 12 hours, about 24 hours, about 48 hours, about 36 hours, about 72 hours, about 84 hours, about 96 hours, about 108 hours, about 120 hours, about 132 hours, about 144 hours, about 156 hours, about 168 hours, about 180 hours, about 192 hours, about 204 hours, about 216 hours, or about 228 hours.

In some embodiments, the mixture is stable in ambient conditions for at most about 10 days, at most about 9 days, at most about 8 days, at most about 7 days, at most about 6 days, at most about 5 days, at most about 4 days, at most about 3 days, at most about 2 days, or at most about 1 day. In some embodiments, the mixture is stable in ambient conditions for at least about 1 day to at most about 10 days.

In some embodiments, the substrate is soaked in the coating mixture for a soaking time. In some embodiments, the soaking time is at most about 15 minutes. In some embodiments, the soaking time is at least about 30 seconds. In some embodiments, the soaking time is about 30 seconds to about 15 minutes. In some embodiments, the soaking time is about 2 minutes to about 10 minutes. In some embodiments, the soaking time is about 2 minutes, about 5 minutes, about 10 minutes, or about 15 minutes. In some embodiments, a shorter reaction time (e.g., about 5 minutes to about 60 minutes) followed by a longer soaking time (e.g., about 10 minutes to about 15 minutes) can increase hydrophobicity In some embodiments, excess coating mixture is optionally removed from the substrate. In other embodiments, excess coating mixture is not removed from the substrate. In some embodiments, the excess coating mixture is removed by dilution, such as for example and not limitation, by rinsing the substrate in a rinsing medium. In some embodiments, the rinsing medium comprises an alcohol, such as for example and not limitation, ethanol. In some embodiments, the rinsing medium comprises water. In other embodiments, the excess coating mixture is removed by gravity (e.g., by hanging the substrate and allowing the excess mixture to drip off the substrate). In some embodiments, the excess coating mixture is removed by physical and/or mechanical means (e.g., by squeezing, twisting, and/or compressing the substrate).

In some embodiments comprising a rinsing step, the rinsing time is at most about 5 minutes. In some embodiments, the rinsing time is at least about 30 seconds. In some embodiments, the rinsing time is about 30 seconds to 5 minutes. In some embodiments, the rinsing time is 2 minutes.

In some embodiments, the coated substrate is dried. In some embodiments, the drying is performed at ambient temperature. In some embodiments, the drying is performed at elevated temperature, such as from about 80° C. to about 100° C.

In some embodiments, the coated substrate is optionally cured or annealed after the drying step. In other embodiments, the coated substrate is not cured or annealed. In some embodiments, the curing or annealing occurs at elevated temperatures, such as from about 100° C. to about 130° C. In some embodiments, the curing or annealing occurs for up to 24 hours.

In some embodiments, a mixture with a basic pH is desired. The pH of such mixtures ranges from about 8 to about 12, and preferably from about 8.9 to about 11.0. In some embodiments, a strong base is used as the catalyst to achieve the basic pH. In some embodiments, a weak base is used as the catalyst to achieve the basic pH. When using mixtures with a basic pH, it is possible to increase the reaction time to affect the roughness of the substrate's surface. Without wishing to be bound by theory, it is suggested that the increased reaction time results in a hierarchical structure with nanoparticles well embedded in a thin film that is adsorbed onto the substrate's surface. Increased reaction times can lead to increased structures at the surface, and thus increased roughness of the surface, measured by an increase in static water contact angle (SCA) and impact water contact angle (ICA) values. In embodiments where the substrate comprises fibers, the diameter of the fibers may increase due to the hierarchical structure of the inorganic silica or silane. Further, the increase in diameter is directly proportional to the reaction time, such that longer reaction times yield fibers with larger diameters.

In some embodiments, a mixture with an acidic pH is desired. The pH of such mixtures ranges from about 1 to about 5, and preferably from about 1 to about 3. In some embodiments, a strong acid is used as the catalyst to achieve the acidic pH. In some embodiments, a weak acid is used as the catalyst to achieve the acidic pH. When using mixtures with an acidic pH, any of the reaction times discussed herein yield a substrate with a smooth surface without any distinct nanoscale roughness and no increase in fiber diameter. The SCA and ICA values for substrates coated in acid-catalyzed reactions did not change with increasing reaction times, reflecting the smoothness of the substrate surface.

In some embodiments, the substrate is porous. In some embodiments, the substrate is fibrous. In some embodiments, the substrate is a fabric. In certain embodiments, the fabric substrate comprises a polymeric fabric. Non-limiting examples of polymeric fabrics suitable for use as substrates include polyester (polyethylene terephthalate or PET), Lycra®, Pestdor, viscose, polypropylene, Tencel™, cotton, and combinations thereof.

EXAMPLES

The present disclosure is also described and demonstrated by way of the following examples. However, the use of these and other examples anywhere in the specification is illustrative only and in no way limits the scope and meaning of the disclosure or of any exemplified term. Likewise, the disclosure is not limited to any particular preferred embodiments described here. Indeed, many modifications and variations of the disclosure may be apparent to those skilled in the art upon reading this specification, and such variations can be made without departing from the disclosure in spirit or in scope. The disclosure is therefore to be limited only by the terms of the appended claims along with the full scope of equivalents to which those claims are entitled.

Example 1: Development of a Coating Method for MTMS-Based Coatings

Inorganic, in particular silica-based coatings, have received increased interest in the fabric industry because of their economic potential and versatility when compared to popular organic coating processes largely using fluorine-based polymers. The latter technology raised health and environmental concerns in the past, leading to new and complex synthetic routes to more ecofriendly alternatives. Synthetic silica is a low-cost, nontoxic material prepared through the hydrolysis and condensation of predominantly tetraethylorthosilicate (TEOS) under either acidic or basic conditions, the so-called sol-gel method. Silica has remarkable fire retardancy, UV resistance and antibacterial properties. While TEOS has been used to modify polyurethane, cotton, knitted cellulose, and polyester fabrics, methyltrimethoxysilane, (MTMS) alone has not been explored for the design of coatings to enhance textile moisture resistance, wearability and durability. Rather, MTMS has mostly been used in tandem with other siloxane derivatives. For example, others have used MTMS in alkaline conditions to build multi-scale roughness on the surface of cotton fibers; subsequent addition of hexadecyltrimethylsilane (HTMS), led to superhydrophobic behavior. Another group reported the fabrication of complex superhydrophobic coatings on cotton via co-hydrolysis and condensation of HTMS, TEOS and 3-glycidyloxypropyltrimethoxysilane. Solely MTMS, as a coating precursor, has been used to alter wettability of paper and wood. Yet, prior wet processing, plasma treatment was necessary to achieve optimum surface chemistry and morphology of paper substrates. Owing to its chemical structure, MTMS is more appealing in coating industry than its homologue, TEOS, because MTMS imparts hydrophobic character and has low surface energy. MTMS-derived silica exhibits similar properties as those of TEOS-based homologues, but in addition, it is expected to readily form highly water-repellent and mechanically durable textile coatings.

Exposure of coated fabrics to a variety of environmental conditions often causes degradation; thus, knowledge of the specific physical parameters and testing protocols necessary to evaluate textile performance is of paramount importance. The hydrophobic character of coated materials is, in general, reflected by a static contact angle (SCA) which is greater than 90°. This value defines the equilibrium condition of a water droplet placed on a solid substrate. SCA is measured as the angle between the tangents to the liquid-fluid interface and to the solid interface at the three-phase contact line, as measured through the liquid phase. SCA for extremely water-repellent surfaces (superhydrophobic) exceeds 150°. Exemplary parameters that quantify the extent of liquid adhesion to surface include: (1) the roll-off angle (RA), the surface tilt maximum at which the water droplet starts to roll or slide; (2) contact angle hysteresis (CAH), the difference between advancing and receding angle of the expanding-retracting three-phase contact line; and (3) shedding angle (SHA), similar to RA, except the water droplet is launched from a certain height. Low RA and SHA angle values generally signify surfaces with low tendency to pin the water droplet. For superhydrophobic surfaces these values are less than 5°-10°.

Adhesion and abrasion testing are two of the critical tests to define coating durability. Tape peeling, cross-cut test, linear and circular abrasion, blade/knife test, oscillating steel ball/ring, pencil hardness test and bare finger contact are several examples of more or less standardized protocols used to assess the performance of the coated substrates. Because the coated substrates generally undergo liquid and particle collision events, procedures to test dynamic impact durability are important, such as for example and not limitation, solid particle impact, liquid spray/jet/droplet impact and aerodynamic impact. While some of these tests are used routinely, others are rarely reported (e.g., tape peeling), rendering it difficult to establish an overall perspective on long-term durability and mechanical wear of the surface-modified material. Multifunctional fabrics therefore need rational protocols that employ a series of tests necessary to efficiently evaluate their complex nature and performance.

In this Example, methyltrimethoxysilane (MTMS)—the silane reagent, ammonium hydroxide ($NH_4OH$)—the catalyst and anhydrous ethyl alcohol (EtOH)—the dispersion medium were reacted in various ratios to yield silica-coated polyester fabrics. The initial morphology of the coated textile surface was further modified by sequential peeling and aging. The behavior of the resulting silica-coated polyester mimicked that of natural surfaces that undergo shedding. A series of testing protocols was employed to evaluate the long-term durability, mechanical resistance, and liquid adhesion of these biomimetic silica-coated polyester fabrics. The modified fabric showed good non-wettability behavior under static and impact conditions, essentially independent of the reaction time used to synthesize the silica coating. The textile surface was able to withstand a series of custom and standard abrasion-peeling-aging-impact tests. Notably, the wetting resistance improved over time, pointing to effects of multiscale morphology, which is a primary feature of natural (super)hydrophobic materials. The coating and testing protocols described in this Example offer a platform for durable, biomimetic and multifunctional textile engineering.

Materials and Methods

Materials: Methyltrimethoxysilane (MTMS, 98%) and ammonium hydroxide ($NH_4OH$, 28-30%) were purchased from Sigma-Aldrich. Ethanol 200 proof (EtOH, 100%, USP, KOPTEC) and polystyrene Petri dishes (60×10 mm) were purchased from VWR. All chemicals were used as received. Polyester (polyethylene terephthalate (PET), Anticon 100® Heavyweight Series Cleanroom Wipes, 9×9 in, Contec® brand) was obtained from VWR. Wipes contain 100% continuous filament polyester double-knit interlock fabric. Glass beads (abrasive blasting media, mesh size 60-120 (248-124 µm)) were procured from McMaster-Carr. One- and two-sided Scotch Magic™ Tapes (3M) were used for peel tests.

Methods:

Static/Impact Contact Angle (SCA/ICA): Liquid adhesion was measured by placing (SCA) and dropping from 5 cm height (ICA) a sessile drop of 4 µL deionized water onto the coated PET fabrics.

Peeling: Single-sided tape was pressed against the modified PET substrate by thumb and detached using tweezers. The same region of material was subjected to four sequential peelings with a delay of 14-20 days between treatments.

Custom Sand Test: Aged PET fabrics (150 days) were attached to the interior of a glass bottle (D=10 cm) using double-sided 3M scotch tape. Glass beads (90 g) were filtered through two jointed sieves (U.S.A. Standard Test Sieve, ASTM E-11, No. 140 (106 µm), and No. 200 (75 µm)). These beads were subsequently introduced into the glass bottle that was capped and placed on a rotatory device. Samples were abraded twice (22 h and 20 h) at a speed of 1 RPM. The time between the two abrasion cycles was 15 days. Freshly filtered glass beads were also used for the second abrasion.

Aging-Peeling-Impact: Coated PET fabrics were allowed to age for >150 days in polystyrene Petri dishes under ambient conditions. The fabric square had two designated regions: half was allowed to age without peeling while the other half was concomitantly subjected to sequential aging and peeling cycles during the experimental time (150 days). Contact angle was measured under static, impact, peeling and impact after peeling (SCA/ICA, PSCA/PICA) conditions. These investigations were conducted after 70, 90, 120 and 150 days, durations that designate each aging-peeling cycle.

Standard Abrasion Resistance. Standard testing was performed at the Serta Simmons Bedding Company facilities (Atlanta, Ga.). The pilling resistance test followed the procedure described in the ASTM D4970 (2007) el standard. The instrument used was a Martindale tester (SDL Atlas brand, model M235). The ASTM 3886-99 standard was used for abrasion resistance test. The equipment involved in performing the tests was purchased from Custom Scientific Instruments, Inc. (model CS-59-386).

Thermal Annealing. Samples were placed in glass Petri dishes subsequently wrapped in aluminum foil and heated to 100° C. for 18 h. After thermal treatment, fabrics were allowed to rest at ambient conditions before contact angle measurements. The measurement was also repeated after one week.

Wicking Test. Coated samples were placed on the surface of water (200 mL) in a glass beaker. Water droplets set normally (SCA) and impinged from 5 cm height (ICA) were distributed randomly throughout the surface (face side) of the fabric. Then the droplets were removed by suction with a tissue paper (Kimwipes™ via VWR) and the fabric was flipped on the other side (back). Water dropping operation was repeated.

Custom Laundry Test. Samples subjected to sequential cycles of aging and peeling (1:4:22, 120-2 min and 1:25:25, 120-2 min) were washed in cold water (~18° C.) for 1 h in a glass beaker under magnetic stirring. Control over the stirring cone depth was achieved by adjusting the mixing rate (550 RPM) prevented fabric from rubbing against the magnetic rod. The second washing test was performed on the same samples using warm water (44° C.) and high-power detergent (0.6% (w/w), liquid Gain-Original). After 1 h, fabrics were rinsed in clean cold water (~18° C.) for 10 min. After washings, coated fabrics were allowed to dry at ambient conditions.

Characterization

Scanning Electron Microscopy, (SEM). The morphology of the modified PET fabric surfaces before and after different mechanical testing was inspected with a Hitachi SU8230 cold field-emission scanning electron microscope (Hitachi High Technologies Co., Japan). The instrument was operated at an acceleration voltage of 1 keV and a current of 10 µA. The coated PET samples were affixed/grounded to stainless steel stubs (D=12 mm, Electron Microscopy Sciences) by double-sided conductive tape (Electron Microscopy Sciences). Before imaging they were sputter-coated for 4 min with Ag/Pd to mitigate charging effects during exposure to the electron beam.

Contact Angle Measurements. Static and impact water contact angles (SCA, ICA) were measured with a Ramé-Hart CA goniometer (Model 290, Succasunna, N.J.) equipped with a camera for image capture. PET fabrics were affixed to the sample stage with double-sided tape (3M). The volume of the sessile drop was 4 µL. The reported contact angle values represent the average of at least five measurements at different locations on each sample. For ICA measurements the water drop was dispensed from a 5 cm height onto the fabric surface and the contact angle measured after impact.

X-ray Photoeletron Spectroscopy (XPS). The chemical composition of the coated PET fabrics was determined with a Thermo K-Alpha XPS (Thermo Fisher Scientific, West Palm Beach, Fla.) equipped with a monochromatic Al $K_\alpha$ X-ray source (hv=1486.6 eV), with a 400 µm diameter beam operating at a vacuum below $10^{-7}$ Pa. High-resolution and survey spectra of individual elements were recorded for each sample. The number of scans was varied between 4 and 20. Peak locations were calibrated against that of C1s which occurred at 284 eV. Peak fitting of the high-resolution spectra was performed with Thermo Avantage 5.934 software. Prior to analyses, PET samples were degassed in vacuo overnight.

Fourier-Transform Infrared Spectroscopy (FTIR). A Thermo Scientific iS50 FT-IR spectrometer was used to identify the characteristic adsorption bands of coated fabrics, plain PET and MTMS-based coating mixture alone. The instrument is equipped with a long lifetime Polaris™ infrared source, a fixed DLaTGS detector with KBr window, and Ge or KBr beamsplitter. Spectra were an average of 32 individual scans collected at 8 data point resolution. Spectra were also background (32 scans) and baseline corrected. Plain and coated PET as well as dried MTMS-based coatings (1:4:22, 1:25:25@120-2 min) were analyzed at room temperature and after annealing at 100° C. for 18 h.

Differential Scanning calorimetry (DSC). A Q200 apparatus from TA Instruments was used to identify the glass transition of untreated PET. Fabric, 2.2 mg, was sealed in aluminum pans and the experiment was run under nitrogen flow (50 mL/min). Details of the method are available in Supporting Information.

Synthesis

Preparation of Modified Fabric Surfaces. MTMS, $NH_4OH$ and EtOH were reacted in various ratios, as illustrated in Table 1. The first three listed recipes were adapted from a previous report. Briefly, the 1:4:22 formulation required mixing of 66 mL of EtOH and 15 mL of $NH_4OH$ in a 250 mL capped flask under magnetic stirring for 10-15 min to ensure a basic pH of 9 as determined by pH paper. Separately, 3.75 mL of MTMS was diluted with 15 mL EtOH to form a homogeneous solution which was added quickly to the flask. While the reaction proceeded under stirring, aliquots (10-15 mL) were taken at different times (R) and placed into polystyrene Petri dishes where fabric (squares ~2×2 in.) had been placed for soaking (S). The R-S times were 30-10, 30-30, 60-5, 60-15 and 120-2 min, respectively. Finally, the fabric samples were soaked in ethanol (200 mL) for 2 min and allowed to dry at ambient conditions. The 1:5:25, 1:25:25 and 1:30:25 recipes followed the same steps, except that MTMS was directly added to the EtOH/$NH_4OH$ solution without pre-dilution. Two batches per each formulation were processed to test reproducibility as reflected by contact angle values. No significant variations were recorded between batches.

TABLE 1

Sample Name, Total Reagent Ratio@Volume, Predilution Reagent Ratio@Volume and Reaction pH

| Sample Name | Total Reagent Ratio@Volume/mL MTMS:NH$_4$OH:EtOH | Pre-dilution Reagent Ratio@Volume/mL MTMS:EtOH | Reaction pH |
|---|---|---|---|
| 1:4:22 | 1:4:22 @ 3.75:15:81 | 1:4 @ 3.75:15 | 9.0 |
| 1:7:22 | 1:7:22 @ 3.75:26.25:81 | 1:4 @ 3.75:15 | 10.5 |
| 1:10:22 | 1:10:22 @ 3.75:37.5:81 | 1:4 @ 3.75:15 | 11.5 |
| 1:5:25 | 1:5:25 @ 2.4:12:60 | — | 10.0 |
| 1:25:25 | 1:25:25 @ 2:50:50 | — | 11.0 |
| 1:30:25 | 1:30:25 @ 2.4:72:60 | — | 12.0 |

Note:
After SCA/ICA and PSCA/PICA evaluation, only 1:4:22 and 1:25:25 formulations were selected for the remaining part of the study. This choice was based on minimizing the use of ammonium hydroxide, which is desirable in commercial applications, while ensuring a stable ICA/PICA.

Results and Discussion
Design of Biomimetic Coating on Polyester Fabric.

Biomimetic coated polyester fabrics were prepared through a sol-gel process by reacting methyltrimethoxysilane (MTMS) in a basic alcoholic solution containing ammonium hydroxide (NH$_4$OH, the catalyst) and anhydrous ethanol (EtOH, the dispersion medium), as illustrated in FIG. 1A. The coating formulations were designed with and without predilution of MTMS in EtOH, which differently affects the reaction kinetics (Table 1). In order to mimic the properties of biological materials that undergo shedding, like snake skin, the resulting native morphology of the MTMS coating was further modified by four sequential cycles of peeling and aging. During this processing, the water-repellent behavior, mechanical durability and resistance of the biomimetic coated fabrics were also investigated. Finally, the results obtained after aging and 'shedding' of coated PET were compared to standard approaches.

Sessile Drop Impact. Wettability of the surface-modified PET fabric was characterized by contact angle (CA) measurements under both static (SCA) and impact conditions (ICA). Table 2 summarizes the SCA and ICA values recorded for a 4 µL water sessile drop deposited on the silica-coated fabric. The average SCA was in the range of 131°-137.5° for 1:4:22 and 123.5°-132.5° for 1:25:25, respectively. The same trend was observed for the other formulations designed with MTMS pre-dilution (1:7:22, 1:10:22) and without pre-dilution (1:5:25, 1:30:25) (Table 3). SCA values were in the range of 128°-147° (1:7:22), 128°-138° (1:10:22), 125°-134° (1:5:25) and 122°-155° (1:30:25), respectively. Apparently, the SCA was not dependent on R-S time nor on the reagent ratio used to prepare the coating. SCA values indicate that the non-wettability behavior of coated polyester fabrics is near the broadly used lower limit for superhydrophobicity)(>150°, except for 1:30:25 (155°±3, 120-2). Water droplets were pinned on the surface and did not roll-off under the effect of gravity. Yet, in the case of 1:30:25, the roll-off angle was 40°±5°.

On the other hand, the measured average ICA, which mimics surface exposure to raindrop impact, showed significant differences between the two sets of formulations (Table 2 and Table 3). Higher values were observed for samples processed without MTMS pre-dilution 1:5:25 (86°-116°), 1:25:25 (112.5°-125.2°) and 1:30:25 (84°-135°) than for those with pre-diluted MTMS, 1:4:22 (95°-103.5°), 1:7:22 (95°-107°), and 1:10:22 (88°-111°). The liquid impact did not degrade the hydrophobic character of the fabric surface after sequential drop impingements. Notably, the small variations between SCA and ICA values, especially for 1:25:25 and 1:30:25, suggest that the droplet impact did not result in full penetration of the hierarchical structures, likely due to the chemical nature and multi-scale morphology of the surface. In support of this observation, strong basic conditions seemed to yield coatings with higher SCA/ICA values (1:30:25, pH 12) than weak basic dispersions (1:5:25, pH 10). Coatings from the two sets (pre-dilution-no pre-dilution) prepared under similar pH conditions gave slightly different contact angle values (e.g. 1:5:25 vs. 1:7:22).

TABLE 2

Reaction-Soaking Times (R-S), Static and Impact Contact Angles (SCA/ICA) for 1:4:22 and 1:25:25 (MTMS:NH$_4$OH:EtOH) Coating Formulations

| | 1:4:22 | | 1:25:25 | |
|---|---|---|---|---|
| R-S/min | SCA/degrees | ICA/degrees | SCA/degrees | ICA/degrees |
| 30-10 | 133.6 ± 2.0 | 95.0 ± 10.0 | 130.3 ± 5.0 | 124.0 ± 1.0 |
| 30-30 | 134.0 ± 2.0 | 97.4 ± 5.0 | 132.0 ± 5.0 | 117.0 ± 5.0 |
| 60-5 | 135.0 ± 4.0 | 100.0 ± 9.5 | 123.5 ± 2.0 | 112.5 ± 5.5 |
| 60-15 | 131.0 ± 2.0 | 103.5 ± 10.0 | 130.0 ± 5.0 | 125.2 ± 2.0 |
| 120-2 | 137.5 ± 3.0 | 101.0 ± 4.0 | 132.5 ± 6.0 | 122.0 ± 1.0 |

TABLE 3

Reaction-Soaking Times (R-S), Static and Impact Contact Angles (SCA/ICA) for 1:7:22, 1:10:22 (Pre-dilution), 1:5:25 and 1:30:25 (No Pre-dilution) Coating Formulations

| | Pre-dilution | | | |
|---|---|---|---|---|
| | 1:7:22 | | 1:10:22 | |
| R-S/min | SCA/degrees | ICA/degrees | SCA/degrees | ICA/degrees |
| 30-10 | 128 ± 3 | 95 ± 1 | 128 ± 2 | 88 ± 1 |
| 30-30 | 127 ± 3 | 98 ± 1 | 134 ± 2 | 100 ± 1 |
| 60-5 | 129 ± 3 | 103 ± 3 | 134 ± 4 | 101 ± 1 |
| 60-15 | 132 ± 5 | 107 ± 1 | 138 ± 2 | 104 ± 1 |
| 120-2 | 147 ± 2 | 99 ± 2 | 131 ± 1 | 111 ± 2 |
| | No Pre-dilution | | | |
| | 1:5:25 | | 1:30:25 | |
| R-S/min | SCA/degrees | ICA/degrees | SCA/degrees | ICA/degrees |
| 30-10 | 125 ± 2 | 86 ± 3 | 122 ± 2 | 84 ± 1 |
| 30-30 | 126 ± 2 | 83 ± 1 | 134 ± 2 | 120 ± 1 |
| 60-5 | 133 ± 1 | 101 ± 1 | 142 ± 4 | 135 ± 3 |
| 60-15 | 134 ± 5 | 106 ± 4 | 145 ± 2 | 135 ± 2 |
| 120-2 | 133 ± 1 | 100 ± 1 | 155 ± 2 | 131 ± 2 |

Indeed, SEM images (FIGS. 1B and 1C, FIGS. 10A-10B and FIGS. 11A-11D) revealed that the two sets of coating yielded different surface structures. While all formulations seemed to generate a smooth, relatively uniform, protective layer that wrapped around the fibers, additional structures were visible on the fiber surfaces. For example, the surface morphology of 1:4:22 (120-2 min, FIG. 1B, inset) was smoother relative to that of the 1:25:25 (120-2 min) homologue, which appeared to be filled with pores (FIG. 1C, inset). The MTMS coating was relatively thin (Table 4), 3±0.6 µm (1:4:22, 30-10 min), 7.6±0.4 µm (1:4:22, 120-2 min), 4.3±0.6 µm (1:25:25, 30-10 min) and 3.7±0.2 µm (1:25:25, 120-2 min). These observations combined with the SCA-ICA values confirmed that multiscale roughness is a key factor that controls non-wettability behavior. The liquid-solid adhesion behavior of the two coated surfaces indicated that the presence of hybrid states could be responsible for the observed wetting properties.

Combined Peeling and Impact Tests. As described in FIG. 1A, tape-peeling was employed to further modify the fabric surface morphology. This procedure also provided information about the coating-to-substrate adhesion. As shown in Table 4 and Table 5, the modified PET surface displayed good water repellent behavior. Contact angle values after peeling (PSCA) were in the range of 119°-127° (1:4:22), 127°-136° (1:7:22), 131°-136° (1:10:22), 125°-132° (1:5:25), 112.5°-124.3° (1:25:25) and 124°-146° (1:30:25), respectively. The SCA-PSCA difference was within ~10°. This result suggested that the MTMS coating was strongly bound to the fiber surface and it is not significantly removed by peeling. Therefore, it is suggested that tape peeling did not influence the surface hydrophobicity significantly.

TABLE 4

Reaction-Soaking Times, Static and Impact Contact Angles for 1:4:22 and 1:25:25 Coating Formulations Recorded after Tape Peeling

| | 1:4:22 | | 1:25:25 | |
|---|---|---|---|---|
| R-S/ min | PSCA/ degrees | PICA/ degrees | PSCA/ degrees | PICA/ degrees |
| 30-10 | 125.0 ± 9.0 | 97.5 ± 12.0 | 124.3 ± 1.0 | 103.7 ± 1.0 |
| 30-30 | 119.0 ± 6.0 | 99.0 ± 2.5 | 117.0 ± 4.5 | 107.0 ± 2.0 |
| 60-5 | 123.7 ± 2.5 | 94.5 ± 6.5 | 112.5 ± 5.5 | 111.0 ± 1.0 |
| 60-15 | 127.0 ± 9.5 | 116.0 ± 5.0 | 125.5 ± 2.0 | 122.5 ± 3.5 |
| 120-2 | 119.0 ± 6.5 | 97.4 ± 4.5 | 122.0 ± 1.0 | 116.0 ± 1.5 |

TABLE 5

Sample, Fiber Diameter, Diameter Difference between Naked-Coated (No Peeling) PET and Coated (No Peeling-Peeling) PET

| Sample | Diameter, D/μm | $\Delta D_{(PET\ no\ peeling-PET\ naked)}$/μm | $\Delta D_{(PET\ no\ peeling-PET\ peeling)}$/μm |
|---|---|---|---|
| PET naked | 15 ± 1.6 | — | — |
| PET, 1:4:22 (no peeling) 30-10 min | 18 ± 1 | 3 ± 0.6 | — |
| PET, 1:4:22 (peeling) 30-10 min | 17 ± 0.5 | — | 1 ± 0.5 |
| PET, 1:4:22 (no peeling) 120-2 min | 22.6 ± 2 | 7.6 ± 0.4 | — |
| PET, 1:4:22 (peeling) 120-10 min | 18.4 ± 1.2 | — | 4.16 ± 0.8 |
| PET, 1:25:25 (no peeling) 30-10 min | 19.3 ± 2.2 | 4.3 ± 0.6 | — |
| PET, 1:25:25 (peeling) 30-10 min | 17.9 ± 1 | — | 1.4 ± 1.2 |
| PET, 1:25:25 (no peeling) 120-10 min | 18.7 ± 1.4 | 3.7 ± 0.2 | — |
| PET, 1:25:25 (peeling) 120-10 min | 18 ± 1.8 | — | 0.66 ± 0.35 |

Evaluated from SEM images by using the Image J software from NIST.

Contact angles after peeling and under impact conditions (PICA) were in the range of 94.5°-116° (1:4:22), 103°-126° (1:7:22), 102°-118° (1:10:22), 77°-98° (1:5:25), 103.7°-122.5° (1:25:25) and 107°-129° (1:30:25) mostly similar to that observed for ICA. Notably, PICA values for 1:7:22, 1:10:22, 1:25:25 and 1:30:25 slightly exceeded the initial ICA numbers. The PSCA-PICA difference was smaller than that of SCA-ICA for both sets of coating formulations. Overall the test results indicated that the modified PET surface is resistant to applied mechanical stress without losing its highly hydrophobic character.

Figure 2A:
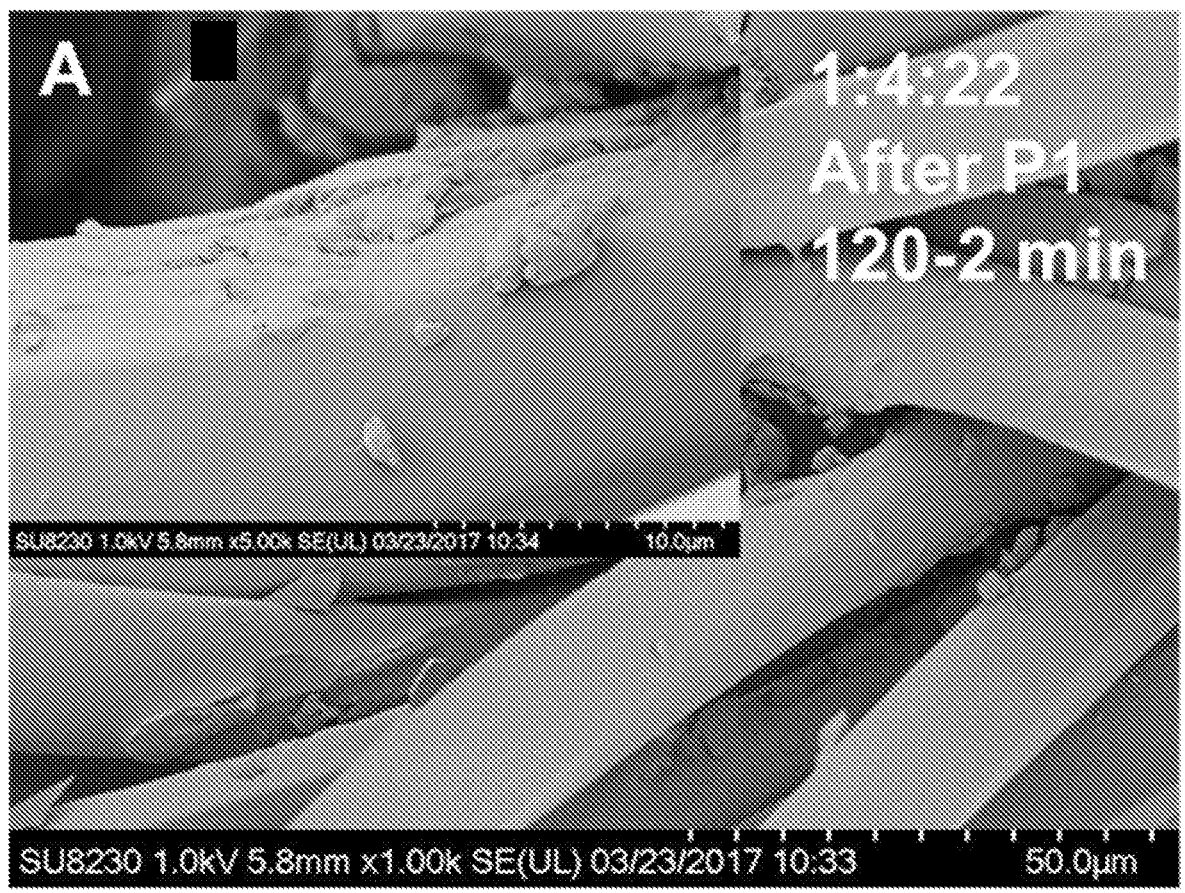
FIG. 2A-2B depict SEM images of coated substrates. SEM images of 1:4:22 (120-2 min) (2A) and 1:25:25 (120-2 min) (2B) after the first peeling (P1). Top left insets show high magnification images of coated fibers. Bottom images display the appearance of water droplets (4 µL) used to measure ICA, PSCA and PICA.
Figure 2A:
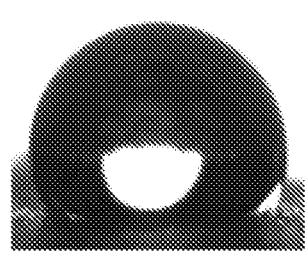
Figure 2A:
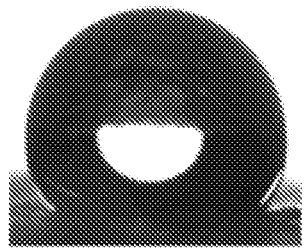
Figure 2A:
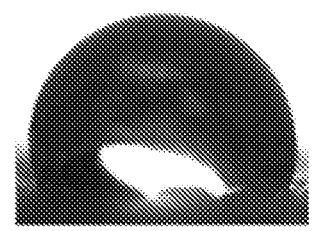
Figure 2B:
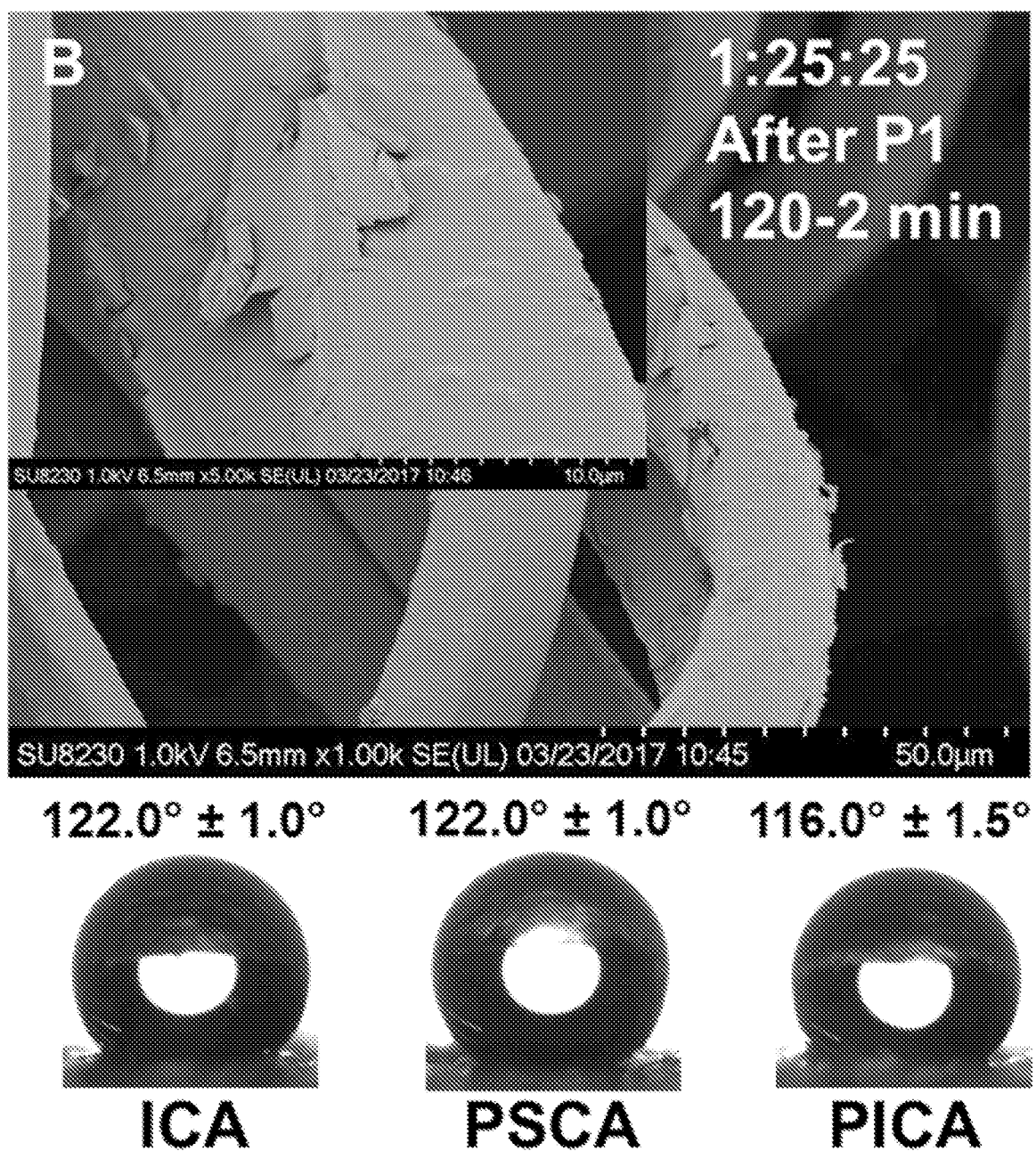
Figure 12A:
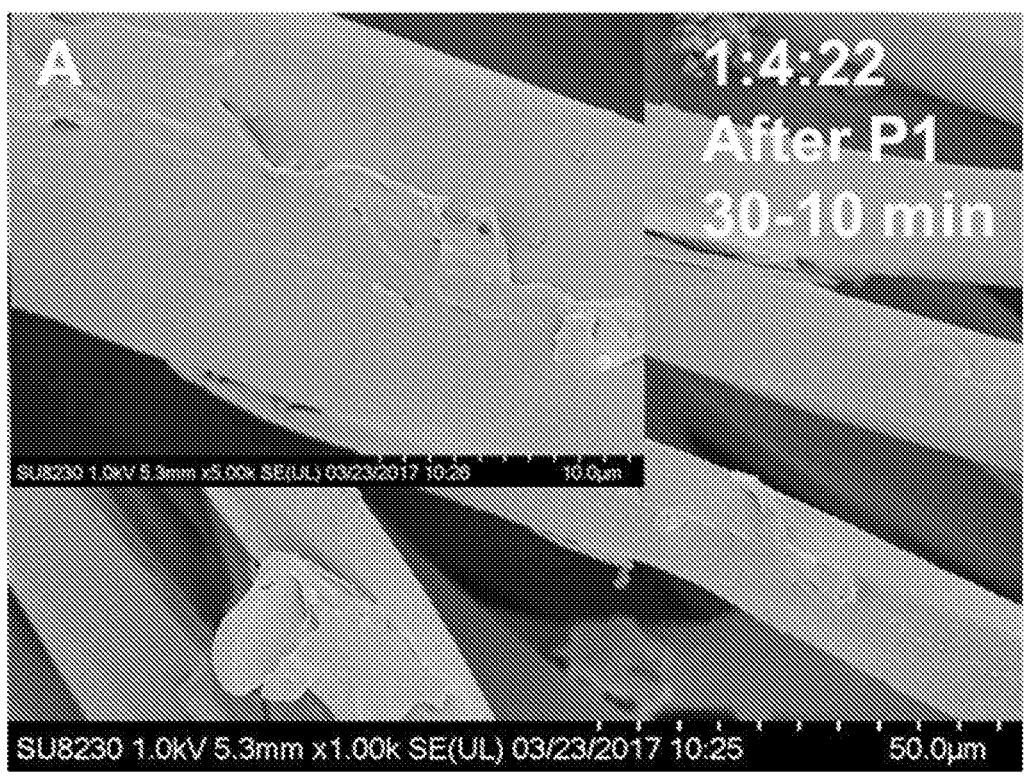
FIG. 12A-12B show SEM images of 1:4:22 (30-10 min) (12A) and 1:25:25 (30-10 min) (12B) coated samples after the first peeling test (P1).
Figure 12B:
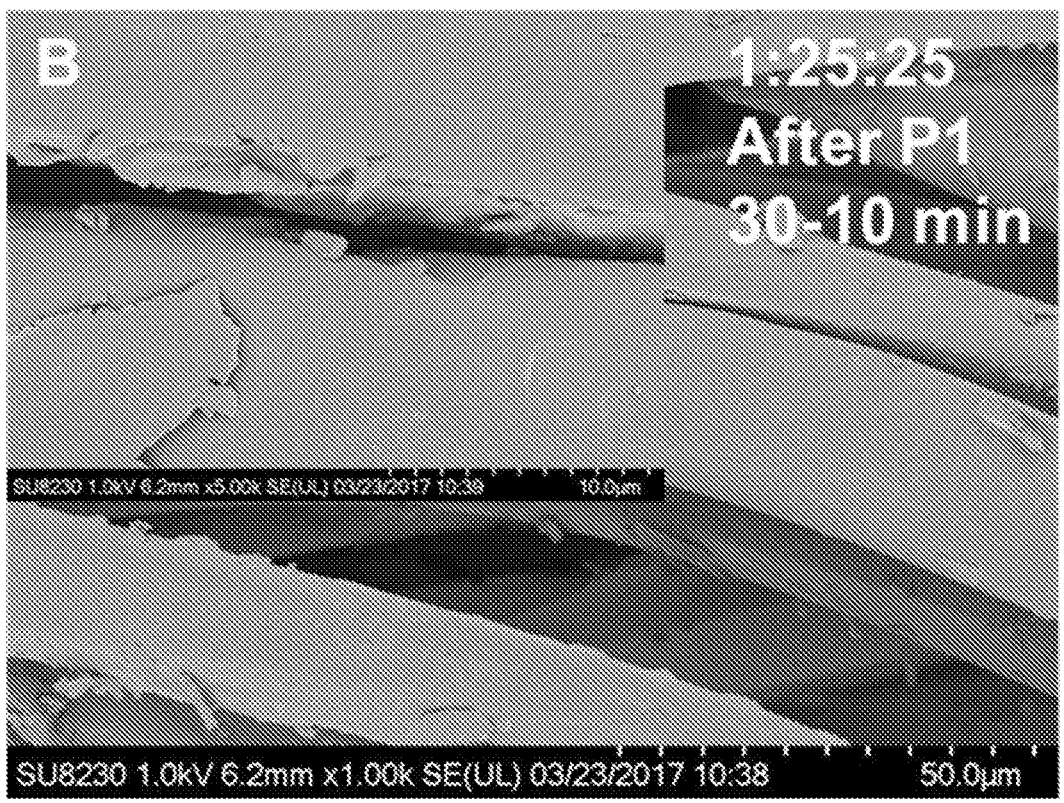

SEM revealed that tape peeling removed a fraction of the loosely bound aggregate particles (FIG. 2A-2B). For example, the coating thickness after peeling was 1±0.5 μm (1:4:22, 30-10 min), 4.16±0.8 μm (1:4:22, 120-2 min), 1.4±1.2 μm (1:25:25, 30-10 min) and 0.66±0.35 μm (1:25:25, 120-2 min) (Table 5). These values represent a percentage range of 18%-55% relative to initial ones (no peeling, Table 5). After abrasion, the smooth layer that covers the fiber surfaces became apparent and presented sparse architectural features atop that were more pronounced in 1:25:25 (120-2 min) (FIG. 2B) compared to 1:4:22 (120-2 min) coatings (FIG. 2A). Debris from the removed MTMS-derived coating visible across the fabric surface confirms a multilayer deposition. Additional SEM images (30-10 min) that offer further evidence for these interpretations are available in Supporting Information (FIG. 12A-12B).

Figure 3A:
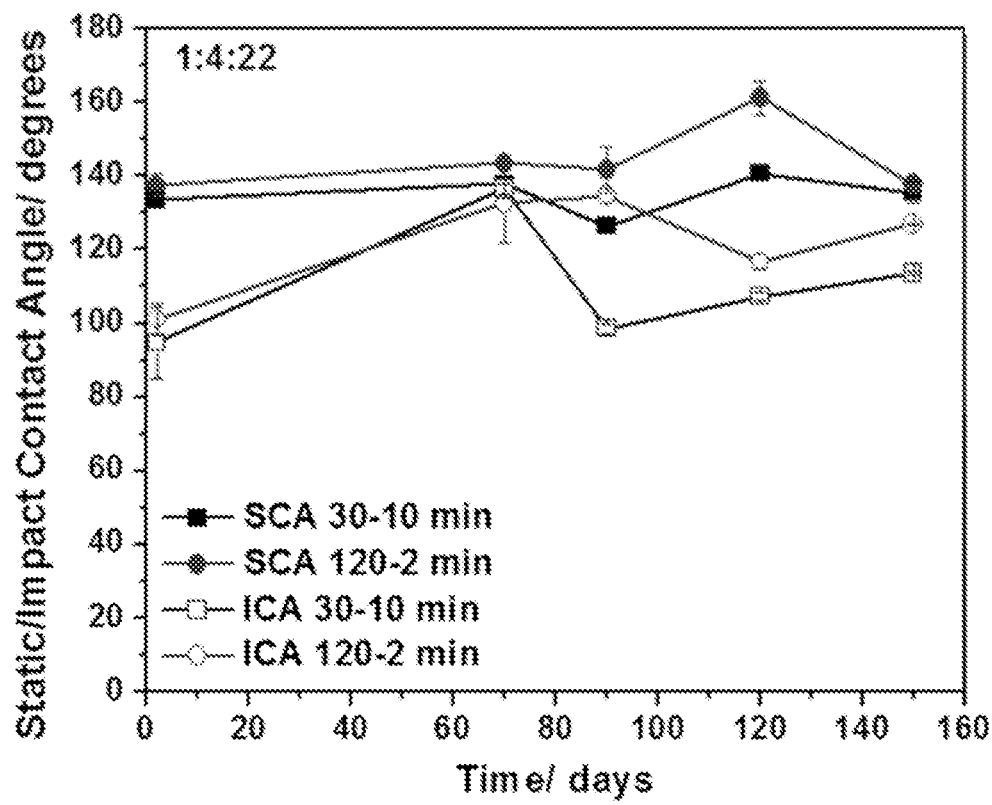
FIG. 3A-3B show effects of different coatings on SCA and ICA values. Static and impact angle values recorded over 5 months of aging for 1:4:22 (3A) and 1:25:25 (3B). Two sets of reaction and soaking times (30-10 min and 120-2 min) were selected.
Figure 3B:
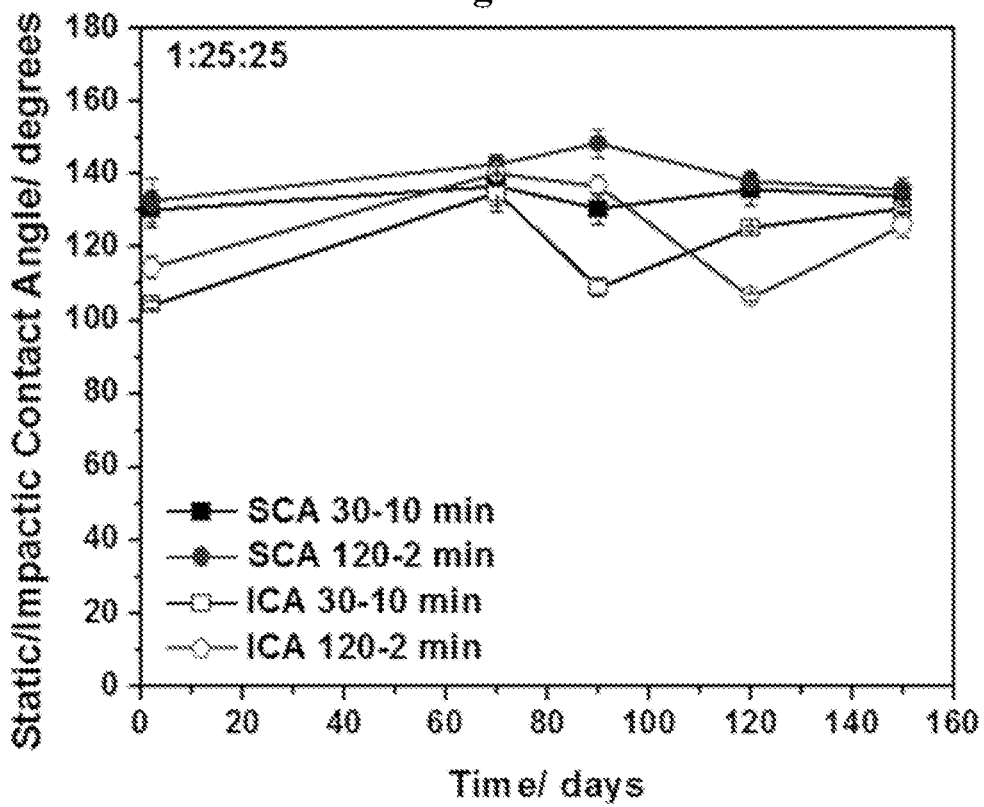

Custom Aging-Abrasion-Impact Tests. In practical applications, long-time exposure of coated fabrics to ambient conditions is critical and typically leads to a decrease and sometimes complete loss of water-repellent behavior. The four aging-tape peeling cycles applied to MTMS-coated fabrics, 1:4:22 (30-10 min, 120-2 min) and 1:25:25 (30-10 min, 120-2 min) over ~5 months allowed rigorous evaluation of the extent to which long-term abrasion and aging affect SCA-ICA and PSCA-PICA. This approach also mimics exposure of snake skin to various abrasion conditions between sequential shedding. Irrespective of the reaction and soaking times (30-10 min vs. 120-2 min), the fabric preserved a highly hydrophobic character (FIG. 3A-3B). An interesting and unexpected feature was observed during/after aging tests under both static and impact conditions: the slight increase in hydrophobic character of the two coatings, especially that of 1:4:22, when compared to their initial behavior. In addition, the SCA-ICA difference was less pronounced for 1:25:25 (FIG. 3B) when compared to 1:4:22 (FIG. 3A). These results demonstrated that the water repellent behavior of an MTMS-based coating was not affected by the ambient conditions over a long period of time.

Figure 4A:
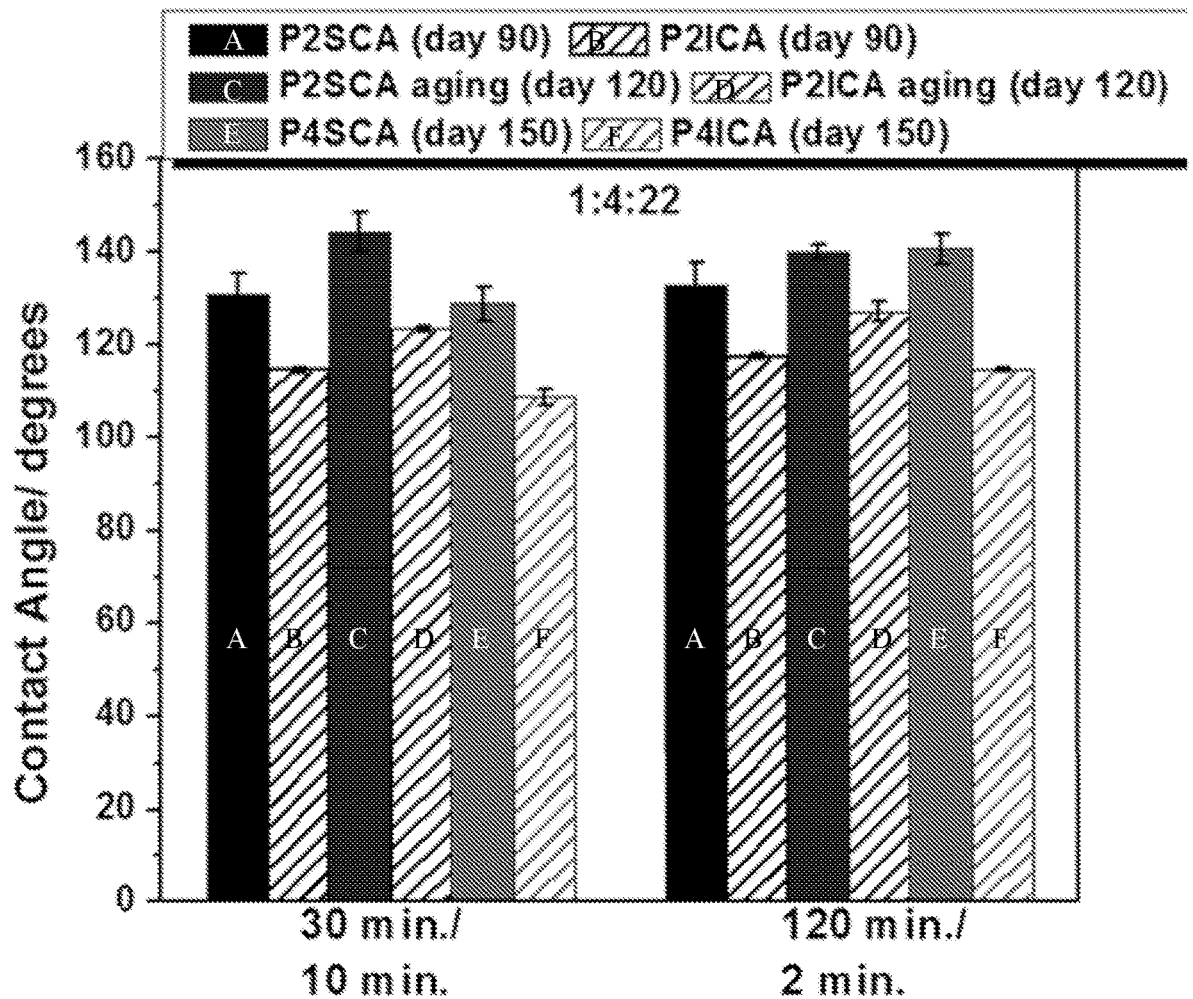
FIG. 4A-4D show static/impact contact angles before/after the second peeling (P2) and after the fourth peeling (P4). (4A, 4C); SEM images for 1:4:22 (4B) and 1:25:25 (4D) coating formulations after P4. Top left insets (4B and 4D) show high magnification images of coated fibers. Bottom left insets (4B and 4D) display the appearance of water droplets (4 µL) used to measure P4SCA.
Figure 4B:
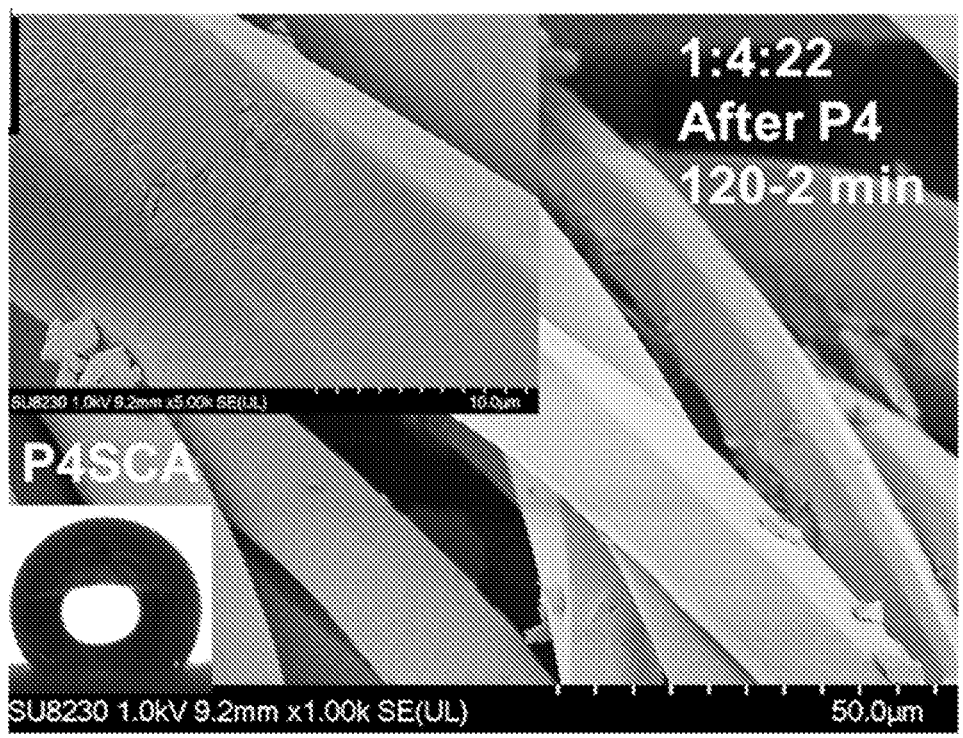
Figure 4D:
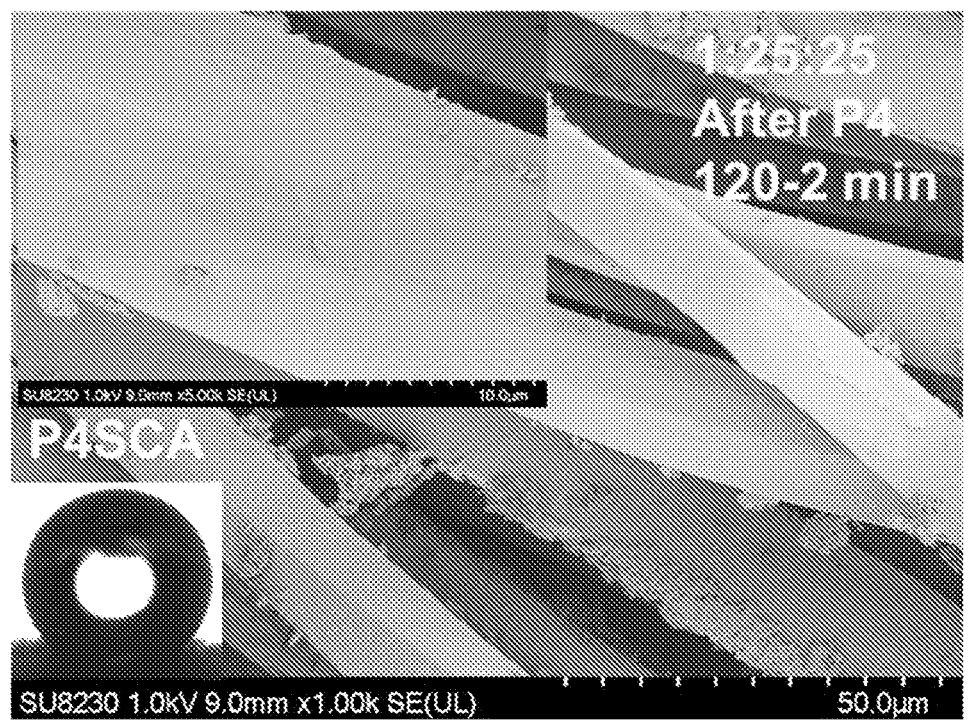
Figure 4C:
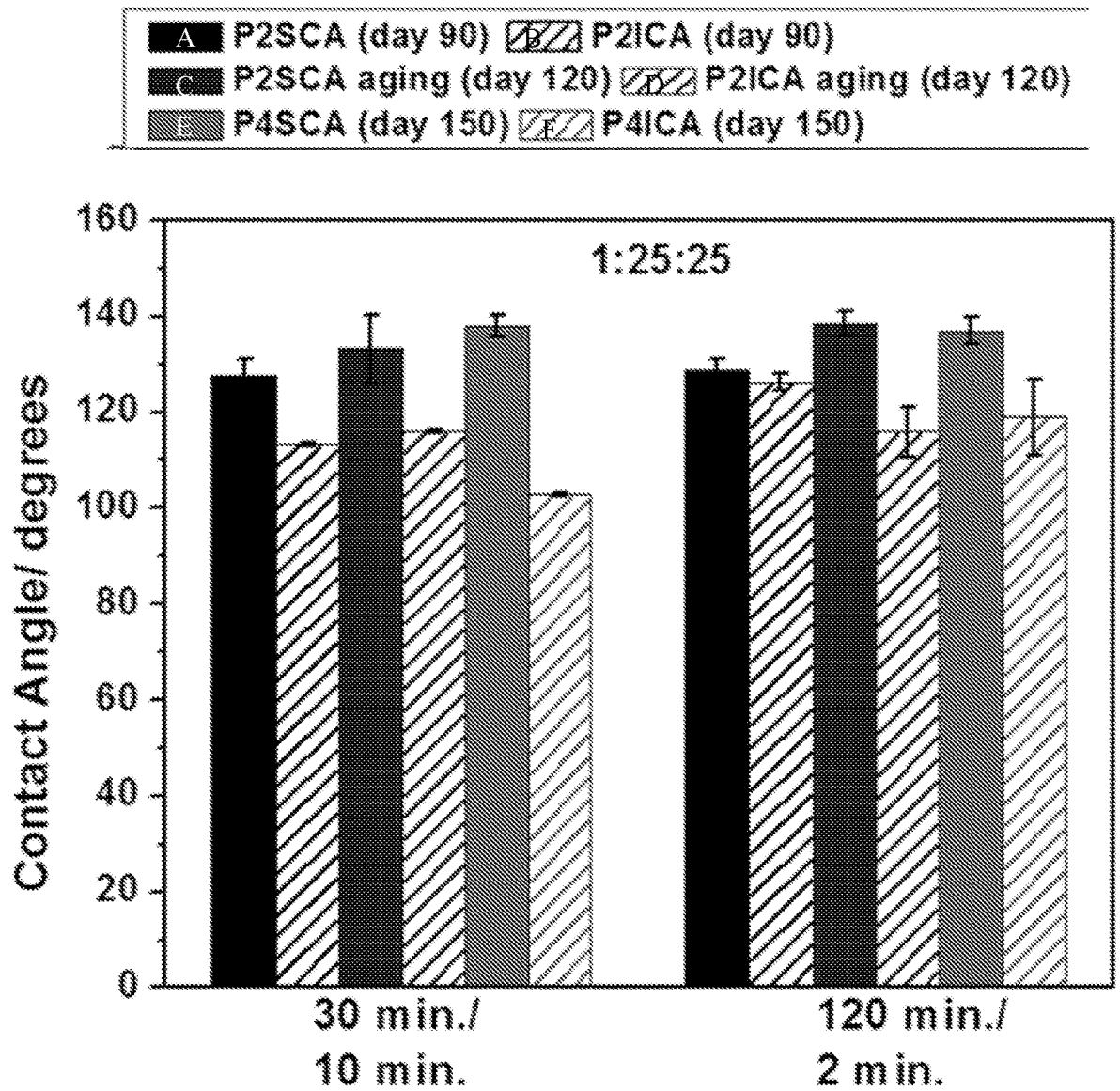
Figure 13A:
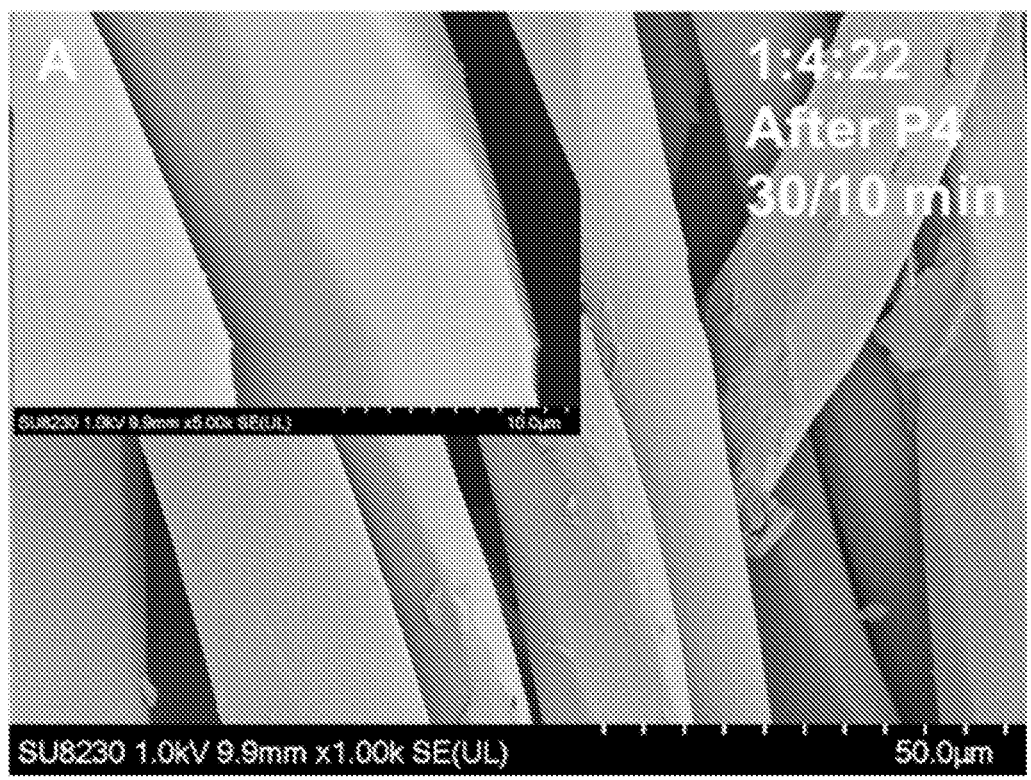
FIG. 13A-13B show SEM images of 1:4:22 (30-10 min) (13A) and 1:25:25 (30-10 min) (13B) coated samples after the fourth peeling test (P4).
Figure 13B:
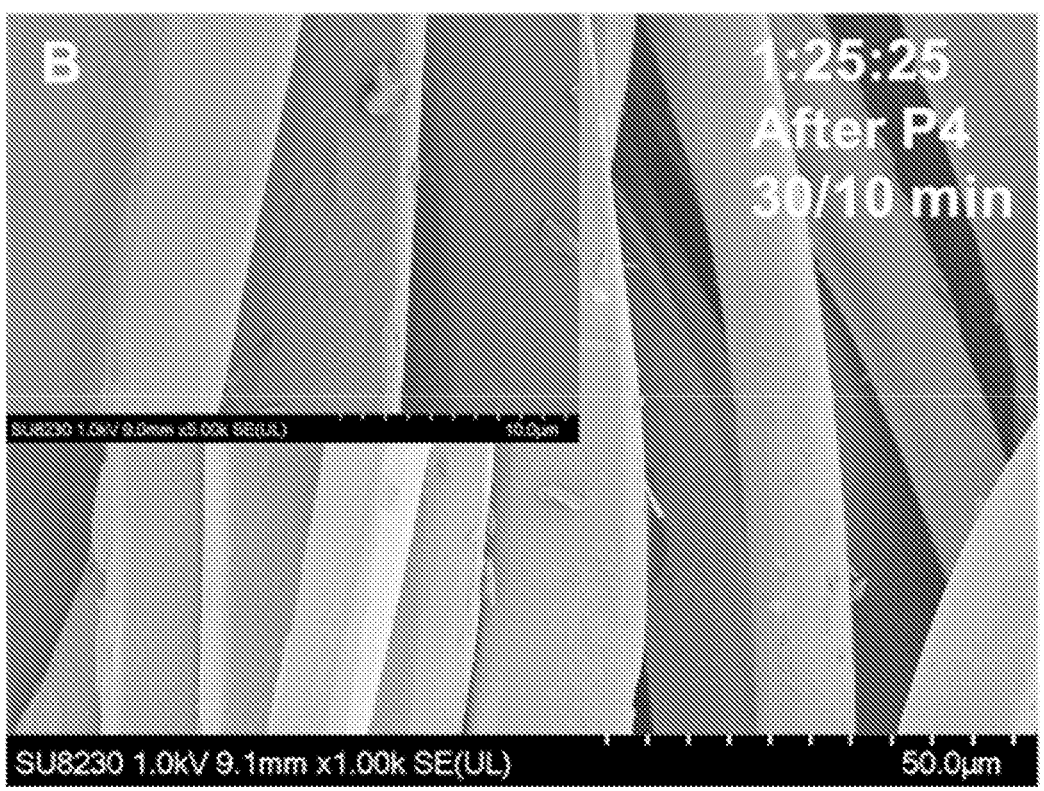

FIG. 4A-4D shows PSCA-PICA values for sequential peelings that tested the liquid adhesion and mechanical resistance of the coated fabric during aging, abrasion, and impact conditions. The aging time between each peeling was ~30 days. FIG. 4A indicates that static contact angle values of the 1:4:22 formulation after the second peeling were comparable to those recorded without peeling (Table 2). The values increased during aging and remained constant at 129.0°±3.6° (30-10 min) and 141.0°±3.0° (120-2 min) after the fourth peeling (P4SCA, day 150). At day 90, the P2SCA values were centered at 131.0°±4.5° (30-10 min)–132.5°±5.2° (120-2 min) and, after aging at day 120, were observed at 145.0°±4.3° (30-10 min)–140.0°±1.6° (120-2 min). Under impact conditions, P2ICA (day 90 and day 120) and P4ICA (day 150) followed relatively closely the values recorded in the static mode, indicating low liquid adhesion to the surface. The same trend was displayed by the 1:25:25 (FIG. 4C) coating but PICA values were slightly lower than those recorded for 1:4:22. These trends suggested that sequential peeling-aging did not affect the fabric's highly water-repellent behavior over a long time period. The enhancement in contact angle values during aging indicated that changes in surface chemistry and morphology likely generate the observed water repellency. SEM images revealed that sequential peelings did not physically damage the fabric construction and bundling. The top coat layers evident before peeling were shed from the fabric surface for both 1:4:22 (FIG. 4B) and 1:25:25 (FIG. 4D), respectively (FIG. 13A-13B for 30-10 min). A thin layer of MTMS-based coating appeared to wrap the fabric and displayed distinct roughness (insets, FIGS. 4B and 4D).

Figures 5A, 5C, 5E:
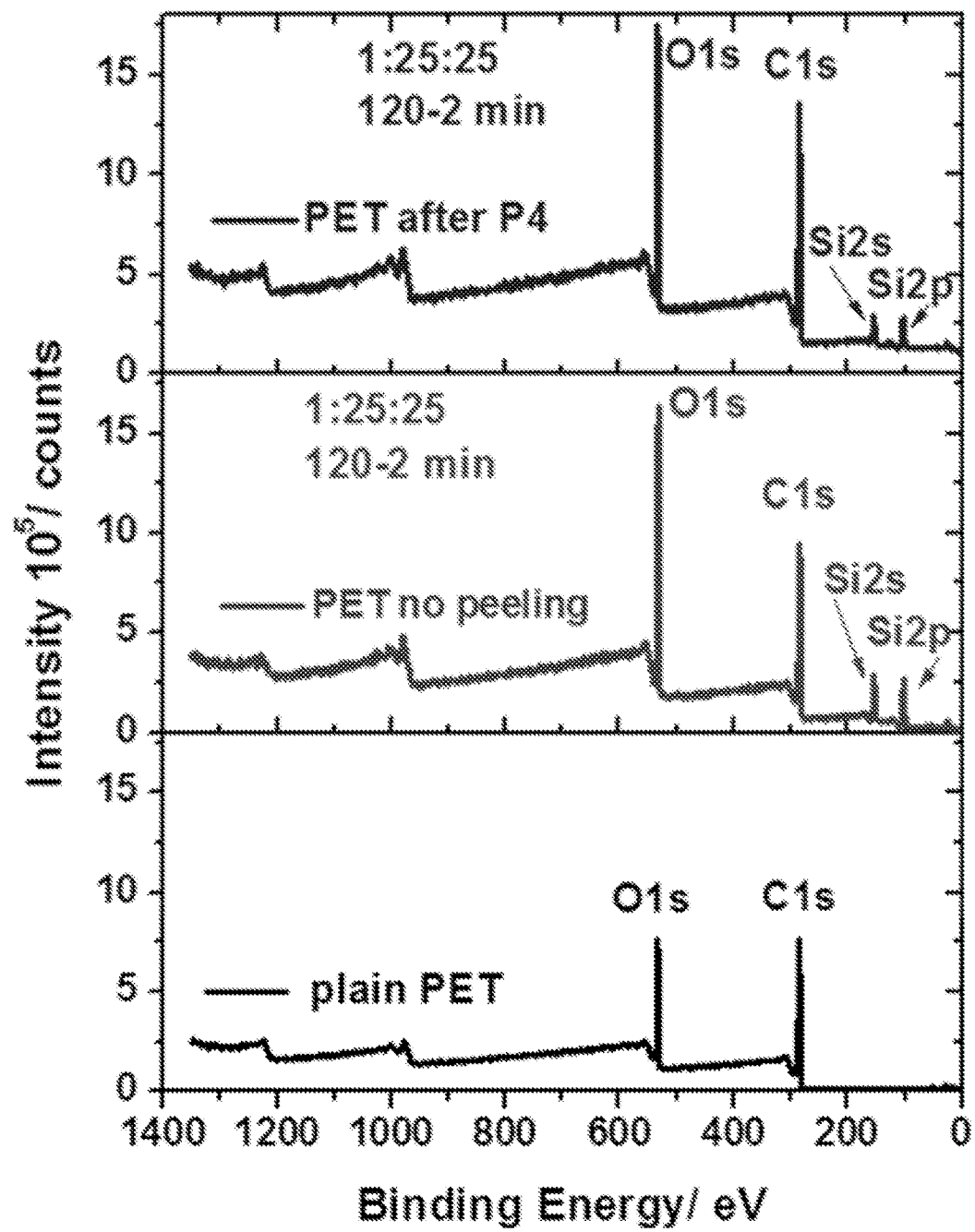
FIG. 5A-5F show chemical compositions of uncoated and coated surfaces before and after peeling. XPS survey and high-resolution spectra of plain PET (5E, 5F), coated PET before (5C, 5D) and after the fourth peeling (P4) (5A, 5B).
Figures 5B, 5D, 5F:
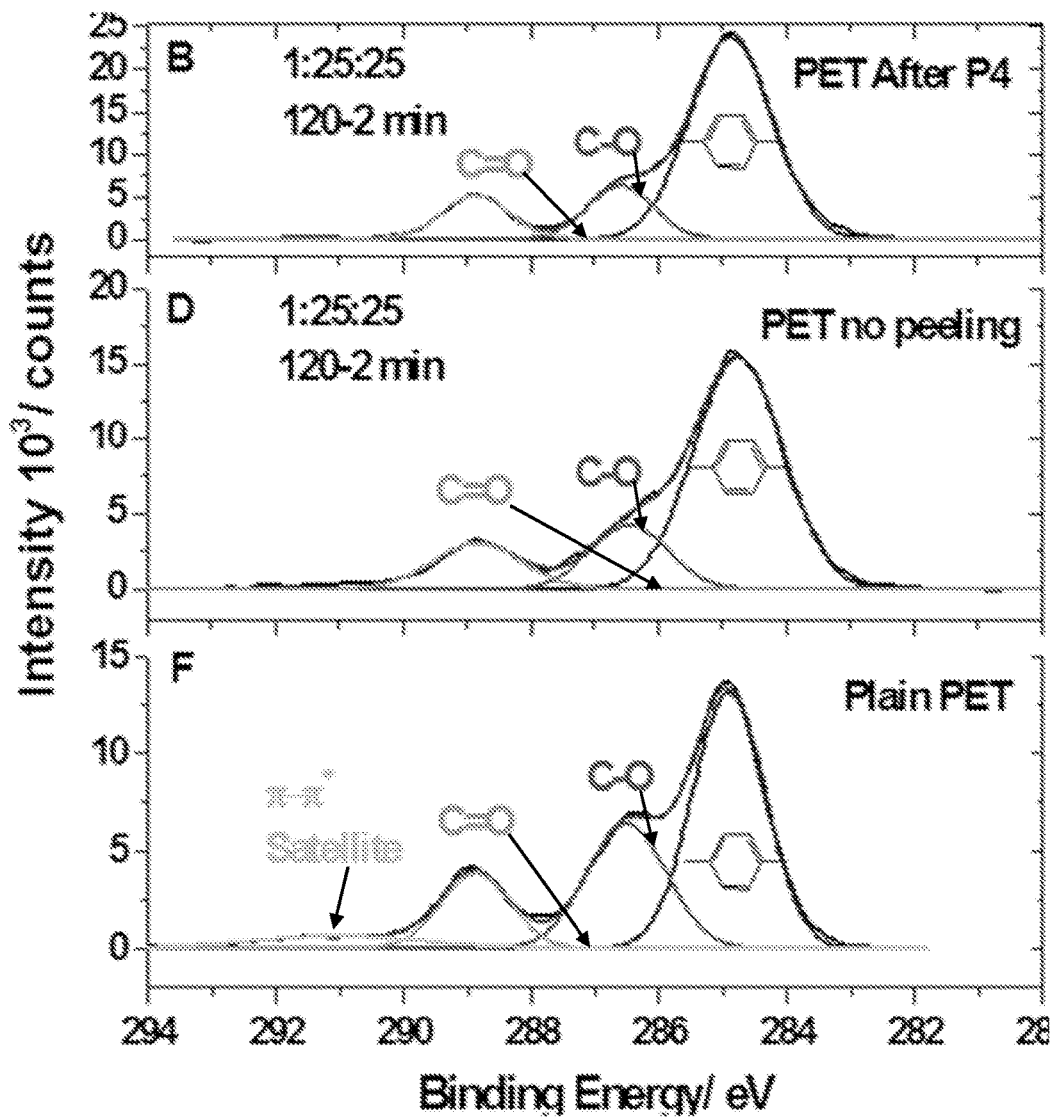

In order to determine whether the coating survives repeated peeling, XPS was employed to investigate the chemical composition of the plain PET and coated samples, without abrasion and after the fourth peeling (FIG. 5A-5F). As expected, the unmodified PET contained only two elements, carbon (C 1 s) and oxygen (O1s), as shown in the survey spectrum (FIG. 5E). The binding energies associated with the characteristic C=O, C—O and aromatic ring bonds were identified at 288.9, 286.4 and 284.9 eV in the high-resolution spectrum by a peak deconvolution algorithm (FIG. 5F); the satellite π-π* signal was also detected. The presence of the MTMS coating was evidenced by the occurrence of the silicon peaks (Si2s, Si2p), a significant increase in the O1s intensity (FIG. 5C), and slight C1s peak broadening observed in the high-resolution scan (FIG. 5D). Peak fitting did not discern a reliable separation of the PET's aryl and C—Si signals. After peeling, the survey (FIG. 5A) and high-resolution (FIG. 5B) spectra did not reveal marked changes. Accurate peak deconvolution (FIG. 5D) was difficult, due to small binding energy difference between C=C bonds of the PET aromatic ring and C—Si bond from MTMS (~1 eV). A slight decrease in the Si2s and Si2p signals coupled with a small increase in the C1s peak intensity indicated that coating is still present at the fabric surface. The variation in atomic composition is another indicator of changes in surface chemical species. Table 6 shows that the carbon content decreased from ~76% in unmodified fabric to ~52.5% in the coated homologue and then increased to 62.5% after tape peeling.

TABLE 6

Sample, Atomic Composition, C:O Peak Height Ratio and C:O Area Peak Ratio for Plain PET, Coated PET and PET after P4.

| Sample | Atomic Composition/% | | | Peak Height C:O ratio | Area Peak C:O Ratio |
|---|---|---|---|---|---|
| | C | O | Si | | |
| Plain PET | 75.9 | 24.0 | — | 1.10 | 3.16 |
| PET no peeling | 52.4 | 33.2 | 14.3 | 0.59 | 1.57 |
| PET after P4 | 62.5 | 29.1 | 8.3 | 0.79 | 2.14 |

The silicon content decreased from ~14.3% (coated PET) to 8.3% (PET after P4). These data suggested that ~45% of the initial coating was still present at the fabric surface after all peelings. This percentage was compared to the variation in thickness as evaluated from SEM images (see Table 5). Both XPS and Image J analyses are prone to artifacts associated with the penetration depth of the X-ray beam and imaging conditions. Despite such limitations, these data combined with contact angle values and SEM images confirm the high coating-to-substrate adhesion, along with mechanical robustness and durability.

Figure 6A:
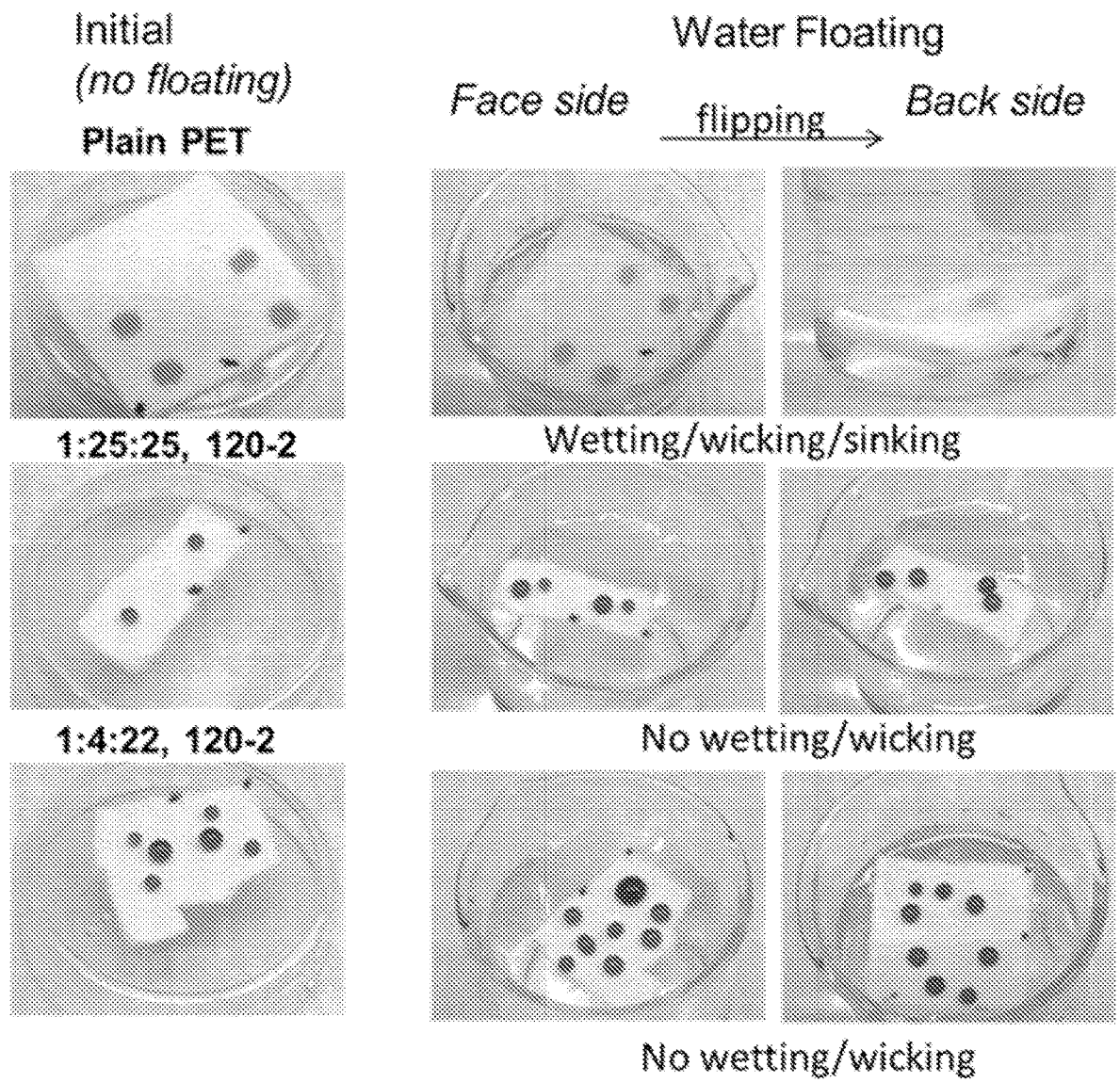
FIG. 6A-6B show results of a wicking test on coated and uncoated PET. Wicking test configuration showing the behavior of plain and modified PET (1:25:15-1:4:22, 120-2 min) (6A) and the appearance of PET (1:4:22, 120-2 min) immersed in water (6B). The legend shows both the peeled fabric area and the one kept as control (no peeling).
Figure 6B:
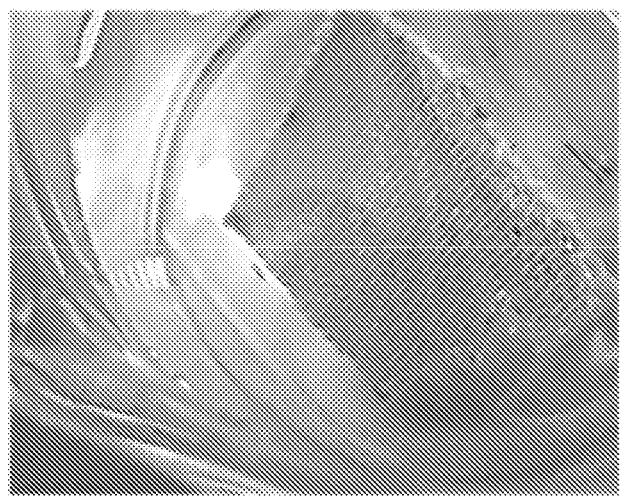

Wicking Test. Another simple method to investigate the effect of sequential aging-peeling cycles on fabric ability to effectively repel water is the wicking test (FIG. 6A-6B). Plain and modified PET fabrics were placed on an air-water interface (FIG. 6A). As expected, due to its weak hydrophobic nature, the plain PET was rapidly wetted and wicking caused rapid sample submersion. In contrast, both coated PET (face side) floated at the interface and remained afloat while carrying water droplets that were either carefully placed (blue) or impinged from 5 cm height (red). Floating persisted after the fabrics were flipped (back side). Droplets were not able to penetrate through the PET surface and bridge with the underneath bulk water. Conceivably, the observed fabric resistance to wicking indicates fast dewetting caused by the presence of hydrophobic MTMS-based coating. In support, 1:4:22 (120-2) PET that was intentionally immersed in water showed the presence of small air pockets typically associated with hydrophobic porous materials (FIG. 6B).

Custom Laundry Tests. The laundering durability of the two fabrics 1:4:22 and 1:25:25 (120-2 min) aged (5 months) and peeled (four times) was investigated by washing first with cold water (18° C., 1 h) and then with warm water and high-power detergent (44° C., 0.6% w/w, 1 h, rinse cold water 18° C., 10 min). Table 7 summarizes the SCA/ICA and P4SCA/P4ICA values recorded after washings.

TABLE 7

SCA, ICA, P4SCA and P4ICA Values for Coated Polyester 1:4:22 and 1:25:25 (120-2 min, Four Cycles Aging-Peeling Over Five Months) after Washing with Cold and Warm Water

| | 1:4:22, 120-2 min | | | 1:25:25, 120-2 min | | |
|---|---|---|---|---|---|---|
| Angle/ degrees | After P4 | Cold Water (18° C.) | Warm water (44° C.) | After P4 | Cold Water (18° C.) | Warm Water (44° C.) |
| SCA | 138 ± 4 | 136 ± 3 | 134 ± 2 | 136 ± 3 | 142 ± 5 | 133 ± 3 |
| ICA | 127 ± 1 | 127 ± 2 | 122 ± 2 | 126 ± 3 | 131 ± 3 | 122 ± 2 |
| P4SCA | 141 ± 3 | 133 ± 2 | 136 ± 2 | 137 ± 3 | 143 ± 5 | 138 ± 3 |
| P4ICA | 115 ± 1 | 125 ± 3 | 125 ± 1 | 119 ± 7 | 132 ± 4 | 129 ± 2 |

Figure 14:
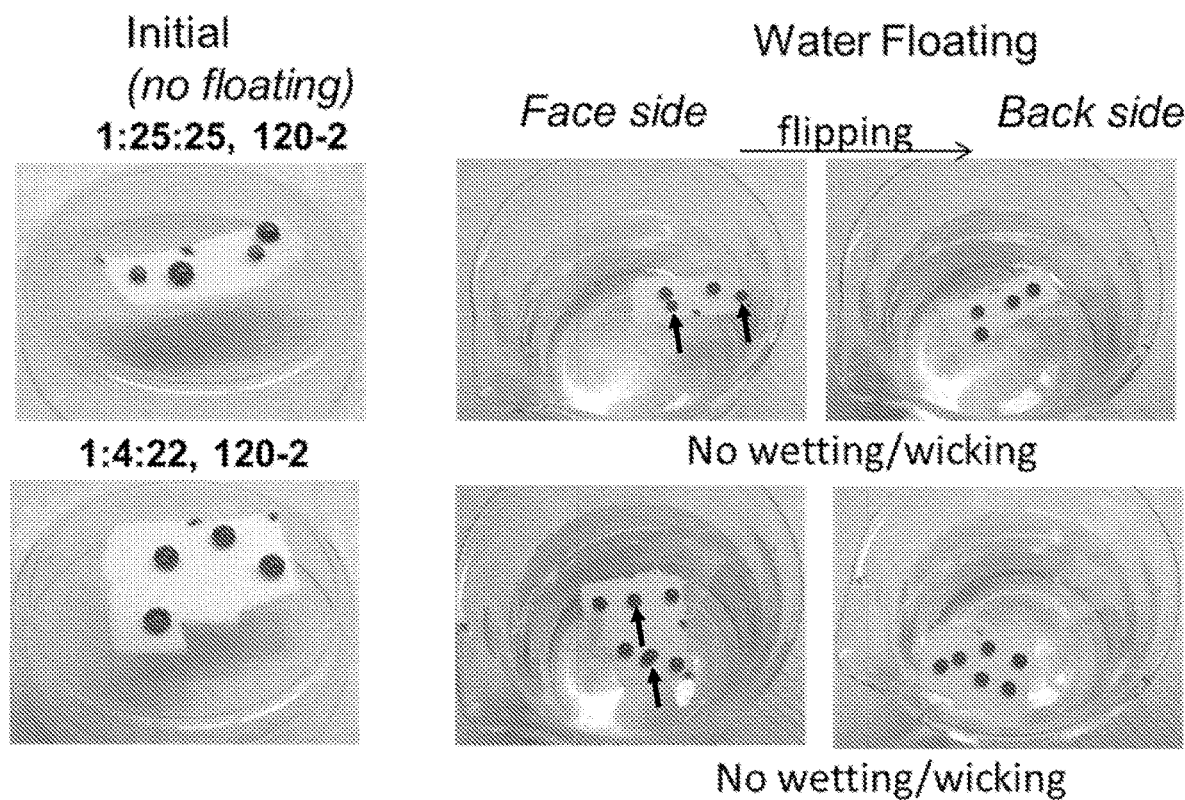
FIG. 14 shows a wicking test performed for 1:25:25 and 1:4:22 (120-2 min) coatings after washing with warm water and high-power detergent (44° C., Gain-Original, 0.16 wt % for 1 h then rinse with cold water 18° C. for 10 min). The fabrics were first subjected to laundry in cold water (18° C. for 1 h). Droplets indicated by an arrow were impinged from 5 cm height to the fabric surface, while all other droplets were set normally.

Friction with both cold and warm water did not alter the ability of the polyester fabric to repel water. SCA/P4SCA did not change due to washings. ICA decreased slightly when washing was performed with warm water versus cold water. Contrary to what may be expected, the P4ICA values after laundry for both formulations indicate improved surface resistance to liquid adhesion (smaller SCA-ICA difference). Wicking tests performed after washings support these results (FIG. 14). Therefore, these laundry tests provide further evidence that MTMS-based coating is strongly bound to the PET surface and exhibits excellent durability and resistance to abrasion.

Exposure to Prolonged Heat. In order to mimic snake skin-like exposure to natural elevated temperature/heat, coated PET was subjected to rougher and prolonged thermal treatment (100° C., 18 h). This test is also relevant for coated fabrics commercial applications where exposure to high temperatures often occurs during ground transportation. Freshly made samples that were not subjected to sequential aging-peeling cycles showed enhanced water repellency after thermal treatment. As listed in Table 7, SCA/PSCA values recorded after equilibration at ambient conditions (3 h) were centered at 146.0°/144.0° (1:4:22, 120-2 min) and 137.5°/138.5° (1:25:25, 120-2 min) higher than initial ones shown in Tables 2 and 4 137.5°/119.0° (1:4:22, 120-2 min) and 132.5°/122.0° (1:25:25, 120-2 min). Similar trend was observed for ICA/PICA values. After one week, the contact angles were in the same range as after 3 h, likely due to the inability of moisture to adhere to and penetrate through the porous fabric surface. SCA/P4SCA values for the aged-peeled samples after 3 h (Table 8) were slightly elevated relative to the ones after warm washing (Table 7). The same tendency was followed by ICA/P4ICA, except for 1:25:25 (120-2 min). After one week, samples retained their high water repellency, slightly higher than that recorded after warm laundry.

Figure 15A:
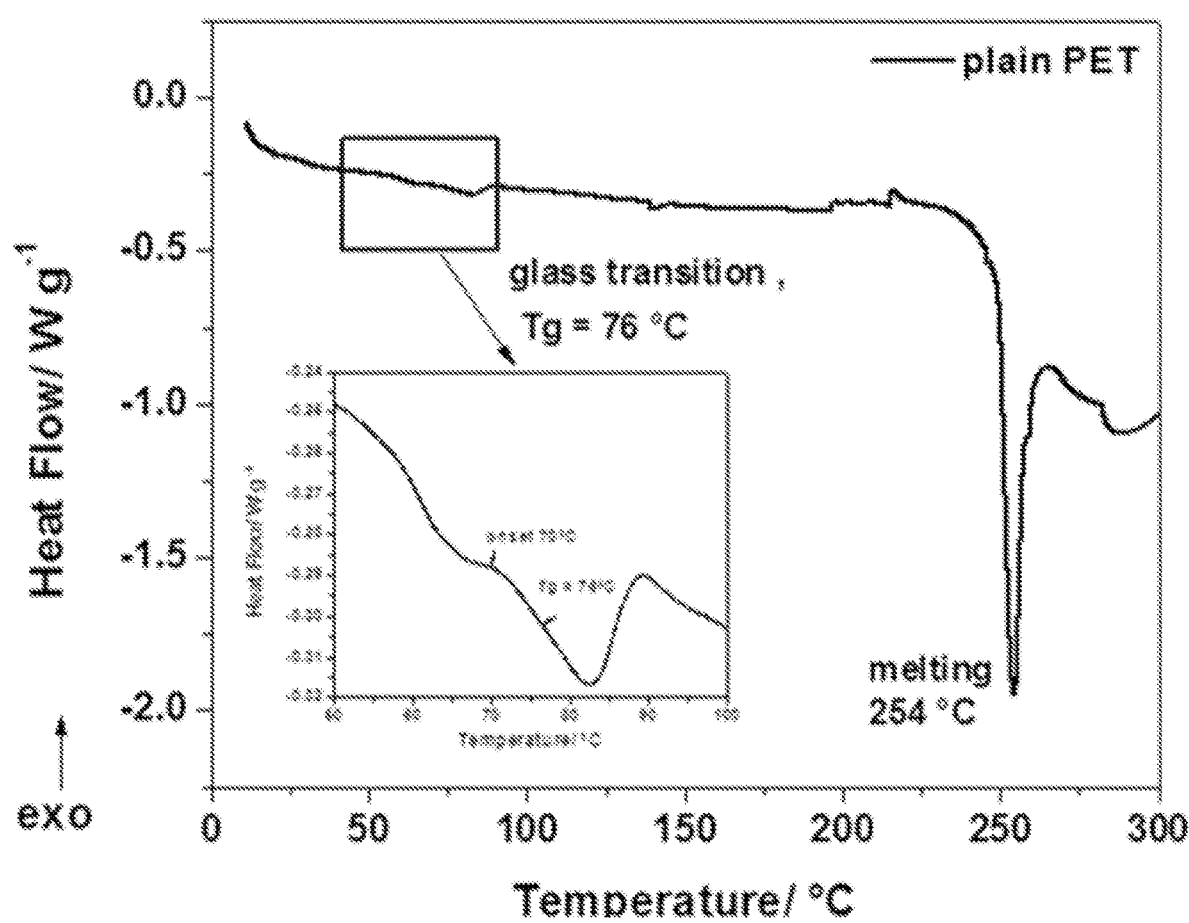
FIG. 15A-15B show differential scanning calorimetry traces recorded in heating mode (15A) and derivative heat flow (15B). The heat flow rate was 5° C. min.
Figure 15B:
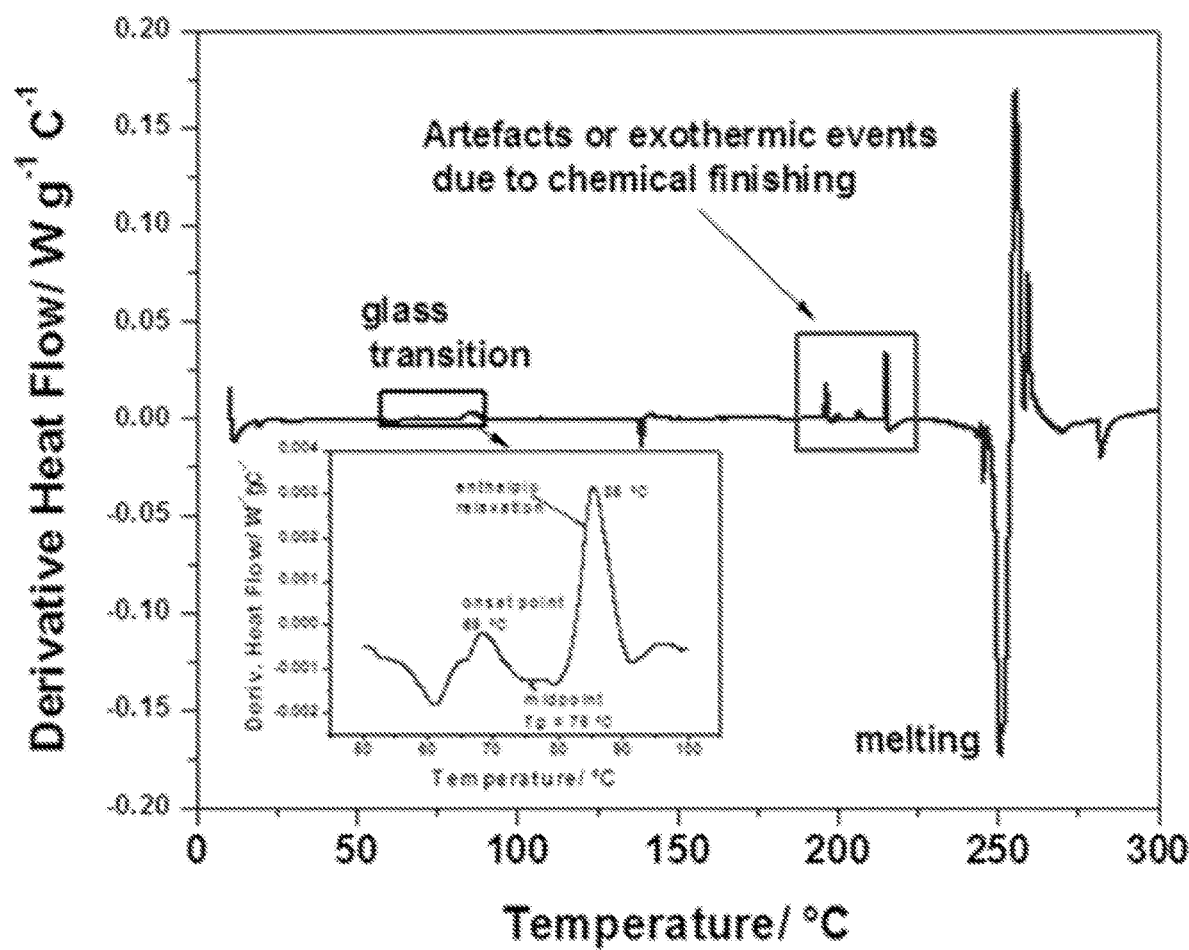
Figures 16A, 16B, 16C:
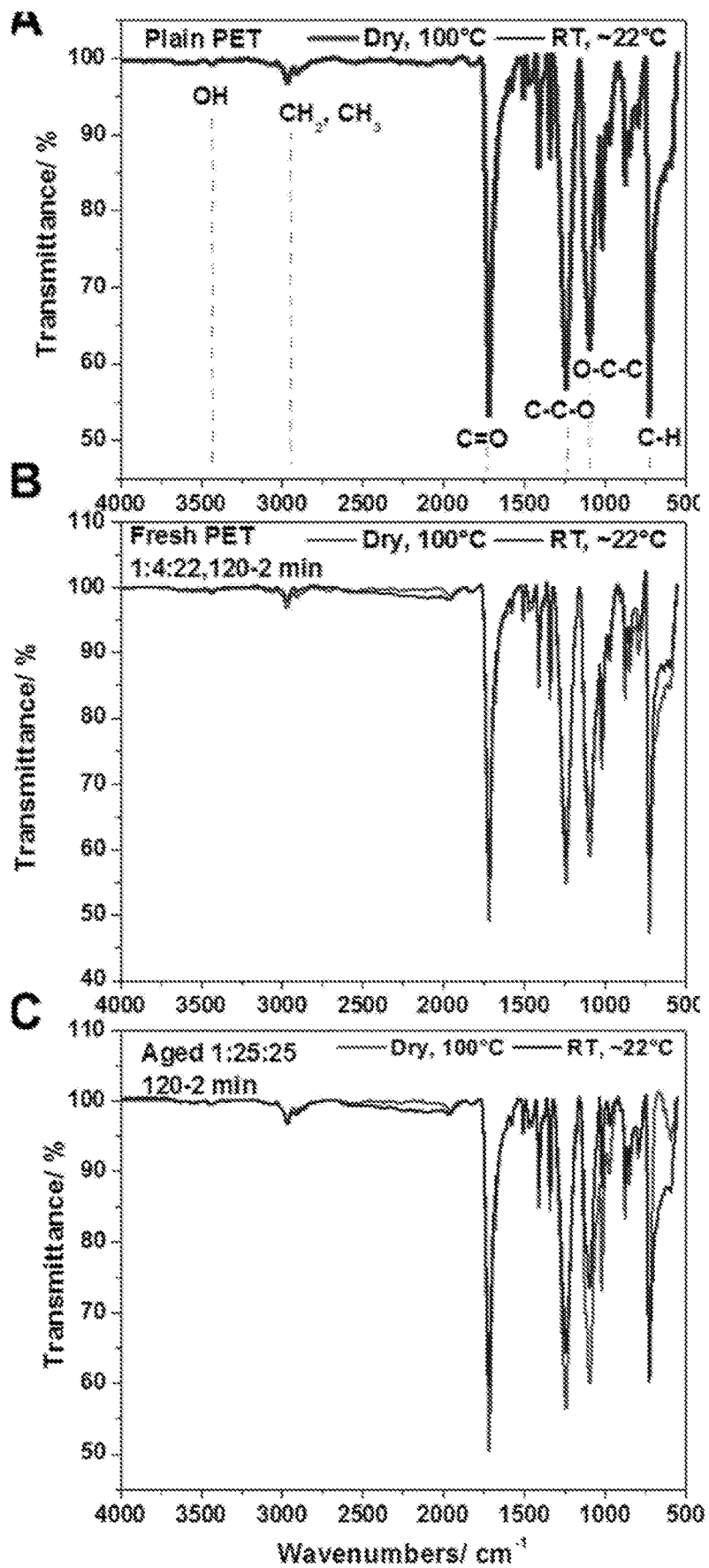
FIG. 16A-16C show FTIR traces of plain PET (16A), freshly coated PET (1:4:22, 120-2 min, 16B) and aged-peeled coated PET (1:25:25, 120-2 min, 16C).
Figure 17A:
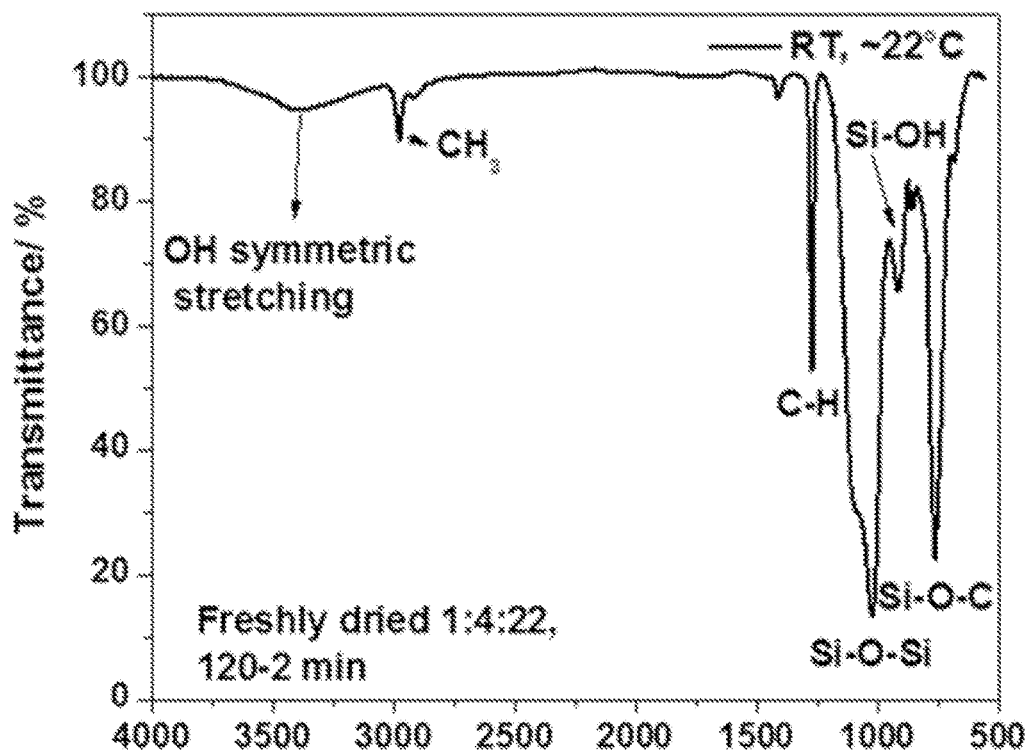
FIG. 17A-17D show FTIR spectra of dried 1:4:22 fresh (~22° C., 17A) and aged (~22° C., 100° C., 17B) and dried 1:25:25 fresh (~22° C., 17C) and aged (~22° C., 100° C., 17D) coated samples.
Figure 17B:
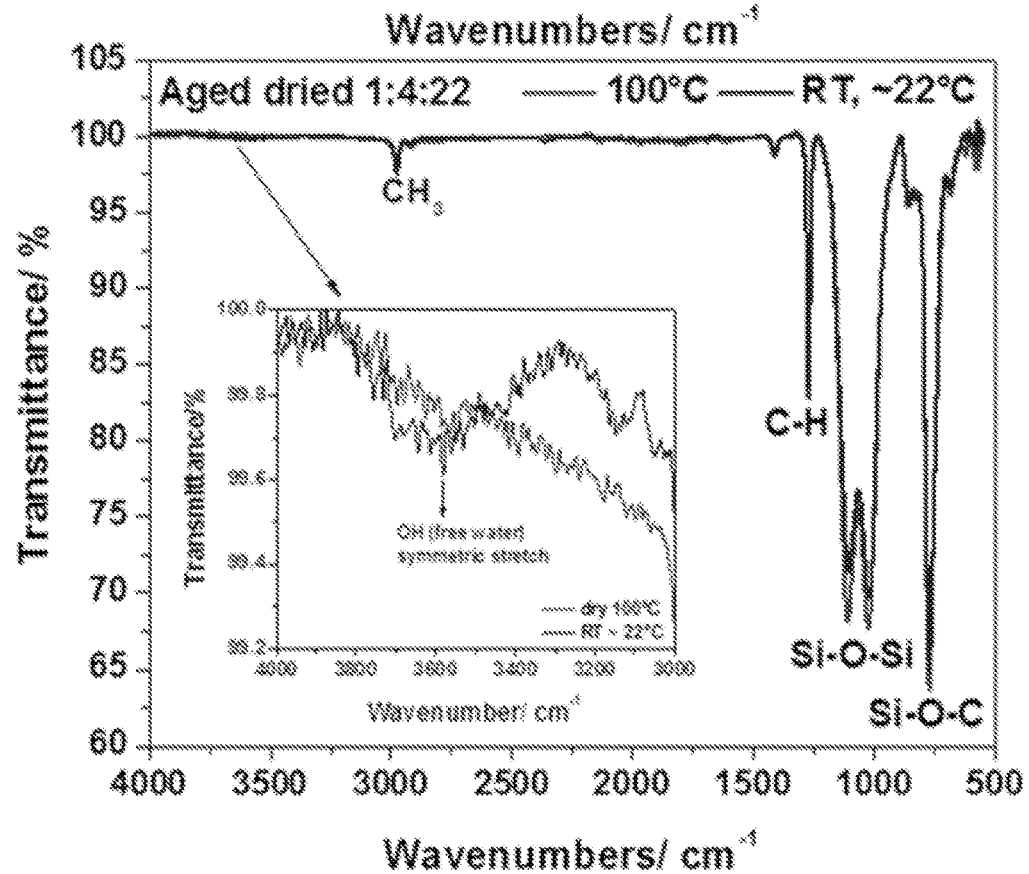
Figure 17C:
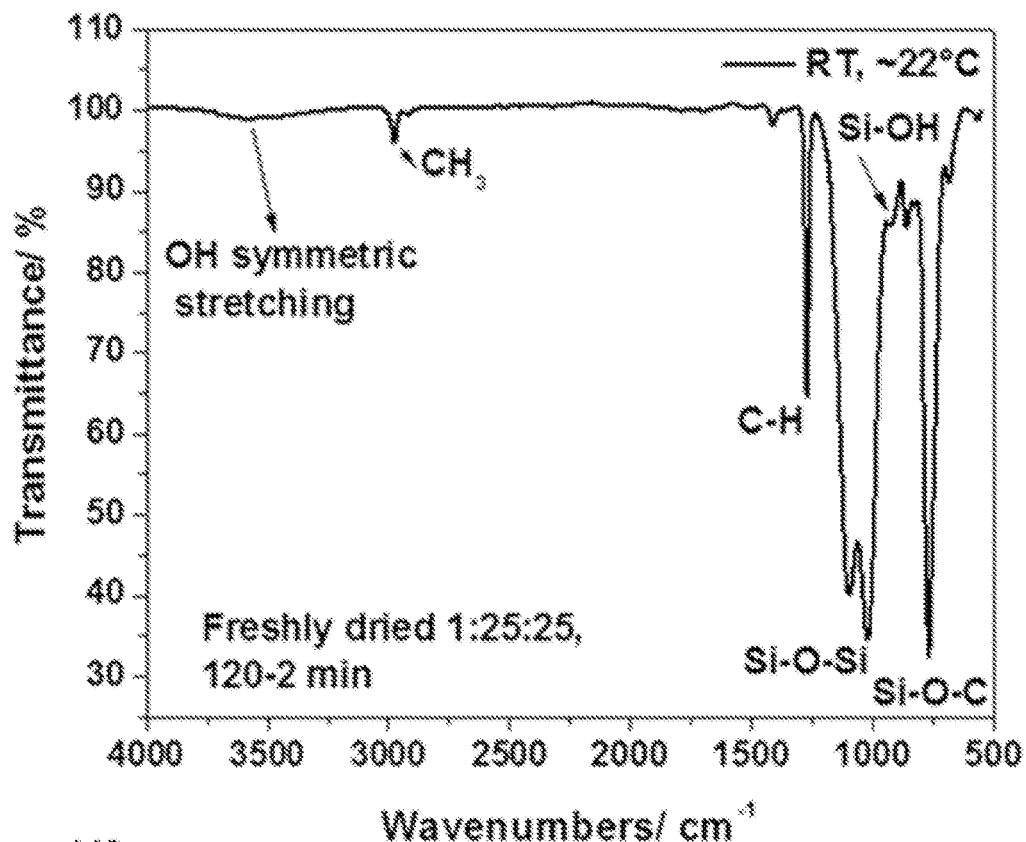
Figure 17D:
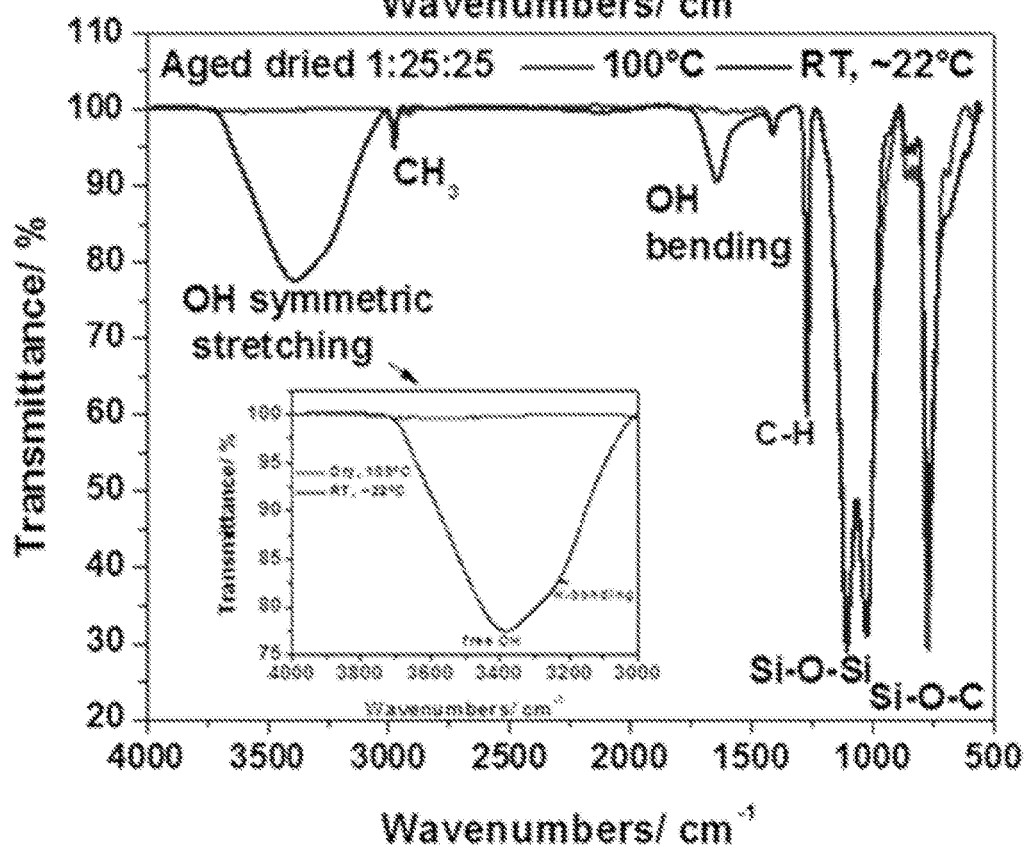

Likely, captive trace water adhered to hydrophilic patches (FIG. 1A) within the coating escapes once heated at 100° C. Furthermore, heating above the PET glass transition also affected the polymer chains within each fiber (FIG. 15A-15B). The chains became mobile; a feature that could allow molecular restructuring of Si—O—Si networks and reordering of covalently bound MTMS-derived species. It is also possible that more $CH_3$ arms may arise at the surface. These observations suggested that not only nano- and micro-scale but also molecular-level network structure plays a key role in fabric functionality. Evolution of OH and Si—O—Si vibration bands reflected by Fourier-infrared transmission spectroscopy (FTIR) confirmed these assumptions (FIGS. 16A-16C and 17A-17D). In addition, the increase in contact angle values recorded after thermal treatment qualified this approach for use in improving water repellency of MTMS-coated fabrics.

TABLE 8

Contact Angle Values for Coated Polyester 1:4:22 and 1:25:25 (120-2 min) before and after Aging-Peeling Cycles

| Contact Angle/ | 1:4:22, 120-2 min | | 1:25:25, 120-2 min | |
| --- | --- | --- | --- | --- |
| degrees | 3 h | 1 week | 3 h | 1 week |
| No Aging-Peeling | | | | |
| SCA | 146.0 ± 8.0 | 144.5 ± 3.0 | 137.5 ± 2.5 | 134.0 ± 5.0 |
| ICA | 119.0 ± 2.5 | 126.0 ± 2.5 | 128.0 ± 4.0 | 129.0 ± 2.0 |
| PSCA | 144.0 ± 2.0 | 142.5 ± 4.0 | 138.5 ± 3.0 | 142.0 ± 2.5 |
| PICA | 135.0 ± 1.0 | 124.0 ± 2.0 | 128.0 ± 2.0 | 130.5 ± 2.0 |
| After Aging-Peeling/Laundry* | | | | |
| SCA | 140.0 ± 4.0 | 132.5 ± 2.0 | 134.0 ± 2.5 | 140.0 ± 4.0 |
| ICA | 129.0 ± 2.0 | 123.0 ± 3.0 | 125.5 ± 4.0 | 118.0 ± 2.0 |
| P4SCA | 139.0 ± 1.5 | 134.0 ± 1.0 | 133.5 ± 4.0 | 136.0 ± 1.0 |
| P4ICA | 130.5 ± 3.0 | 126.5 ± 2.0 | 106.0 ± 7.0 | 126.5 ± 2.5 |

*These samples also underwent laundry before thermal treatment.

Sand Test, Impact and Aging. Mechanical abrasion resistance testing revealed no failure mode in the hydrophobic behavior of the modified PET. Yet, in nature materials interact with a variety of abradents such as sand particulates. In this regard, snake skin is not an exception. In order to investigate if and how more stringent abrasion conditions impact the coated fabric, a new custom protocol was developed: freshly coated PET (1:4:22, 120-2 min) was subjected to two cycles of aging—sand abrasion—tape peeling (AAP) (FIG. 7A-7D).

Figure 7A:
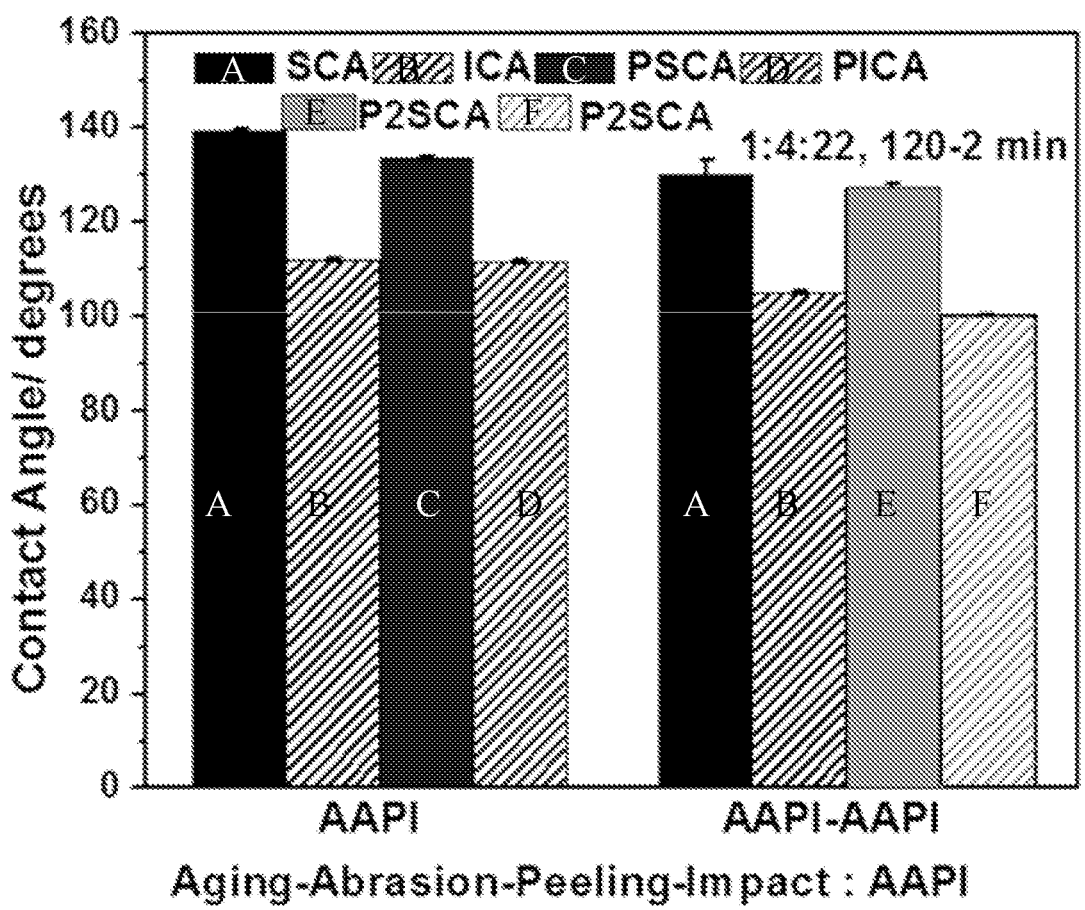
FIG. 7A-7C show the results of aging tests conducted on coated PET. Static and impact contact angle values recorded after one and two consecutive aging-abrasion-peeling tests (7A); SEM images of the PET fabric before (7B) and after (7C) peeling applied at the end of the second aging—sand abrasion cycle. Top left insets (7B and 7C) show high magnification images of coated fibers. Bottom left insets (7B and 7C) display the appearance of water droplets (4 µL) used to measure PSCA and P2SCA.
Figure 7B:
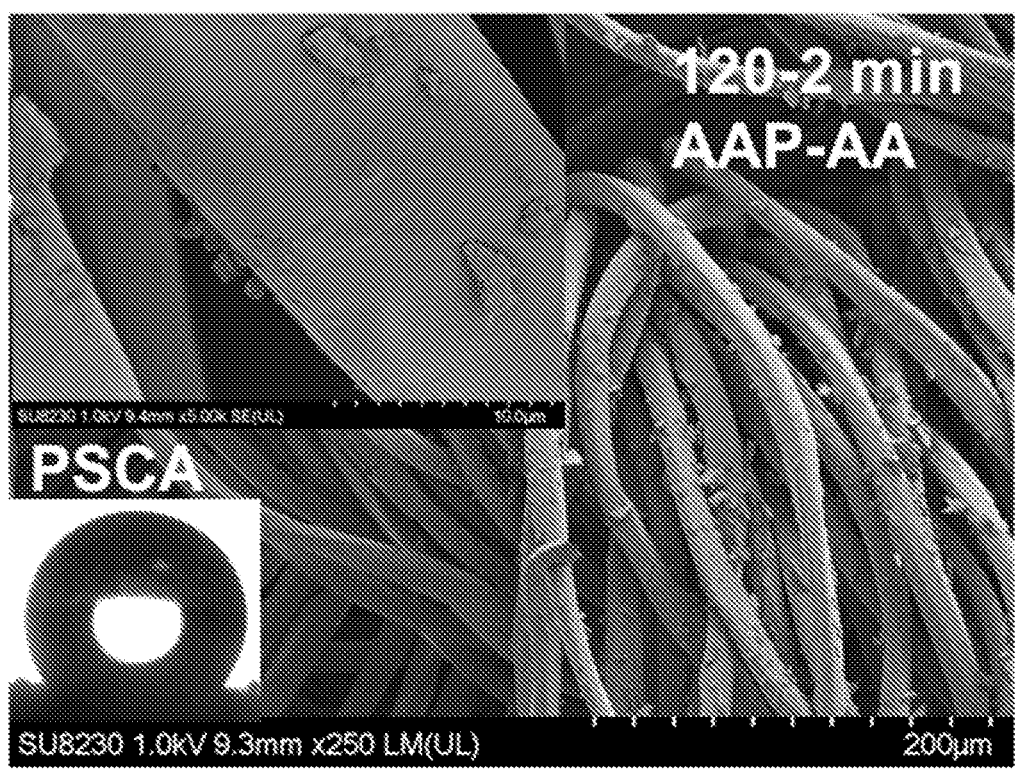
Figure 7C:
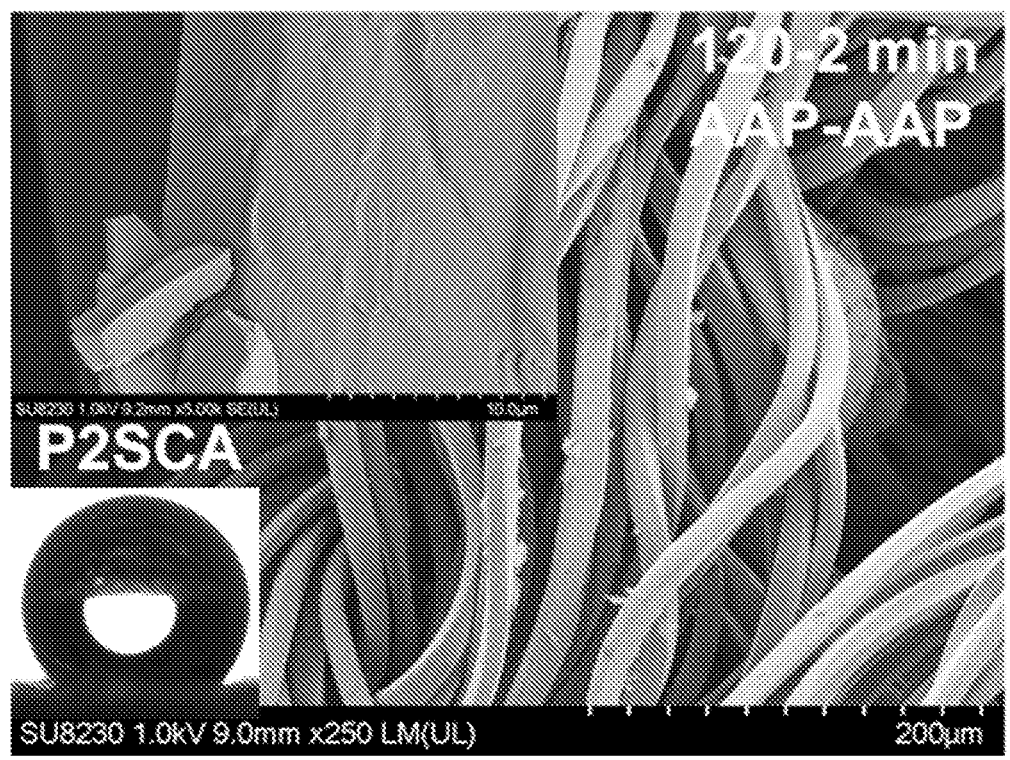

After the first cycle, SCA values were centered at 139.2°±0.5° not far from that of PSCA, 133.5°±3.0° (FIG. 7A). The ICA and PICA were almost identical and centered at 112°±0.3° (FIG. 7A). Subsequent aging (15 days) and sand abrasion did not degrade the highly hydrophobic character of the PET fabrics (FIG. 7A), although a slight decrease was observed for SCA (133.5°±0.3°) and ICA (105.0°±1.0°). P2SCA was recorded at 125.0°±1.5° and P2ICA was 100.0°±1.0°. SEM images recorded after the second cycle before (FIG. 7B) and after peeling (FIG. 7C) confirm the previous observations: abrasion removes top structured coating layers while smoother ones prime the fabric.

Figure 8A:
FIG. 8A-8B show comparative SEM images from two different coated PET samples. SEM images showing the appearance of the two 1:4:22 (120-2 min, 8A) and 1:25:25 (120-2 min, 8B) coatings at the PET fabric surface after standard abrasion resistance testing. Bottom left insets (8A and 8B) display the appearance of water droplets (4 µL) used to measure SCA.
Figure 8B:
Figure 9A:
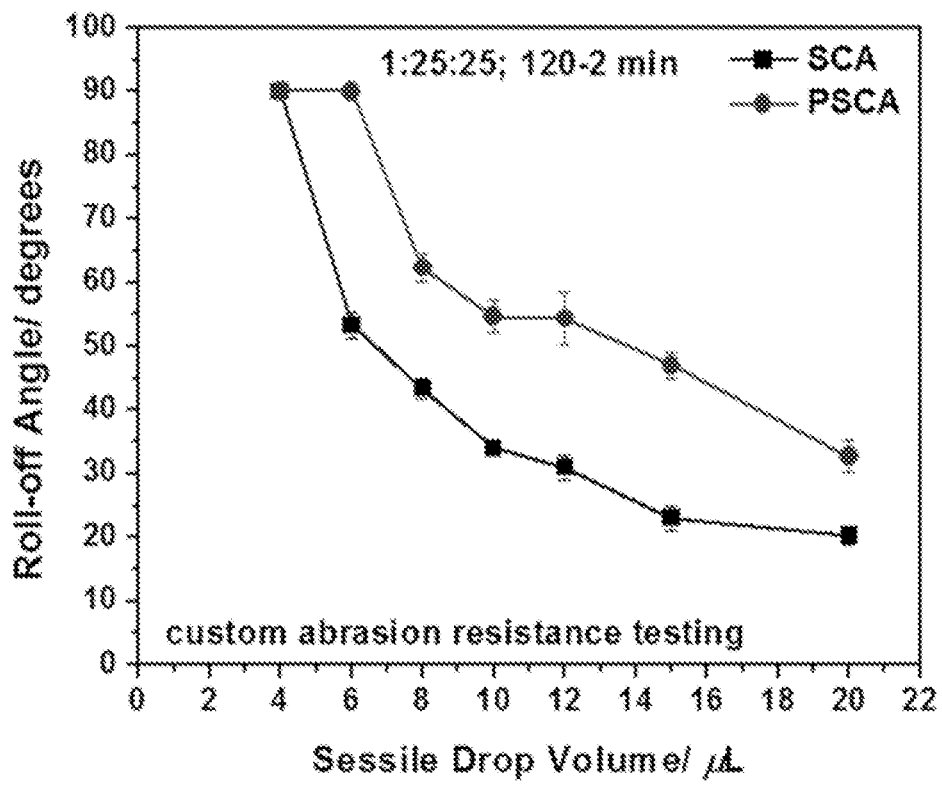
FIG. 9A-9B show roll-off angles recorded for PET (1:25:25, 120-2 min) after custom (9A) and standard (9B) abrasion resistance testing. PSCA represents an additional tape peeling applied to the abraded surfaces. The open symbols in 9B represent the surface tilt angle values at which the water drop rolled one full turn before being temporarily pinned and before its take-off (full symbols).
Figure 9B:
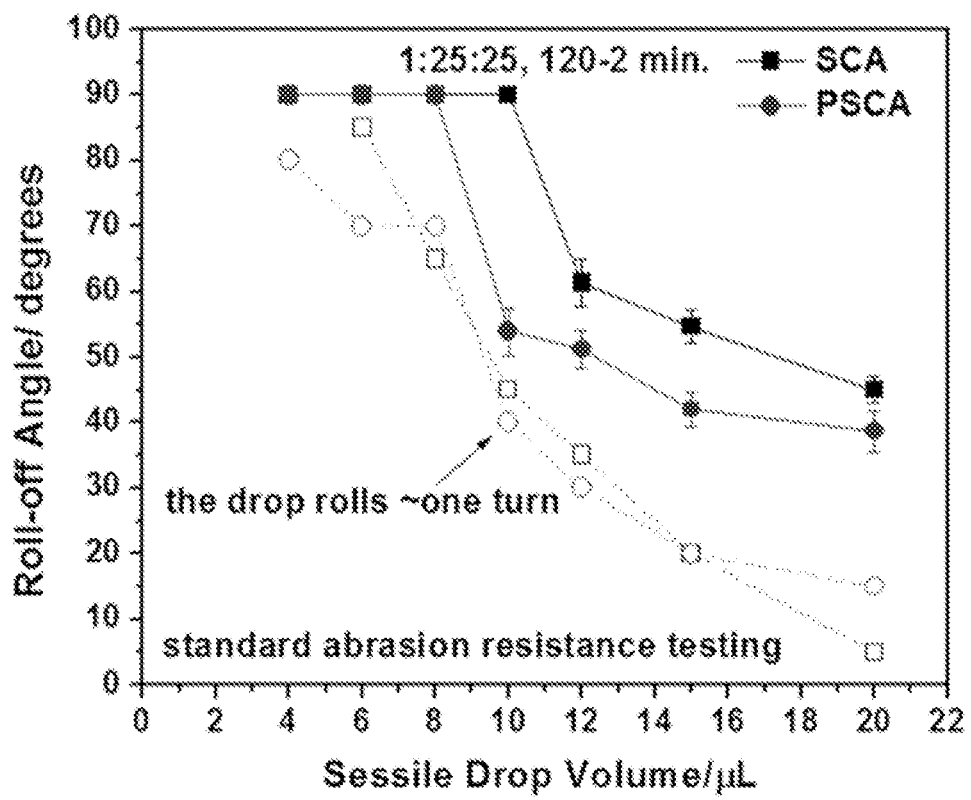
Figure 10A:
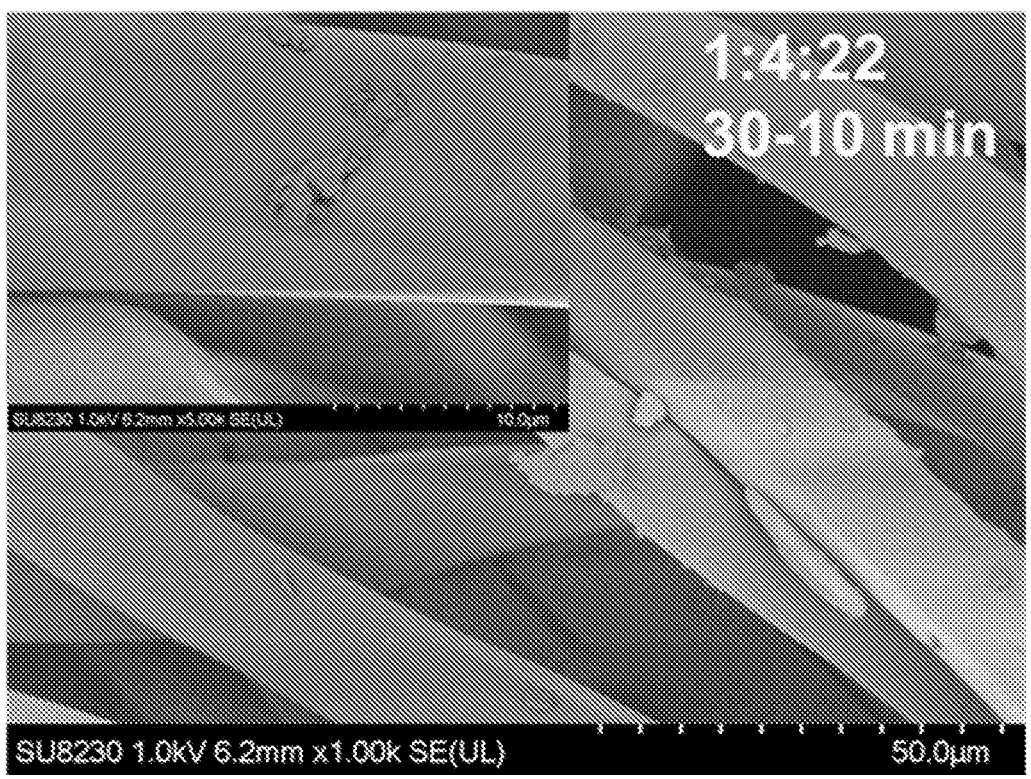
FIG. 10A-10B show SEM images of 1:4:22 (30-10 min) (10A) and 1:25:25 (30-10 min) (10B) coatings of the PET fabric surface.
Figure 10B:
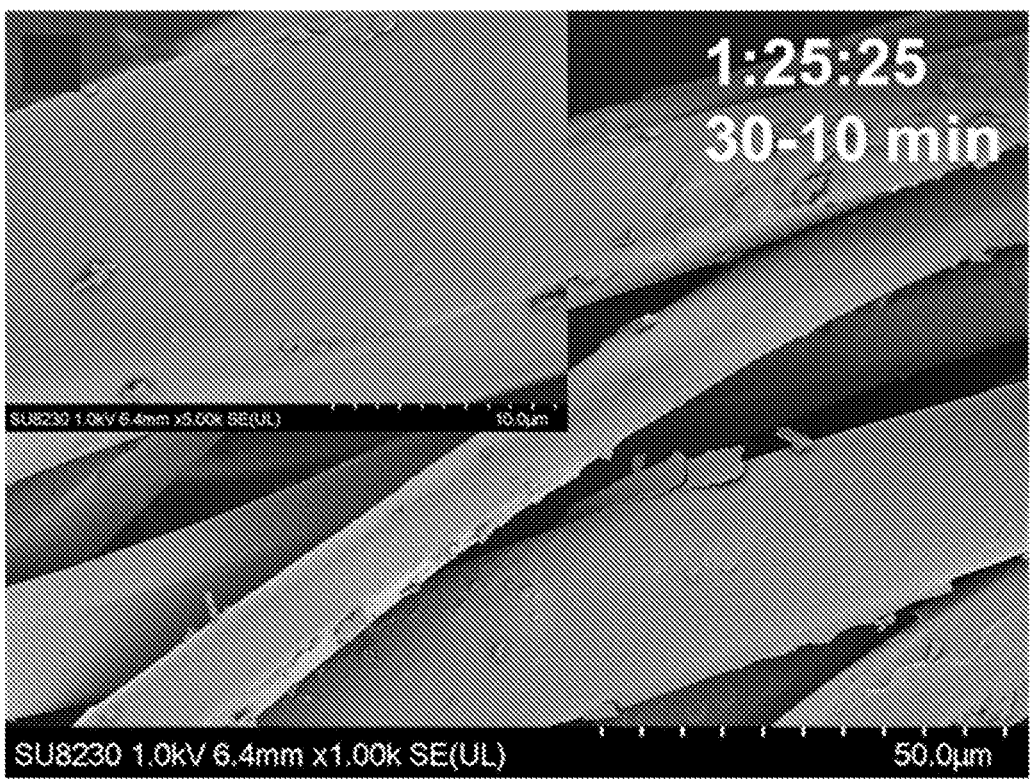
Figure 11A:
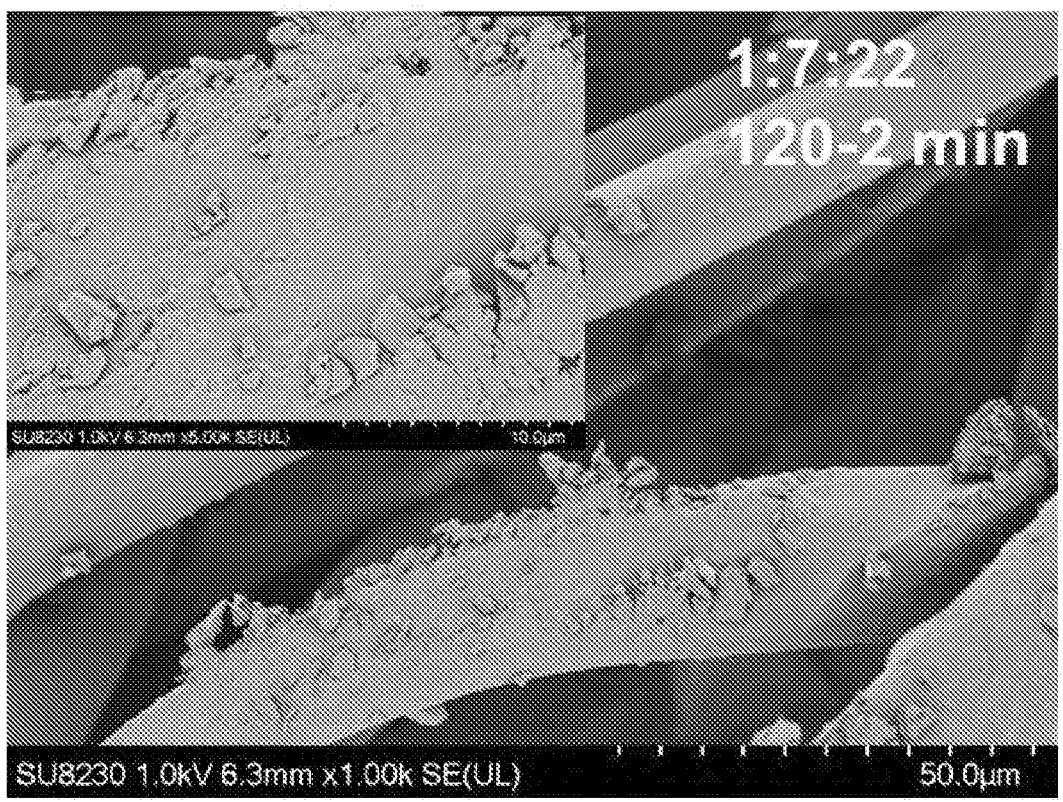
FIG. 11A-11D show SEM images recorded for samples processed for 120-2 reaction-soaking (R-S) time: MTMS pre-dilution 1:7:22 (11A), 1:10:22 (11B) and no MTMS pre-dilution 1:5:25 (11C), 1:30:25 (11D).
Figure 11B:
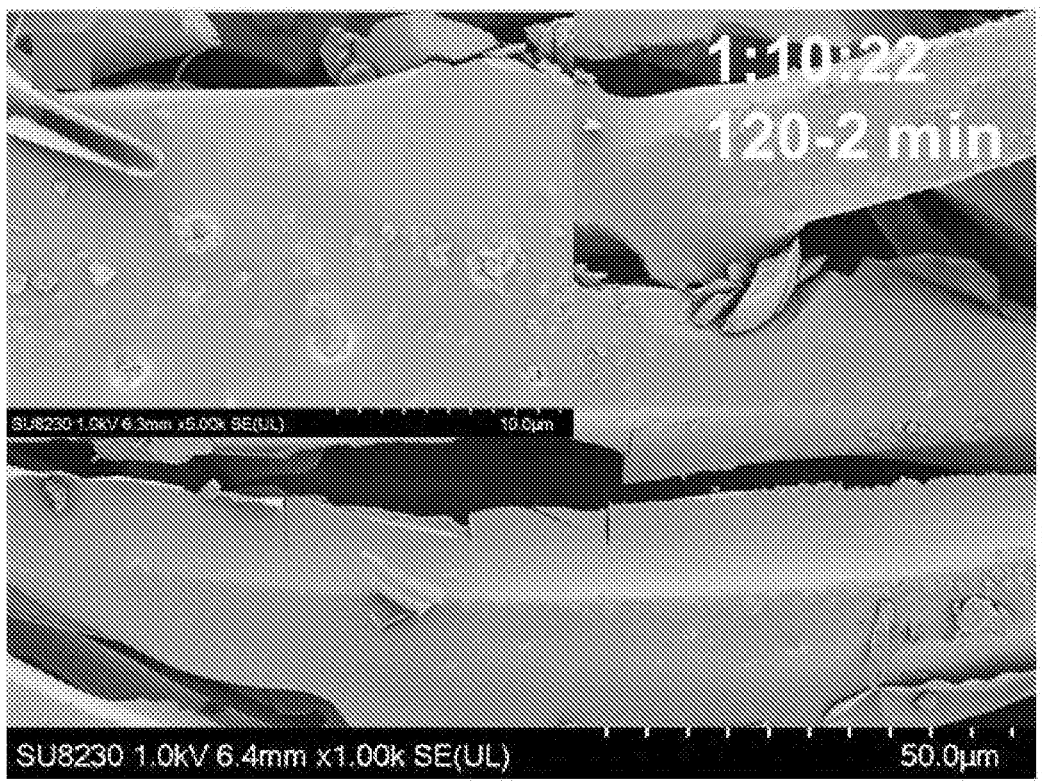
Figure 11C:
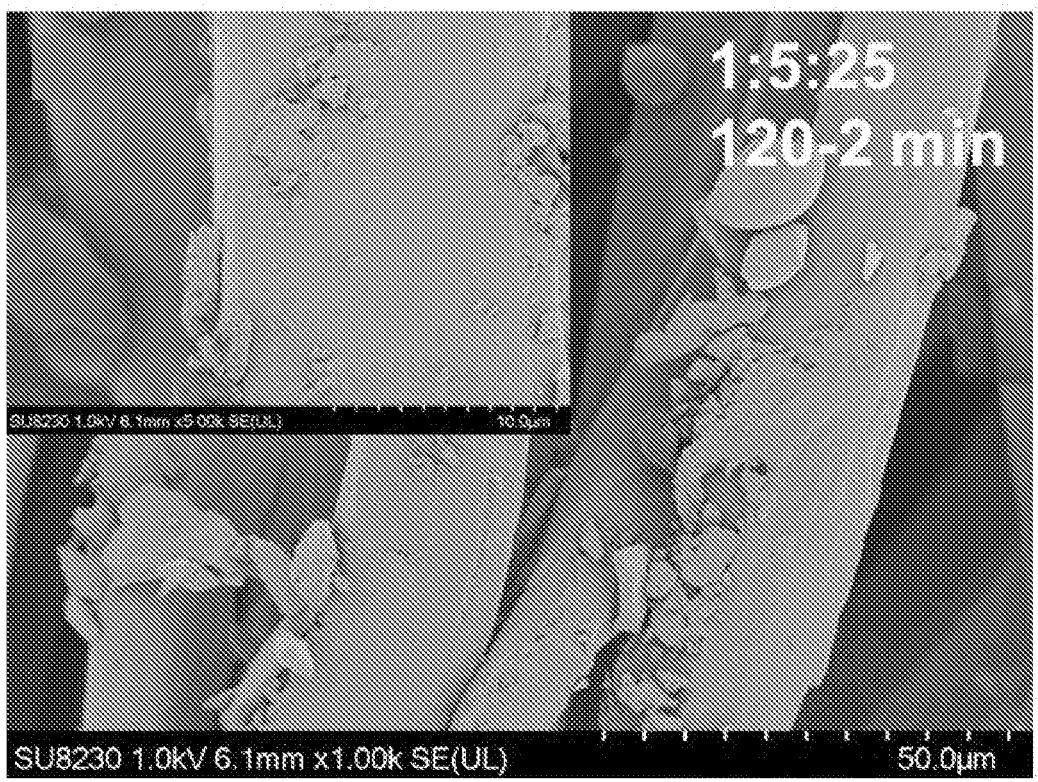
Figure 11D:
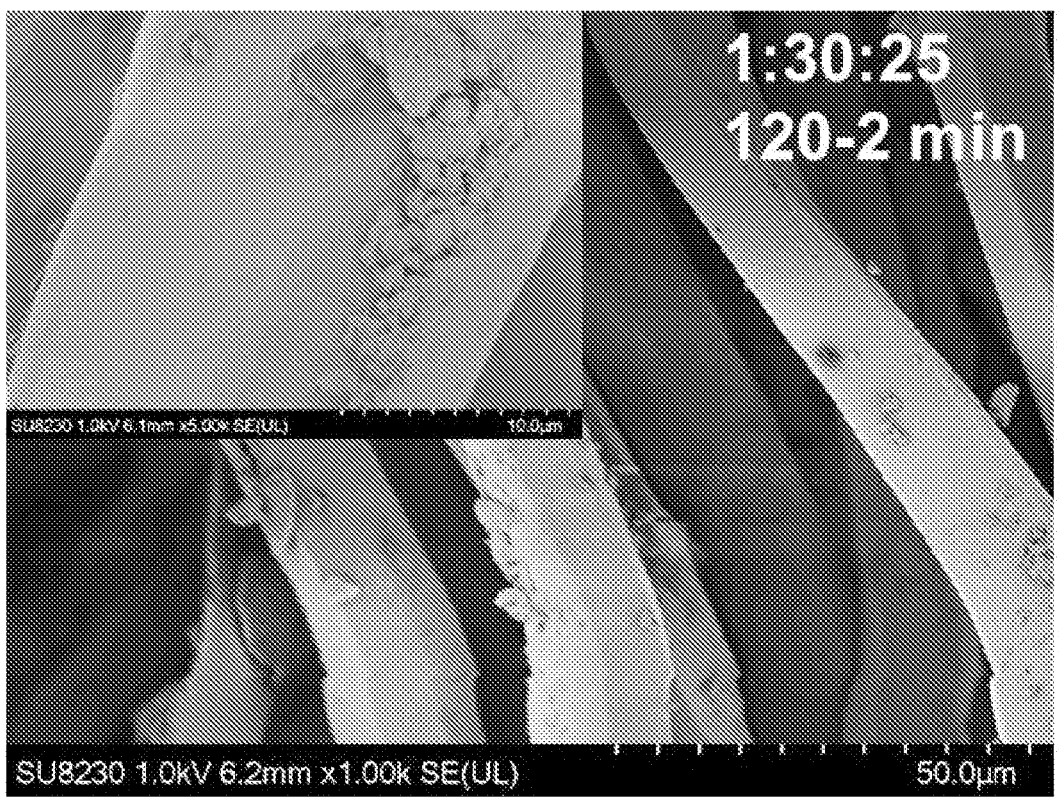
Figure 18A:
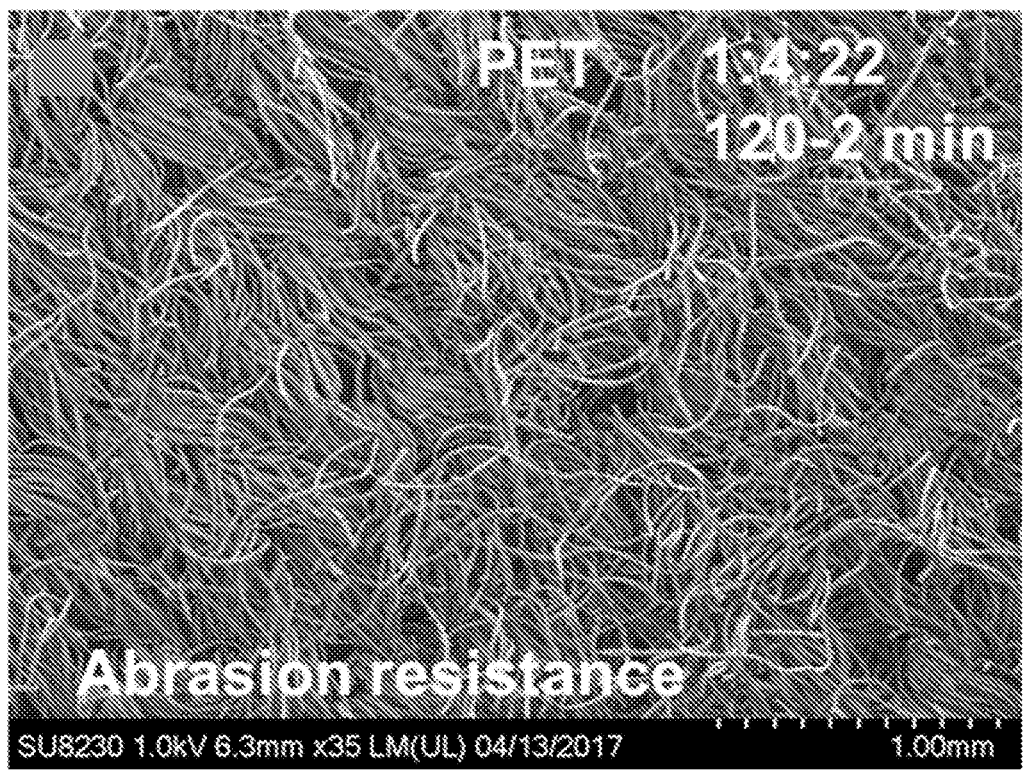
FIG. 18A-18B show SEM images showing the low magnification appearance of PET fabric primed with the two coatings 1:4:22 (120-2 min, 18A) and 1:25:25 (120-2 min, 18B) after standard abrasion resistance testing.
Figure 18B:
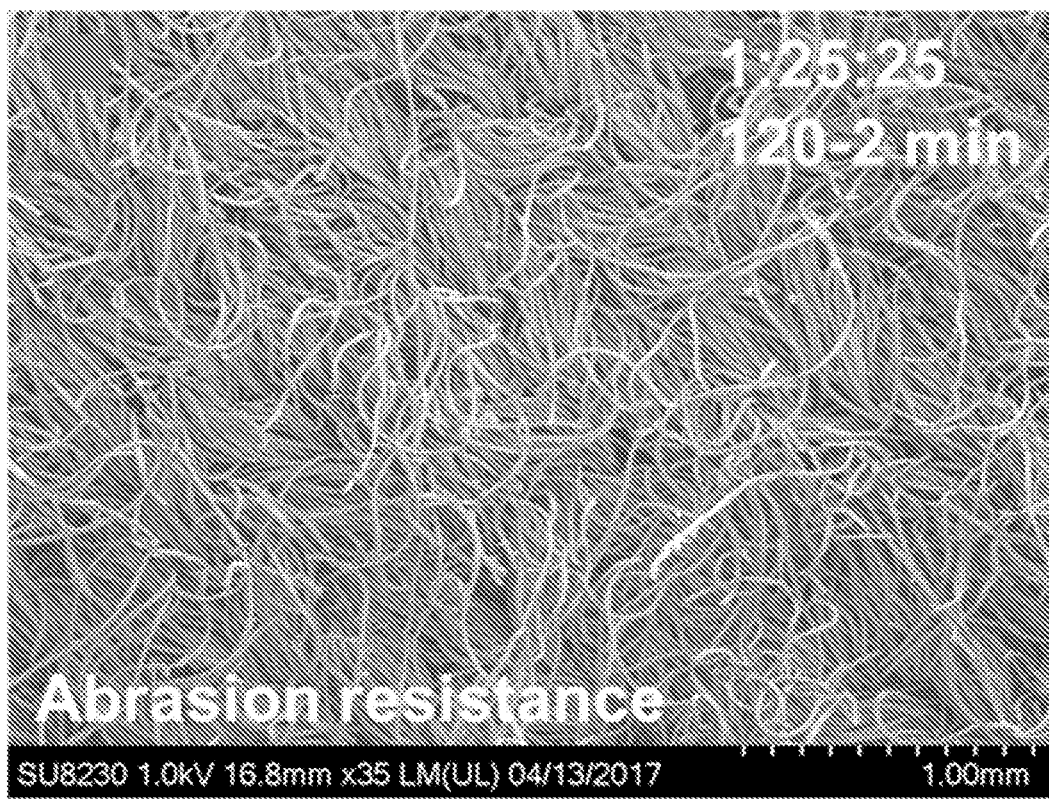
Figure 19A:
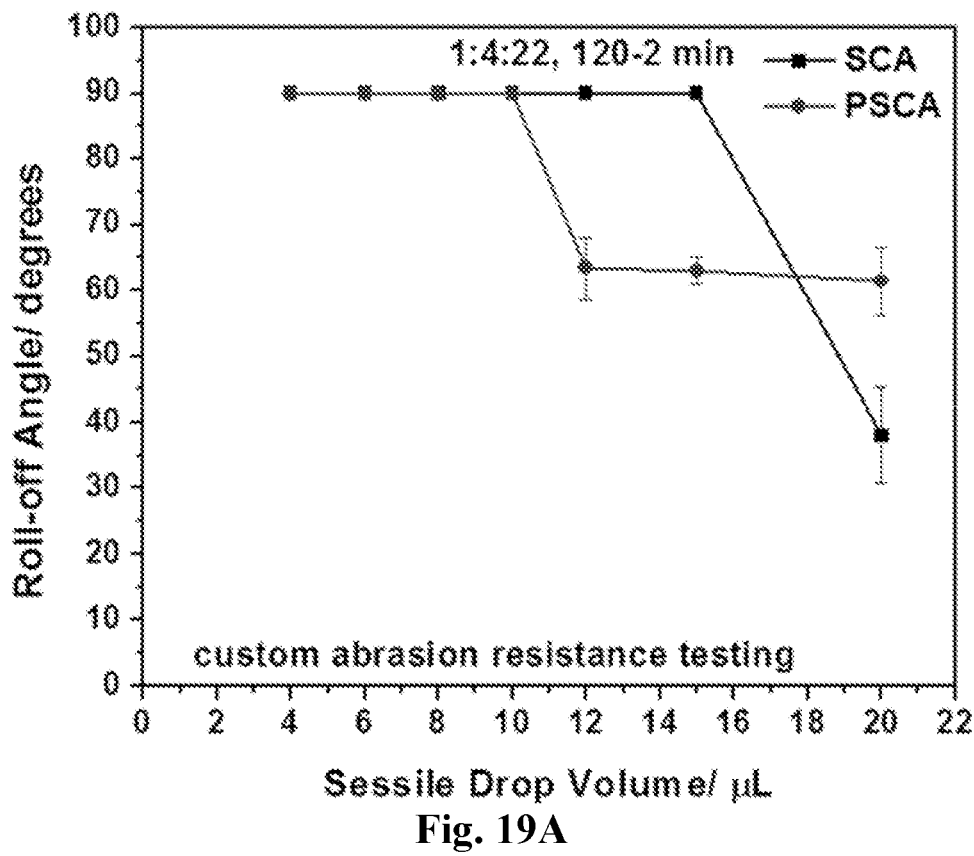
FIG. 19A-19B show roll-off angles recorded for coated PET substrate (1:4:22, 120-2 min) after custom (19A) and standard (19B) abrasion resistance testing. PSCA represents an additional tape peeling applied to the abraded surfaces.
Figure 19B:
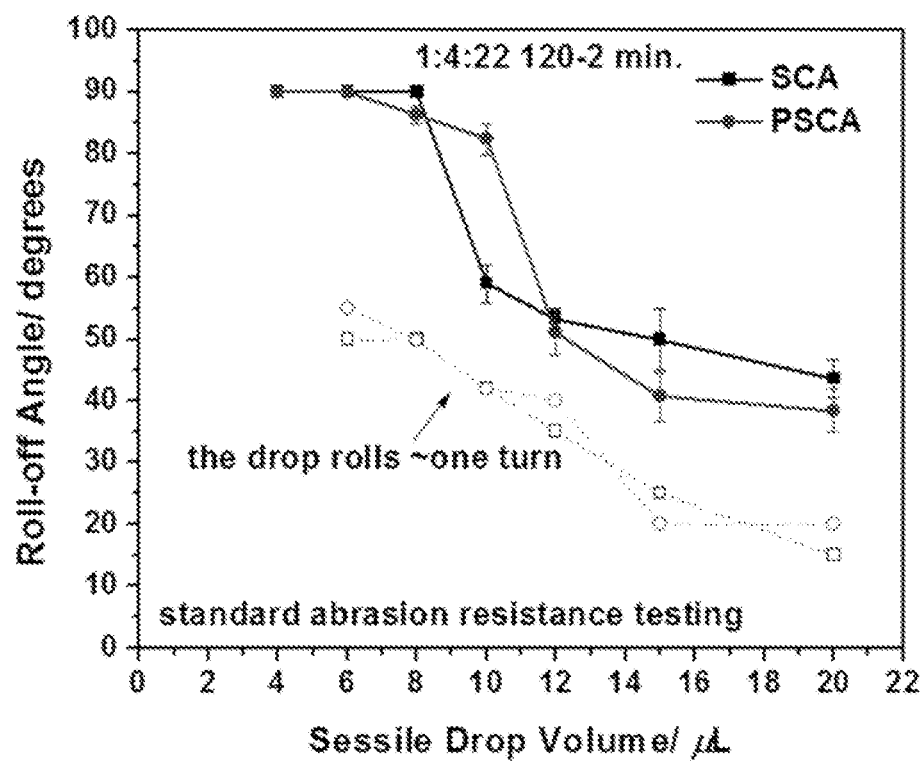

Standard Abrasion Tests. In order to link the above abrasion tests/evaluations to the use of the coated fabrics in commercial applications, the custom test results were compared to standard testing protocols. Coated PET fabric was subjected to pilling resistance (ASTM D4970) performed with both cotton duck and worsted wool abradent materials and received the highest grade (5). Modified PET textile also passed easily a rubbing process with 400-grit abradent under 1 pound load (25+ cycles, modified ASTM 3886-99) and did not cause excessive linting. The morphology of the surface after abrasion resistance tests was inspected by SEM (FIG. 8A-8B) to reveal the extent of physical damage. Broken fibers were visible for both 1:4:22 (FIG. 8A) and 1:25:25 (FIG. 8B) (see FIG. 18A-18B for low magnification images). Despite fiber breakage, the coating still survived at the surface, as discerned from the insets of FIGS. 8A and 8B. These observations were in line with those from custom testing and provided strong evidence that coating-to-substrate adhesion was exceptionally high. In addition, the SCA value trends (Table 9), similar to those seen in custom testing, offered further support: SCA significantly increased and reached the defined limit of superhydrophobic behavior. Again, no differences were observed between 1:4:22 (141.5°±4.3°, 30-10 min; 148.4°±4.4°, 120-2 min) and 1:25:25 (146.4°±6.5°, 30-10 min; 157.8°±2°, 120-2 min) formulations.

TABLE 9

Reaction-Soaking Times, Static and Impact Contact Angles for 1:4:22 and 1:25:25 Coating Formulations Recorded after Standard Abrasion Resistance Test

| | 1:4:22 | | 1:25:25 | |
| --- | --- | --- | --- | --- |
| R-S/min | SCA/degrees | ICA/degrees | SCA/degrees | ICA/degrees |
| 30-10 | 141.6 ± 4.0 | 120.0 ± 6.0 | 146.4 ± 6.5 | 117.4 ± 7.0 |
| 120-2 | 148.4 ± 8.0 | 148.0 ± 4.5 | 157.8 ± 2.0 | 150.4 ± 2.0 |

These results suggested that abradent materials modified the morphology of the coating layers and led to enhanced water-repellent behavior. Adhesion of liquid to the surface was minimal, as reflected by ICA values that were approximately equal to that of SCA for 1:4:22 (148°±9°, 120-2 min) and for 1:25:25 (151°±2°, 120-2 min), suggesting that water droplets might roll off (Table 9).

Indeed, coated PET fabrics subjected to both custom and standard testing displayed water droplet roll off, as shown in FIG. 9A-9B and FIG. 19A-19B.

In the case of the custom-abraded 1:25:25 (120-2 min) PET fabric (FIG. 9A), a 4 μL droplet was apparently pinned at the surface but a 2 μL it droplet rolled-off at an angle as low as 20°±1.5°. The same trend was observed for 1:4:22 (Figure S12, Supporting Information). Additional tape peeling applied to the PET surface did not prevent the water droplet from rolling off. The angle at which water droplets rolled off was smaller (32.6°±2.5°) than that without peeling (SCA). PET tested under standard procedures displayed a two-step roll-off behavior. In the first step, the 20 μL droplet made one full 360° roll on the surface at low angles 5° (SCA) and 15° (PSCA). Then the droplet stopped moving during several degrees of inclination before rolling off at 45.0°±2.0° (SCA) and 38.6°±3.0°. This behavior was attributed to the presence of broken fibers and loose debris at the surface generated during abrasion. Once the water droplet started to roll, the rigid coated fiber fragments acted similarly to bee needles in that they 'stabbed' or penetrated the droplet and remained attached to it (see Figure S13, Supporting Information). Subsequent rolling favors hydrophobic-hydrophobic interactions between these broken fibers and the textile surface leading to droplet 'capture'. This feature is different than true pinning because when the force associated with droplet weight surpassed that of hydrophobic interactions under tilting conditions, the droplet easily rolled off.

Figure 1B:
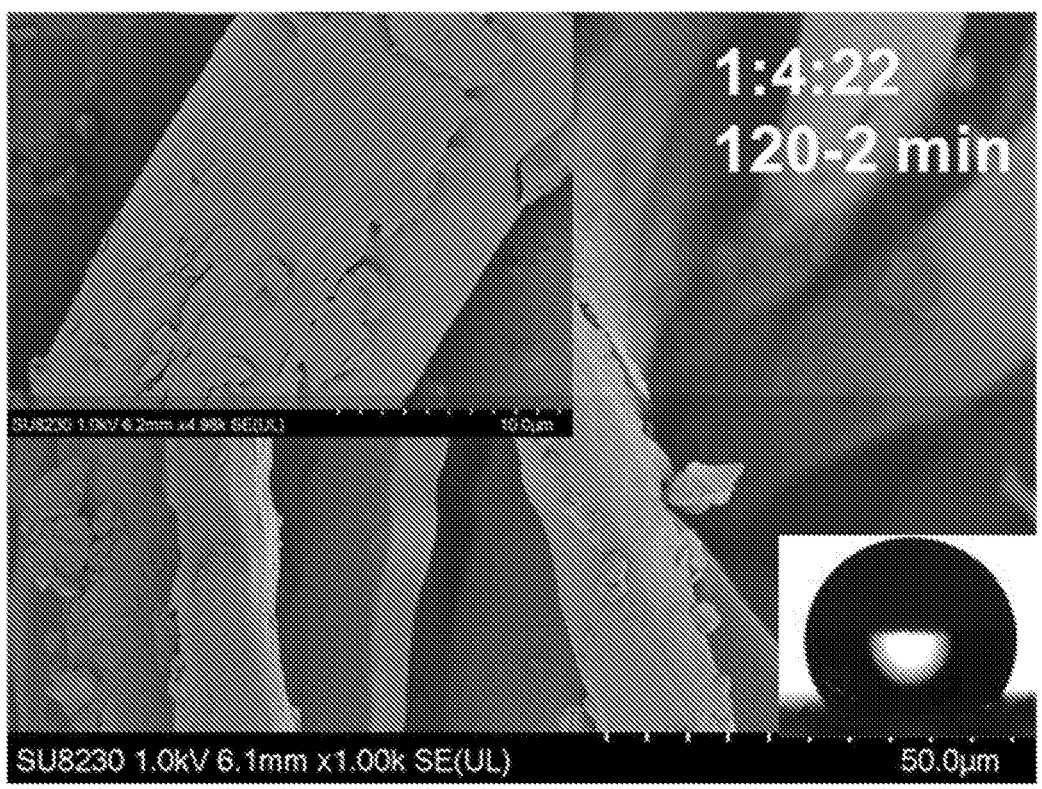
Figure 1B:
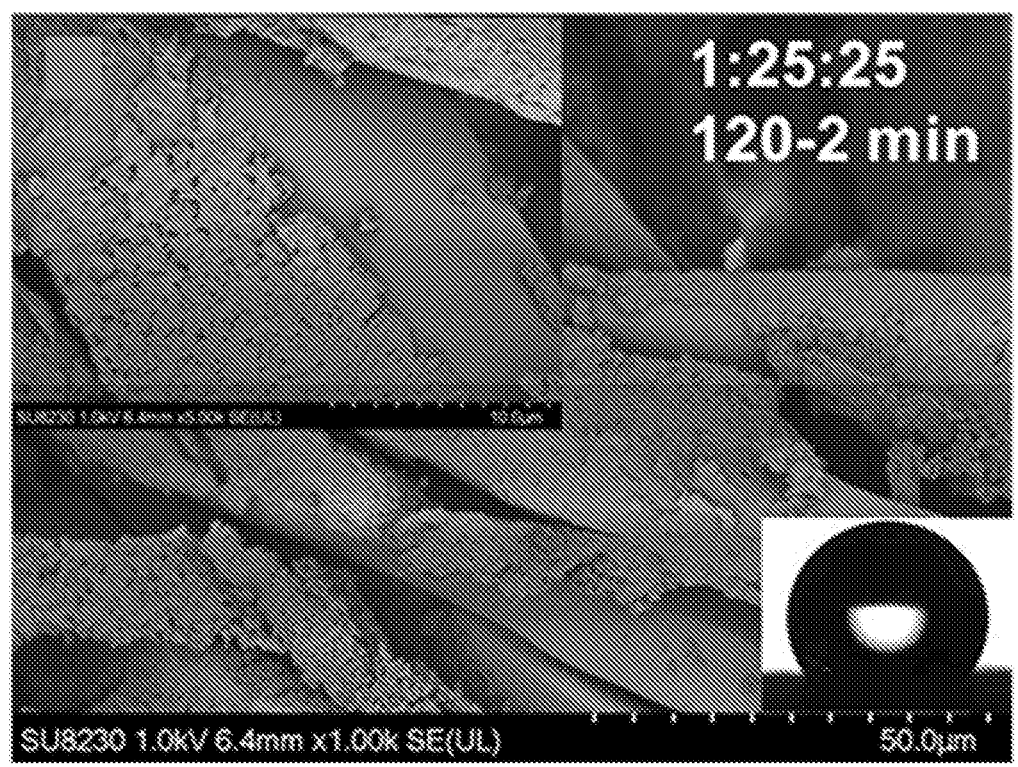

Mechanistic Perspective. Data discussed previously demonstrated that an MTMS-based coating exhibits long-time durability and mechanical resistance, likely due to its high adhesion to PET fibers. An interesting feature was the ability of the coating, especially 1:4:22, to display rejuvenation of hydrophobic character during and after rough abrasion tests. One possible interpretation of the findings is illustrated in FIG. 1A. Without wishing to be bound by theory, the following is a possible explanation of the findings presented in this Example. Similar to TEOS, hydrolysis and condensation of MTMS catalyzed by $NH_4OH$ yielded a variety of reaction species consisting of oligomers (cyclic and linear), silica particles and particle aggregates, as demonstrated by previous reports. These chemically active components have inert hydrophobic patches (—$CH_3$ arms) and reactive hydrophilic patches (free OH groups). The latter have the ability to react and generate covalent crosslinks. Immersion of the PET fabric in the reaction mixture enables further hydrolysis and condensation between hydrophilic moieties and sparse OH groups present on PET fibers. Due to their size, oligomeric structures and small particles likely diffuse faster and reach the PET surface, where they can become strongly anchored by covalent bonds and form a relatively smooth film. Large particles and subsequently arrive and bind to the freshly formed coating layer on the fiber surface. Because of steric hindrance, both loosely and covalently bound aggregates can generate architectural layers filled with voids, as shown by SEM analysis (FIG. 1B-1C). During abrasion tests, abradents remove the top sacrificial layers leaving behind a new morphology. It is possible that some of the particles that form the aggregates and are not directly bound to the PET surface are removed, while the remaining ones contribute to building a new hierarchical structure atop the strongly bound smooth layer, a structure that enhances the water repellent behavior of the PET fabric. In fact, the ability of the PET fabric to display superhydrophobic behavior (water droplet roll off) after prolonged aging and abrasion points to transition from a Wenzel state to a Cassie-Baxter state. Essentially, the liquid droplet sits on air cushions formed at the solid (coated fabric)-liquid (water droplet) interface (FIG. 1A and FIG. 6B).

Transition from hydrophobic to superhydrophobic behavior is reminiscent of many living organisms that use the feature to protect themselves against external factors. As mentioned previously, snakes possess skin ornamentation able to adjust to a variety of challenging terrain and climate conditions. Snake skin displays exceptionally low friction and outstanding wear resistance through support by a lipid coating present in both ventral and dorsal scales of ornamentation. The combination of changes in morphology and continuous lubrication maintain the effective functioning of the skin until shedding. Similarly, the MTMS-based coating may display comparable behavior, especially after thermal treatment. Reordering of MTMS-derived moieties at the molecular level can be regarded as 'self-lubricating' and, together with continuous change in nano- and micro-scale morphology, leads to enhanced water-repellent behavior.

Overall, custom and standard testing protocols described herein demonstrated that MTMS-based coating exhibited long-time resistance to harsh mechanical abrasion regardless of the abradent nature. It also presented 'self-lubrication' like features due to molecular restructuring, reordering and resistance to prolonged thermal treatment and laundry. 'Rejuvenation' of water-repellent behavior observed during aging-abrasion cycles is also similar to materials with self-healing abilities. Display of these properties by modified PET fabrics demonstrated that MTMS-based coatings can successfully mimic natural water repellent biomaterials. Coatings according to the present disclosure had high adhesion to the PET fibers and high mechanical strength.

PET fabric surface was modified with an inorganic silica-based coating using a one-pot sol-gel process. MTMS, $NH_4OH$ and EtOH were reacted (R: 30, 60, 120 min) with MTMS pre-dilution, a new approach in the field of silica coatings. In parallel, coatings without MTMS pre-dilution were also prepared. Both approaches were followed by fabric soaking in the reaction mixture (S: 2, 5, 10, 15, 30 min). By rationally changing the reagent composition and R-S times the coating morphology was tuned from smooth to rough appearance. This coating processing led to strong water-repellent behaviors indicative of multiscale structure. Static contact angle (SCA) values generally did not depend on R-S times but long R (120 min) and short S (2 min) seemed to favor a more robust hydrophobic character under impact conditions (ICA).

A variety of custom aging-abrasion-impact, wicking and laundry testing protocols allowed extensive characterization of modified PET properties and demonstrated that coating-to-substrate adhesion was extremely high. XPS confirmed that 45% of the initial priming layer survives at the PET fiber surface after abrasion resistance testing. Aging and abrasion of the MTMS coating led to enhanced non-wettability, contrary to expected behavior. Without wishing to be bound by theory, it is suggested that this intriguing feature was supported by combined changes in surface chemistry and surface morphology. The observed property suggests that, regardless of their nature, abrasion materials can generate a hierarchical structure necessary to support a Cassie-Baxter water state associated with extreme water repellency. PET fabric behaved as a self-cleaning superhydrophobic material and, due to low liquid-to-substrate adhesion, allowed water droplets to roll off. Transition of the MTMS-based coating surface from water pinning to water sliding coupled with robust and long-time mechanical resistance mimics many biological materials. The observed behaviors of the coated fabrics demonstrated by data and, combined with well-known silica properties, transform coated PET into a multifunctional textile.

The data discussed in this Example can offer opportunities to use MTMS-based coatings to design surfaces that display the functionality, mechanical resistance and wear performance of natural homologues. The described technology also offers prospects for its integration into large-scale manufacturing of durable and high wear performance functional textiles for commercial purposes.

Example 2: Refining the MTMS-Based Coating Process for Additional Substrate Types Further improvements were made to the MTMS coating process, described specifically in this Example. A simple coating process in an aqueous environment under ambient conditions is favored and could be readily compatible with existing large-scale textile finish manufacturing processes. Non-fluorinated organosilanes offer an economic and viable alternative to fluorinated products in the development of water repellents and surface protection. For example, MTMS, an organosilane with one methyl group and three hydrolyzable methoxy substituents, has been successfully used to impart hydrophobicity and oleophobicity to various substrates such as glass, wood, cotton, steel and paper. Interestingly, incorporating MTMS onto paper and steel mesh surfaces exhibited tunable hydrophilicity and hydrophilicity/underwater superoleophobicity by controlling hydrolysis conditions. In Example 1, the concentration of MTMS in this coating solution was relatively high (MTMS:HCl (0.1M)=4:1), and the coating process resulted in thick, smooth coatings and high MTMS loadings on porous substrates (>10 wt %), which could present difficulties for manufacturing processes with such substrates. Challenges therefore remain to develop MTMS coatings for water repellency that enable easy and efficient control of nanostructures imparted on a targeted surface to obtain stable, durable MTMS coatings with a simple one-step process at low loadings.

A typical MTMS coating process involves hydrolysis and condensation before reacting the coating solution with hydroxyl groups present on the substrate surface. Finding the best balance between hydrolysis and condensation is one of keys to the successful utilization of organosilane chemistry for coating performance, including the water-repellency, mark-off (scratch resistance), coating stability and durability. Thus, it is important to understand and control the reaction kinetics for preparing the best coating solution. It has been found that the rates of both hydrolysis and condensation are influenced by, for example and not limitation, changing pH levels of the media for acid- and base-catalyzed reactions.

In this Example, polyester (PET) fabrics were coated with a non-fluorinated organosilane in an exemplary, scalable method including a one step dip-coating in an aqueous solution of fluorine-free hydrolyzed MTMS. The hydrophobicity of coated fabrics was tuned by the surface-coated silicone silica morphologies, varying from smooth thin film to hierarchical structures. The morphology of the coated silica-based layer was investigated systematically for kinetically controlling and optimizing the water repellency through tuning certain reaction parameters, such as for example and not limitation, pH and MTMS hydrolysis time, for forming hierarchical coating structures that exhibit great stability and durable superhydrophobicity in abrasion and weathering tests.

Materials and Methods

Materials. Methyltrimethoxysilane (MTMS, purum, ≥98.0%) and hydrochloric acid (HCl, ACS reagent, 37%) were purchased from Sigma-Aldrich. Ammonium hydroxide solution ($NH_4OH$, 28-30% $NH_3$ basis) and pure anhydrous ethanol (200 proof/100%, USP, KOPTEC) were purchased from VWR. Pristine fabrics were Anticon 100® Heavyweight Series Cleanroom Wipers, Contec® (VWR). Wipers are made from 100% continuous filament polyester double-knit interlock fabric. All chemicals were used without further purification. Deionized water was used for experiments and tests.

Preparation of MTMS-coating solutions. Acid catalyzed-MTMS coating solution: MTMS was mixed with 0.1 M hydrochloric acid (HCl) in a 1:50 v/v ratio at room temperature in a glass vial. The mixture was then magnetically stirred at the rate of ~500 rpm for different lengths of time (varied from 30 to 240 min) to induce MTMS hydrolysis and condensation.

Base catalyzed-MTMS coating solution: In a typical preparation, ammonium hydroxide ($NH_4OH$) was mixed with pure anhydrous ethanol (EtOH) in 1:1, 1:2.5 and 1:5 v/v ratio at room temperature in a glass vial and the solution was magnetically stirred for 30 min at the rate of ~500 rpm. Then MTMS was added to the above solution (at final ratio of MTMS:EtOH=1:25 v/v) and the mixture solution was further stirred for different lengths of time (varied from 30 to 240 min) to induce MTMS hydrolysis and condensation.

Fabrication of superhydrophobic fabrics. In a typical fabrication procedure, a piece of PET fabric (small, 2'×2 in, or large, 9×9 in) was fully immersed into the 200 mL coating solution for 5 min. After dip-coating, the excess solution was allowed to drain from the fabric by hanging and air-drying for at least 2 h. Finally, the coated fabric samples were cured in an oven at 120° C. for 2 h.

Measurement of static, impact and roll-off water contact angles. All contact angle measurements were performed by using a Ramé-Hart automated goniometer (model 290). Contact angles were determined by the standard software of the goniometer (Drop Image, version 2.6.1). Static contact angle (SCA) was measured by directly placing a 10 µL DI-water drop onto the MTMS-coated fabric surface. Because of their outdoor application, textile fabrics with water-repellent finishes typically must pass spray testing (e.g., AATCC 22-2005). Such tests require standardized spray tester hardware as well as very large fabric samples (at least 7'×7 in). Thus, inspired by the spray test (AATCC 22-2005) method, an impact water contact angle (ICA) method was developed for quick assessment of water droplet adhesion after impact on the surface. Typically, the syringe of the goniometer was positioned with the needle tip 5 cm above the test fabric surface, so that a 10 µL drop falling from the needle contacts the surface at an impact velocity of ~1 m/s. The roll-off angle (ROA) after impact was measured as the angle of inclination of the surface (tilt speed: 2°/s) at which the water drop rolls off the substrate.

Mechanical Durability Tests.

Tape peeling test: 3M Scotch single-sided tape (Giftwrapping, tensile strength is 15 lbs./in. width, synthetic acrylic adhesive with a polyolefin backing, adhesion to steel is 15 oz./in. width) was pressed against the MTMS coated PET surfaces firmly by hand to ensure no obvious visual air gaps between them and kept on the surface for at least 1 min. Then the tape was detached from one end of PET fabric using tweezers.

Falling sand abrasion test: In a typical process, one piece of 3'×3' MTMS coated PET fabric was firmly attached on one flat surface that was tilted 45°. Then the surface was exposed to a jet of ~30 g of sand particles (~80-120 µm glass beads) in diameter as abrasive blasting media from McMaster-Carr) that flowed out of a plastic funnel held 40 cm above the substrate for approximately 40 s.

Accelerated weathering test: Natural Florida weathering testing was carried out following standard SAE J2527 test protocol in a Black Standard Weatherometer. This SAE Standard (SAE J2527-2004) specifies the operating procedures for the controlled irradiance with a xenon arc lamp apparatus accelerated exposure of various exterior automotive materials under controlled temperature and humidity cycling. This test method is designed to simulate extreme outdoor environmental conditions such as sunlight, heat, and moisture (in the form of humidity, condensation, or rain) for the purpose of predicting the weathering performance of outdoor textiles. A 7'×7' sample of MTMS coated PET fabric was used to examine the durability of superhydrophobic MTMS coating under this accelerated weathering.

Characterizations

SEM imaging: The surface morphologies of all fabric samples were characterized using Field-Emission Scanning Electron Microscopy (Zeiss Ultra 60, Carl Zeiss SMT, Ltd., Thornwood, N.Y.), at an accelerating potential of 10.0 kV. Before imaging, all samples were coated with a thin layer of gold/palladium (Hummer IV Sputtering System) to prevent sample charging, and then mounted on metal stubs using carbon double-sided tapes.

XPS analysis: X-ray photoelectron spectroscopy (XPS) analyses were conducted using a Thermo Electron Corporation K-Alpha XPS system with a micro-focused monochromatic Al Kα X-ray source. The spot size of the instrument is 400 μm.

FTIR analysis: Fourier-Transform Infrared measurements (FTIR) were performed using a Nicolet iS50 FT-IR spectrometer from Thermo Scientific LLC. The instrument is equipped with a DLaTGS Detector that has a KBr window and a KBr beam splitter. The used accessory was Smart-iTR (ATR) with a diamond window. Fabric samples were placed directly on the diamond window and, for each measurement including the background, 32 scans were acquired at a resolution of 8. Omnic software was used to process the data that were baseline and atmospheric suppression corrected.

MADLS Analysis: Multi-angle dynamic light scattering experiments (MADLS) were carried out on a custom-built apparatus equipped with an ALV-5000 digital auto correlator and associated software. The scattering volume was illuminated by a focused laser beam ($\lambda_0$=640 nm). The instrument has a classical design with two pinholes and lenses for homodyne detection. Measurements were performed at different scattering angles, θ, from 30° to 120°. The temperature of the toluene bath surrounding the sample cell to suppress reflected light was maintained at 25° C. using a circulating bath. The samples were prepared in pre-cleaned and dust-free vials (Pyrex, 13×100 mm from Fisher) as follows: first, approximately 1.5 mL of anhydrous ethanol was filtered (Whatman PTFE filter, 0.1 μm pore size). Subsequently, a volume of ~50 μL of MTMS:NH$_4$OH:EtOH, 1:25:25 dispersion was added and the vials were capped. Aliquots of samples were investigated at 15, 30, 45, 90 and 120 min reaction time. A two-exponential function was used to fit the experimental data. The decay time associated with the correlation function of the fast mode was converted to the decay rate of the electric field, autocorrelation function $g^{(1)}(t)$, Γ. Then, the apparent diffusion coefficient was computed from $D_{app}=\Gamma/q^2$, where q is the scattering vector magnitude, expressed as q=4πn sin(θ/2)/$\lambda_0$, n being the solvent refractive index, θ the scattering angle and $\lambda_0$ the laser wavelength in vacuo. Stokes-Einstein equation, $D_{app}=kT/(6\pi\eta_o R_{h,app})$, was used then to calculate the apparent hydrodynamic radius, $R_{h,app}$. In this equation k is the Boltzmann's constant, T is the absolute temperature at which the experiments were carried out and $\eta_o$ is the solvent viscosity. $R_{h,app}$ was then extrapolated to q=0. The particle uniformity was expressed by the dimensionless ratio of the second cumulant to the square of the average decay rate, $\mu_2/\Gamma^2$.

Results and Discussion

Preparation of Superhydrophobic Fabrics with Thin Film MTMS Coatings

In a typical coating process, methyltrimethoxysilane (MTMS) undergoes hydrolysis and condensation reactions before reacting and chemically bonding with the hydroxyl groups present at a substrate surface. Therefore, variation of the coating process steps, which include the hydrolysis and condensation reactions, can significantly impact the wetting behavior of coated substrates. For the fabrication of superhydrophobic textiles in this Example, the synergic effect of two non-limiting exemplary conditions, the pH and time of MTMS hydrolysis and condensation, was systematically investigated for optimizing water repellency. The MTMS coating process was carried out in an aqueous environment through a simple one-step dip coating method.

Figure 20A:
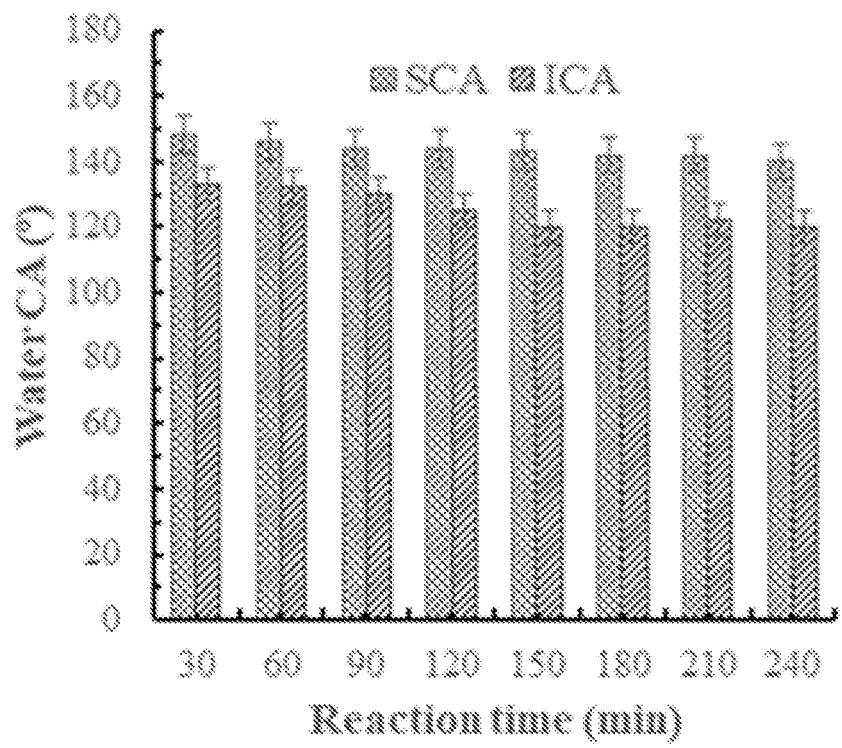
FIG. 20A-20B show contact angles of MTMS coated PET fabrics at varied hydrolysis times: (20A) acid catalyzed, MTMS: HCl (0.1 M)=1:50, pH=1.2±0.3; (20B) base catalyzed, MTMS:NH$_4$OH:EtOH=1:10:25, pH=9.6±0.3. SCA=static contact angle, ICA=impact contact angle.
Figure 20B:
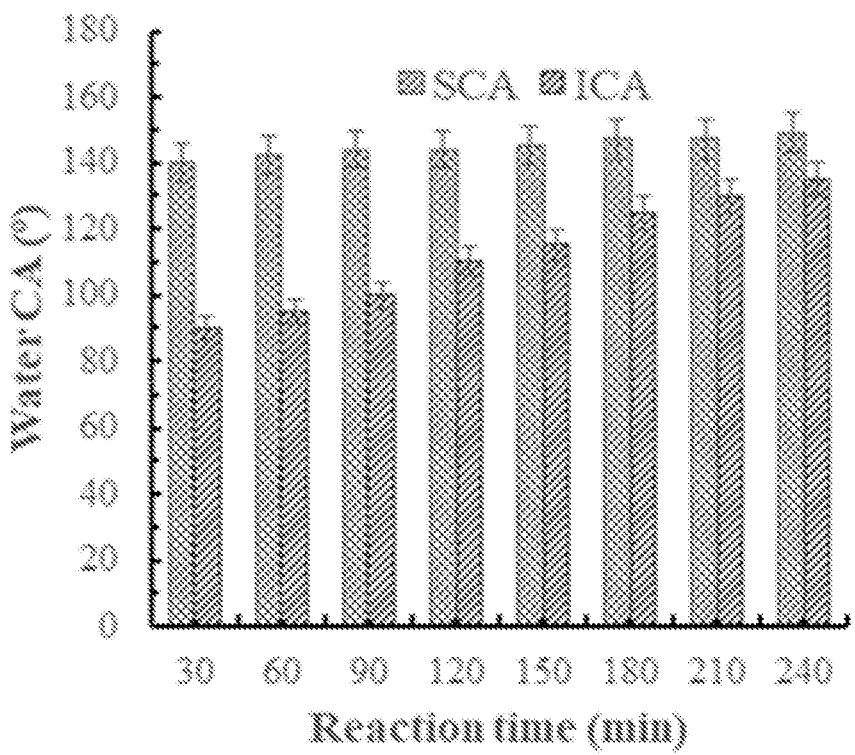
Figure 21A:
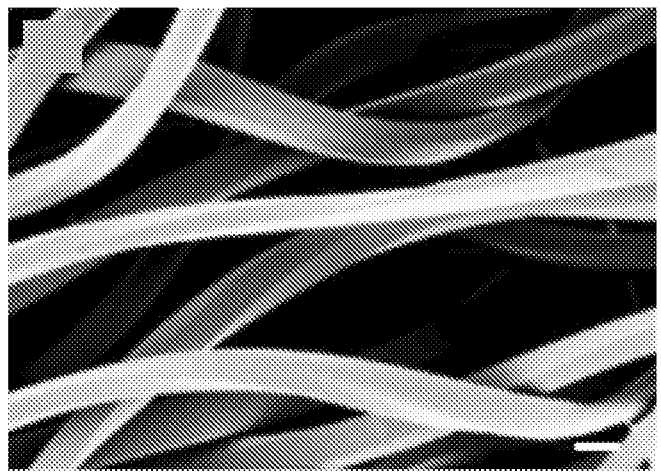
FIG. 21A-21D show SEM images of HCl-catalyzed MTMS coated PET fabrics at varied reaction times: (21A) 30 min, (21B) 120 min, (21C) 180 min, and (21D) 240 min. The white scale bar=10 μm.
Figure 21B:
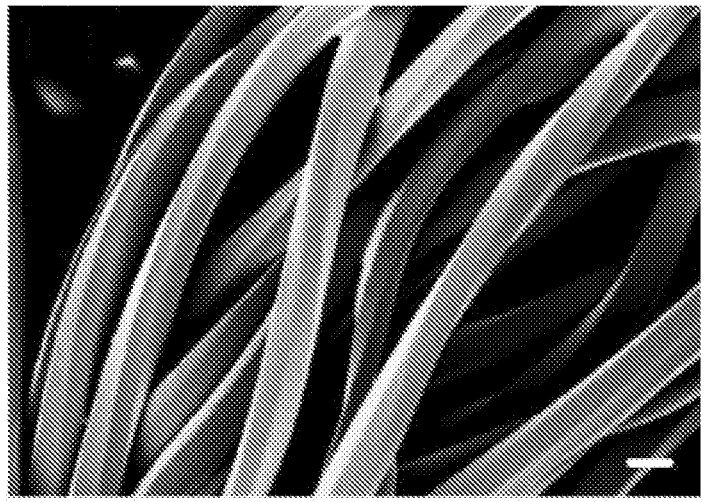
Figure 21C:
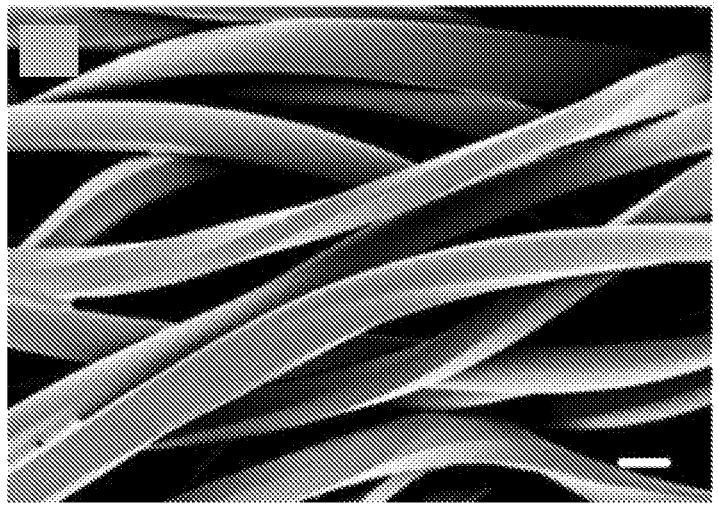
Figure 21D:
Figure 22A:
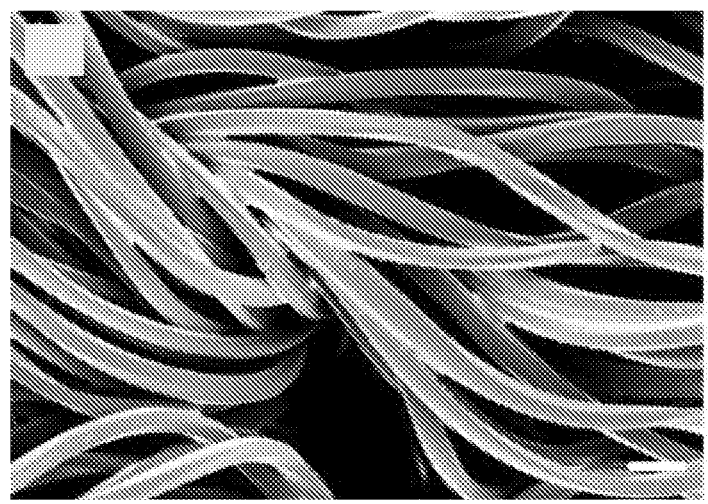
FIG. 22A-22D show SEM images of $NH_4OH$-catalyzed MTMS coated PET fabrics at varied reaction times (MTMS:$NH_4OH$:EtOH=1:10:25): (22A) 30 min, (22B) 120 min, (22C) 180 min, and (22D) 240 min. The white scale bar=20 μm.
Figure 22B:
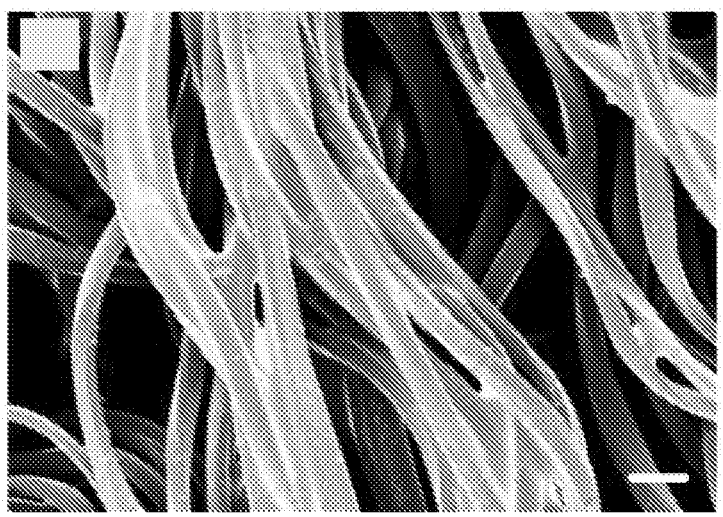
Figure 22C:
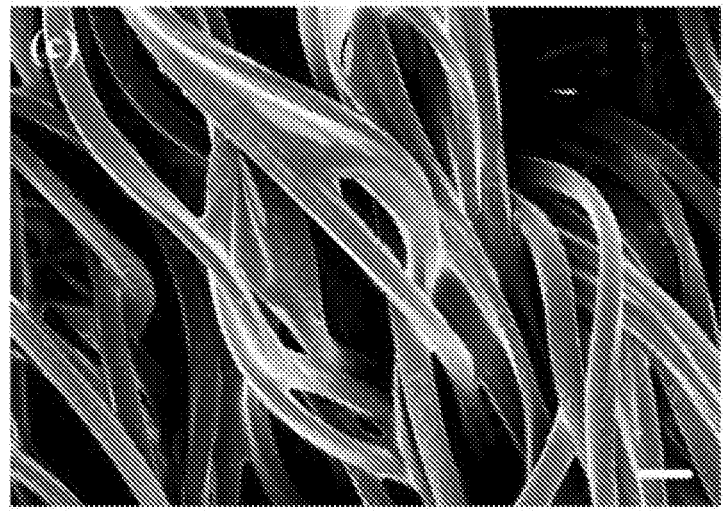
Figure 22D:
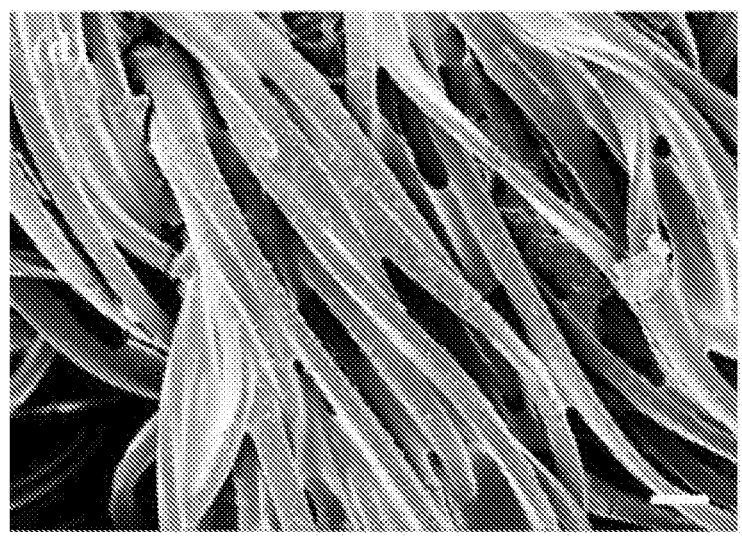

The wetting behaviors of MTMS-coated PET fabrics were characterized through both static water contact angle (SCA) and impact water contact angle (ICA) to evaluate water repellency As shown in FIG. 20A-20B, all MTMS-coated PET fabrics exhibited similar SCAs in the range 140-155° for both HCl (pH~1.2) and NH$_4$OH— (pH~8.9-11) catalysts with reaction times between 30 and 240 min. Particularly, there was no obvious difference between the SCAs (152±3° for all HCl-catalyzed MTMS-coated PET with varied hydrolysis time, while the SCAs of NH$_4$OH catalyzed MTMS coated PET were slightly affected by the MTMS hydrolysis time. For pH~8.9 and 9.6 (Figure S1 and 1b), the SCAs slightly increased from 130±4° to 148±4°, and from 140±3° to 150±3°, respectively, for MTMS hydrolysed for 30 and 240 min.

Figure 28:
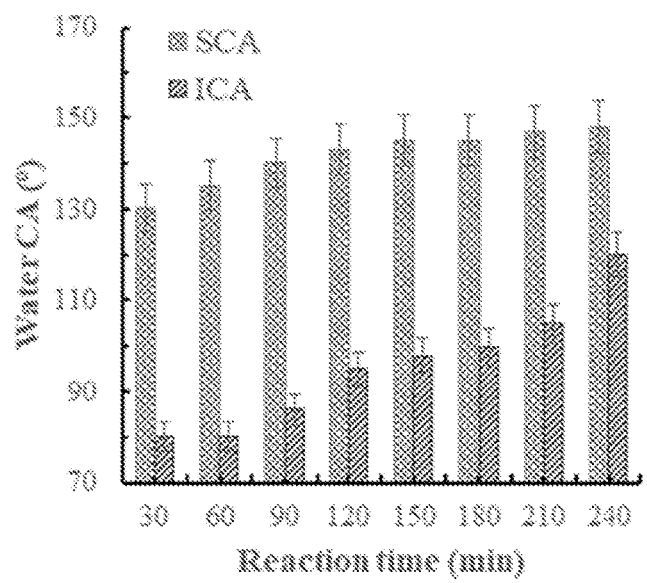
FIG. 28 shows contact angles of $NH_4OH$-catalyzed MTMS coated PET fabrics at varied hydrolysis times: MTMS:$NH_4OH$:EtOH=1:5:25, pH=8.9±0.3.
Figure 29:
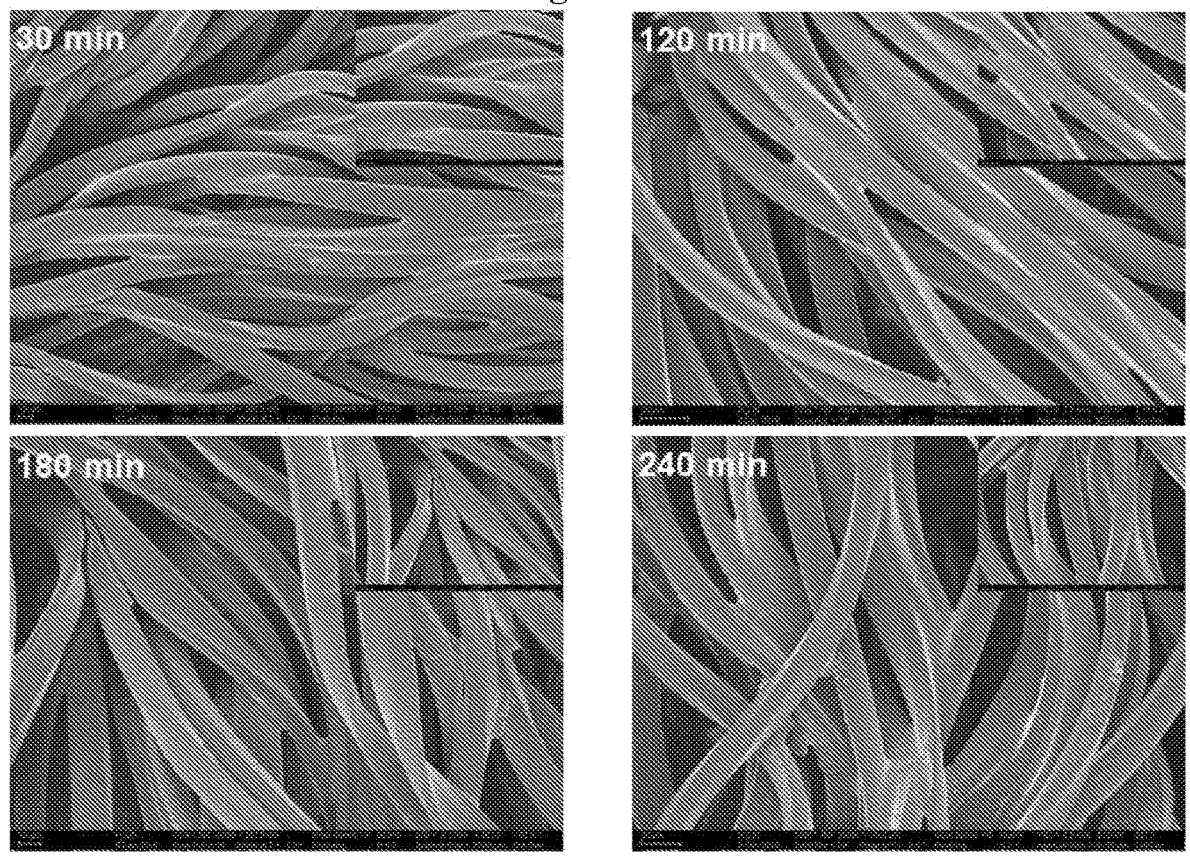
FIG. 29 shows SEM images of $NH_4OH$-catalyzed MTMS-coated PET fabrics at varied reaction times (MTMS:$NH_4OH$:EtOH=1:5:25, pH=8.9±0.3) 30 minutes (top left), 120 minutes (top right), 180 minutes (bottom left) and 240 minutes (bottom right).

For the textile industry, a number of different tests are used to evaluate the efficacy of water repellency of a chemically finished fabric. Additional testing is needed, but standard wetting tests that work well for flat substrates, like contact angle hysteresis and roll-off angle measurements, can be more difficult to implement and interpret for porous substrates like fabrics. Therefore, specialized methods, such as standardized spray tests (AATCC 22-2005) with water spraying from 6' height onto the fabric surface, can be used to assess performance. However, this spray test not only requires a standard AATCC spray tester, but also very large fabric samples (at least 7'×7'). Thus, inspired by the spray test (AATCC 22-2005) method, a new impact contact angle (ICA) test was developed for quick assessment of liquid droplet adhesion after water droplet impact on the surface. As shown in FIG. 20A-20B and FIG. 28 (right bars), all ICAs were significantly lower than corresponding SCAs. For HCl-catalyzed MTMS-coated PET, the ICA values were around 125-130°; where the ICAs illustrated the obvious effect of MTMS hydrolysis times on the water-repellent efficacy and resistance of NH$_4$OH-catalyzed MTMS-coated PET. For pH~8.9 and 9.6 (FIG. 28A-B), their ICAs increased from 80±3° to 120±4°, and from 90±3° to 130±4°, respectively, for MTMS hydrolysis times between 30 and 240 min. On the other hand, the standard spray test (AATCC 22-2005) showed that the ratings for all those MTMS-coated PET fabrics were only 50-70 (partial wetting of coated fabric beyond the spray points), showing very little distinction between the samples.

To explain the difference in wetting behaviors of MTMS-coated PET fabrics and understand the underlying mechanism, the surface morphologies of each sample were analysed by Scanning Electron Microscopy (SEM). The fiber surfaces of pristine PET fabrics were smooth with only a small amount of nano-scale debris and fiber diameters of 12±2 μm. After coating with the HCl-catalysed MTMS solutions, the observed fiber diameter of PET fabrics did not obviously change and the surface became extremely smooth without any distinct nanoscale roughness (FIGS. 21A-21D and 22A-22D), indicating a smooth film of MTMS on PET fibres. Further, there were no obvious difference between the surface morphologies of all HCl-catalysed MTMS-coated PET fabrics with varied hydrolysis times (30-240 min). This observation was consistent with the above results for SCAs and ICAs, suggesting that the hydrolysis time of HCl-catalysed MTMS solution did significantly influence the coating results. Contrarily and importantly, the base-catalyzed MTMS solutions were dramatically affected by hydrolysis time. As shown in FIGS. 22A-22D and 29, with increasing hydrolysis times, the modified PET fiber surfaces became rougher, comprising a hierarchical structure with nano-particles well imbedded in thin film. The appearance of hierarchical structures varied with hydrolysis time, which explains the increase of SCAs and ICAs with increased reaction times. It is suggested that this is the first time that the wetting properties of silane coated fabrics have been carefully controlled and tuned through hydrolysis times in media with different pH to achieve hierarchical structures.

Preparation of Superhydrophobic Fabrics with Hierarchical MTMS Coatings

Figure 23:
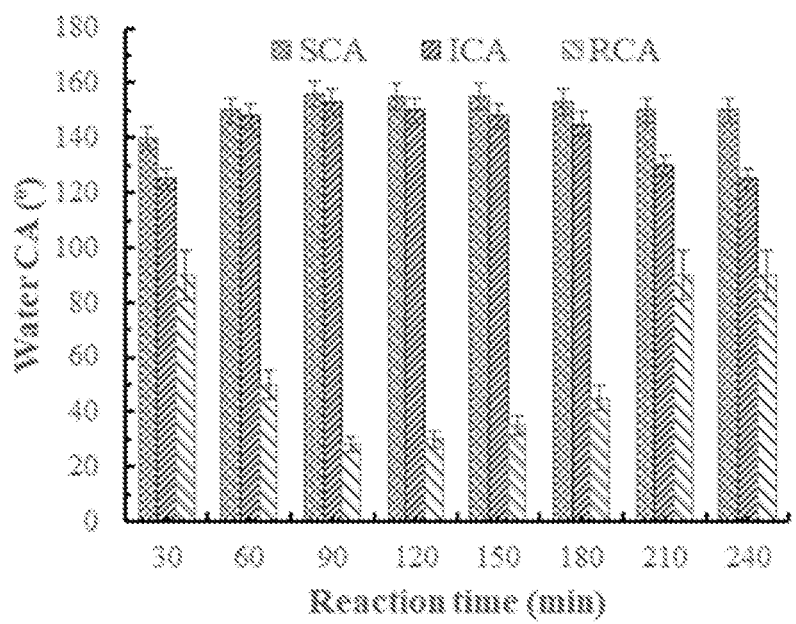
FIG. 23 shows contact angles (CA) and roll-off angles (ROA) of $NH_4OH$-catalyzed MTMS coated PET fabrics at varied reaction times: MTMS:$NH_4OH$:EtOH=1:25:25, pH=10.8±0.4.

The Stöber method has been widely used for controlled growth of monodisperse silica spheres through the hydrolysis of tetra-alkyl-silicates in ammonium-alcohol solutions. The silane hydrolysis and condensation process provides similar controlled growth of MTMS polymerization products and nanoparticles with its most popular tetraorthosilicate counterpart. the reaction mixture composition can be tuned by both the solution pH and reaction times to achieve the optimum surface morphology desired for specific coating properties. As shown in the experiments in this Example, in the two ethanol-ammonium solutions ($NH_4OH$:EtOH=1:5, pH~8.9; and 2:5, pH~9.6), the MTMS gradually hydrolysed and poly-condensed in a sol-gel system with varied nanoparticle sizes. Although super-water-repellent MTMS-coated PET surfaces were not achieved in these two cases, the trend towards hierarchical MTMS coating structures and the resulting improved wetting properties were achieved with increasing solution pH. Generally, adding more ammonium hydroxide to raise the pH of the final solution increased the MTMS condensation rate to form more and larger nanoparticles. Subsequently, a third ethanol-ammonium solution was prepared with the ratio of $NH_4OH$:EtOH=1:1 (pH~10.8) and the pristine PET fabrics were then immersed in the MTMS coating solutions with varied reaction times to obtain superhydrophobic surfaces. As shown in FIG. 23, initially hydrophilic PET fabrics were successfully converted to super-water-repellent after MTMS coating with reaction times between 90 and 180 min, with SCAs and ICAs of ~155° and ~150°, respectively. The MTMS-coated PET fabrics exhibited the same bright white appearance and softness as the pristine PET with MTMS loadings ~5 wt % (Table 10). Upon impact on the MTMS-coated PET surface, water drops could rebound from the PET surface and easily roll off without any water residual when applied at tilt angles of ~30°.

Figure 24A:
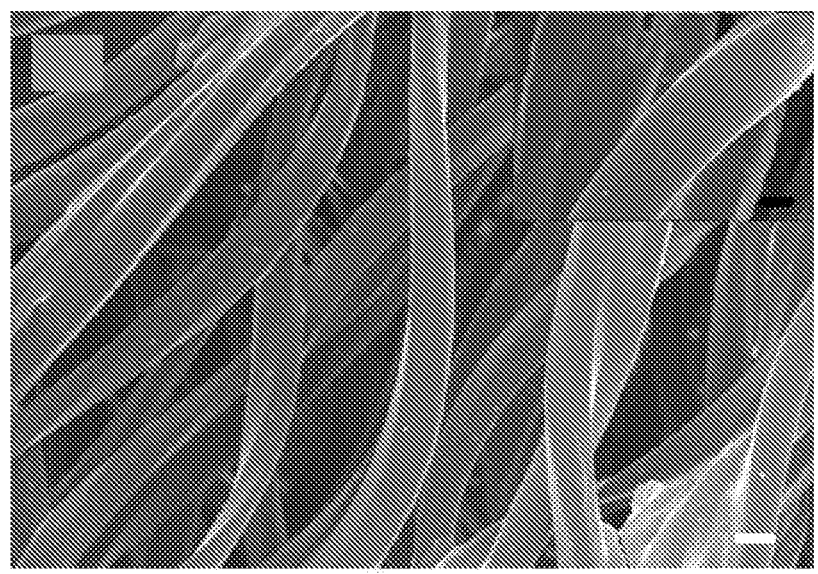
FIG. 24A-24D show SEM images of $NH_4OH$-catalyzed MTMS coated PET fabrics at varied reaction times (MTMS:$NH_4OH$:EtOH=1:25:25): (24A) 30 min, (24B) 120 min, (24C) 180 min, and (24D) 240 min. The white scale bar=10 μm. The insert images are the high magnification with the black scale bar=4 μm.
Figure 24B:
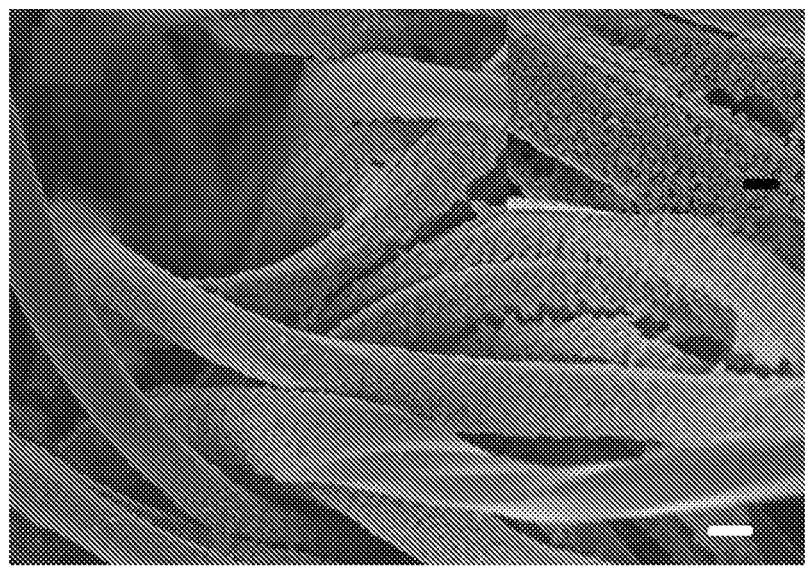
Figure 24C:
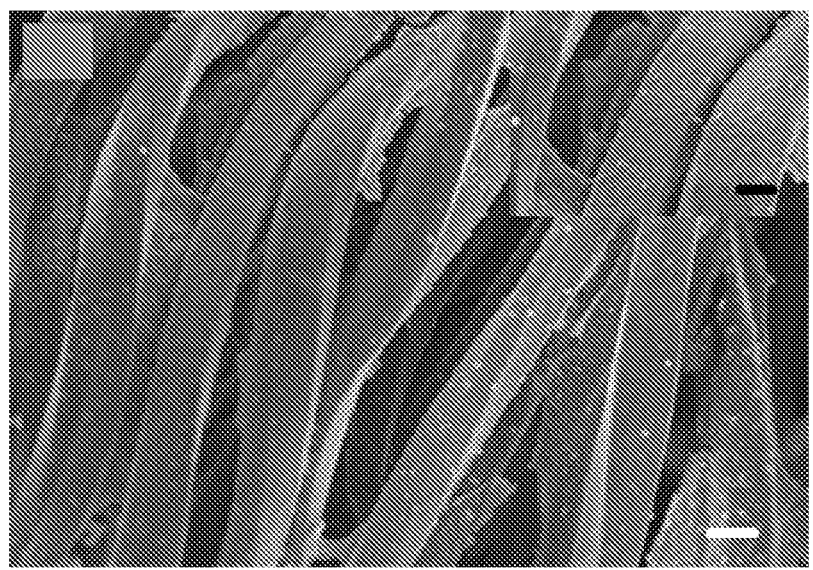
Figure 24D:
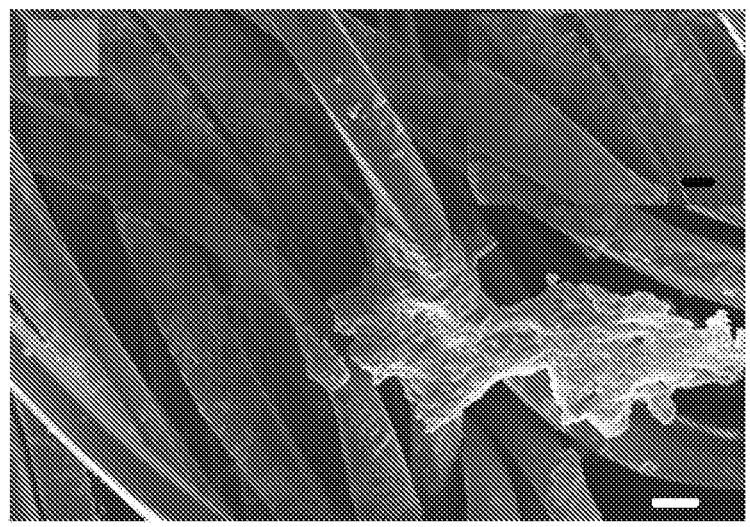

The surface morphologies of MTMS-coated PET fabrics in ethanol-ammonium hydroxide solution ($NH_4OH$:EtOH=1:1) are shown in FIG. 24A-24D. At short reaction time (<1 h) of MTMS in the presence of the $NH_4OH$ catalyst, the MTMS coating on PET showed smooth thin film with very few nanoparticles (20-150 nm) (FIG. 24A). Similarly, their ICAs were relatively low)(130±4° and the roll-off angle of all the impact water drops were >85°. Water-repellent hierarchical MTMS coatings on PET surfaces were found with the MTMS solution reacting around 90-180 min, when the coated PET fiber surfaces displayed a hierarchical pore structure comprising dense nanoparticles (20-100 nm) and cross-linked MTMS-based porous structures (FIGS. 24B and 24C). These hierarchical pore-containing structures assisted surface resistance to water drop penetration into the PET fabric, especially under impact conditions indicating low adhesion. With even longer reaction times (>3 h), the coating solution exhibited partial gelation and the MTMS polymerization product formed large blocks on PET surfaces from a non-uniform dispersion, even though there is still an MTMS film coated on the fibers (FIG. 24D). The ICAs were evaluated at 135±3°, which is lower than the SCAs) (152±3° for this reaction time as well as those values evaluated at intermediate reaction times.

Figure 25A:
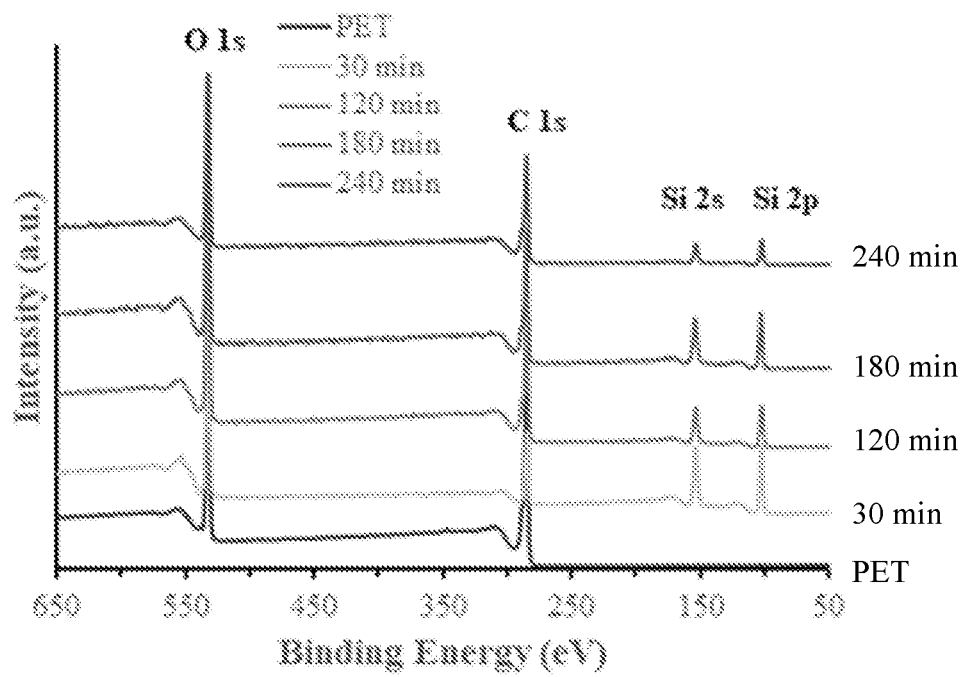
FIG. 25A-B show XPS survey (25A) and C 1s spectra (25B) of $NH_4OH$-catalyzed MTMS coated PET fabrics at varied reaction times (MTMS:$NH_4OH$:EtOH=1:25:25).
Figure 25B:
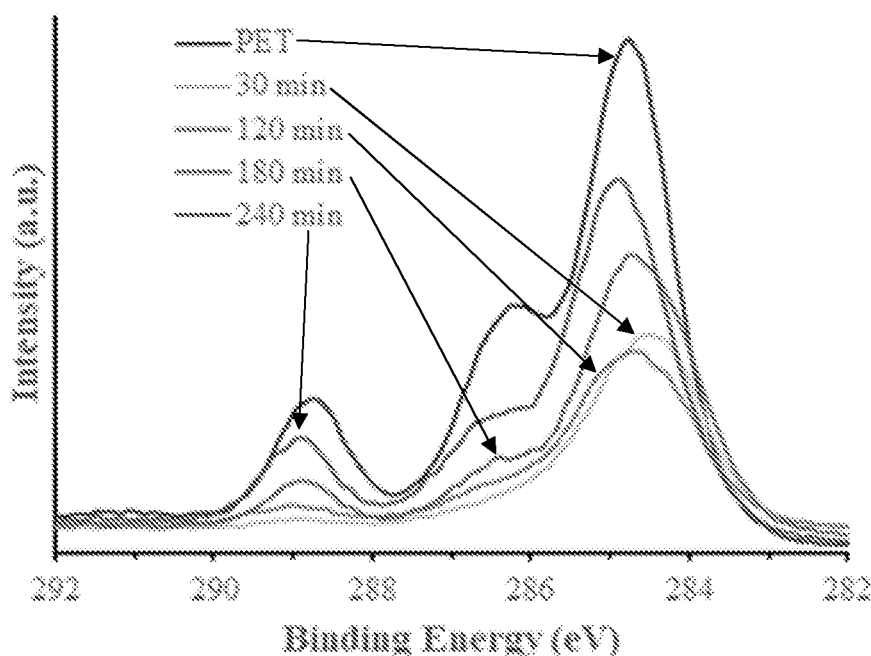

The chemical composition of the PET surfaces analyzed via XPS is shown in FIG. 25A-25B and atomic compositions are listed in Table 10. As expected, the surface of pristine PET fabric showed only C 1s and O 1s signals, while the surfaces of MTMS-coated PET were dominated by new signals associated to Si 2s (154.1 eV) and Si 2p (102.8 eV). This demonstrates that MTMS was successfully incorporated onto the surface of PET fibers. FIG. 25B shows C 1s high resolution-level spectra of pristine PET fibers with three main peak components of binding energies at 284.5, 286.3 and 288.8 eV, attributable to the C—H/C=C, C—O—C, and O—C=O, respectively. For PET fibers coated with MTMS reacting time <120 min, the C 1s peaks displayed only one main peak with binding energy at ~284.2 eV, which can be assigned to C—H bonds in coated MTMS. No obvious signals of PET-associated O—C=O of binding energies at 288.8 eV were observed. However, with increasing reaction time (>180 min), the MTMS coating on PET fibers became heterogeneous with a strong signal of O—C=O at ~288.8 eV binding energies. This is consistent with the morphologies shown in FIG. 24A-24D. Also, there was a slight decrease of Si atomic composition with longer reaction times, and the overall loading of each MTMS-coated PET fabrics was found at ~5 wt % (Table 10).

TABLE 10

The loading and XPS atomic composition of pristine PET and $NH_4OH$-catalyzed MTMS coated PET fabrics at varied reaction times (MTMS:$NH_4OH$:EtOH = 1:25:25).

| Sample | Loading (wt %)[a] | Atomic Composition/% | | |
|---|---|---|---|---|
| | | C | O | Si |
| PET | — | 76.11 | 23.89 | — |
| 30 min | 5.5 ± 0.6 | 31.01 | 41.10 | 27.89 |
| 120 min | 5.0 ± 0.5 | 34.34 | 40.09 | 25.55 |
| 180 min | 4.8 ± 0.5 | 40.85 | 38.36 | 20.79 |
| 240 min | 4.5 ± 0.4 | 55.94 | 33.26 | 10.80 |

[a]Loading = (weight of coated fabric − weight of pristine fabric)/weight of pristine fabric × 100%.

Correlation of Custom Impact Angle and Standard AATCC 22-2005 Spray Testing

The correlation between contact angle values acquired during custom impact conditions and ratings of standard AATCC 22-2005 spray testing appears in Table 11. For a hydrophilic surface (i.e. pristine PET), the spray test rating was 0, indicating full absorption of water. Hydrophobic surfaces with an ICA around 90-130° always showed wetting across the entire fabric surface after spray test, but not complete wet-out, and spray test ratings were 50. When the ICA increased to around 130-150° and ROA was higher than 30°, the fabric surface only displayed wetting at the spray points and partial wetting beyond the spray points, which is described by rating 70-80. The superhydrophobic surface of a textile fabric with 90-100 spray test rating required an ICA higher than 150° and ROA lower than 30°. These results indicated that the simple and quick ICA measurement correlates well with and can be used as substitute for the standard AATCC 22-2005 spray test. Furthermore, the ICA measurements are not only limited to water drops, but can easily be adopted to other testing liquids, such as oils, while the standard AATCC 22-2005 spray test can be only applied for water repellency measurement.

TABLE 11

The ICA, ROA and standard spray test rating of pristine PET and NH$_4$OH-catalyzed MTMS coated PET fabrics at varied reaction times (MTMS:NH$_4$OH:EtOH = 1:25:25).

| Samples | ICA (°) | ROA (°) | Rating |
| --- | --- | --- | --- |
| PET | 0 | — | 0 |
| 30 min | 125 ± 3 | >90 | 50 |
| 90 min | 154 ± 3 | 28 ± 3 | 100 |
| 120 min | 152 ± 3 | 30 ± 4 | 100 |
| 180 min | 146 ± 4 | 45 ± 4 | 70 |
| 240 min | 122 ± 3 | >90 | 50 |

Mechanism of MTMS Hydrolysis for Best Coating Performance

Figure 26A:
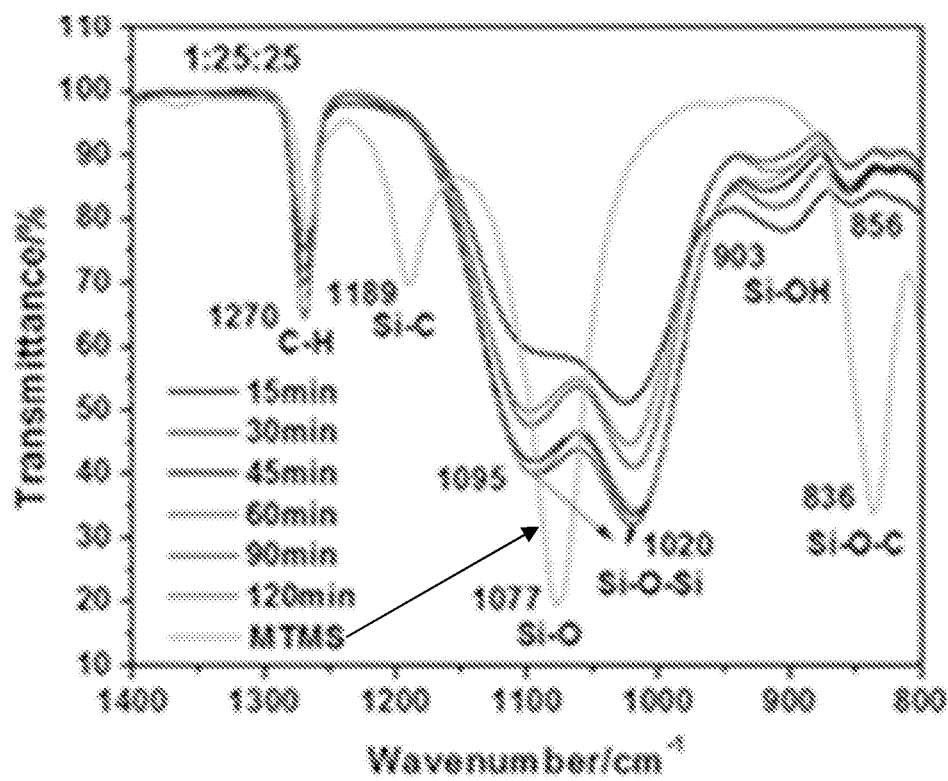
FIG. 26A-B show FTIR traces of dried 1:25:25 formulation at different reaction times and MTMS control plotted in the 1400-800 $cm^{-1}$ (26A) and 4000-3000 $cm^{-1}$ (26B) wavenumber ranges.
Figure 26B:
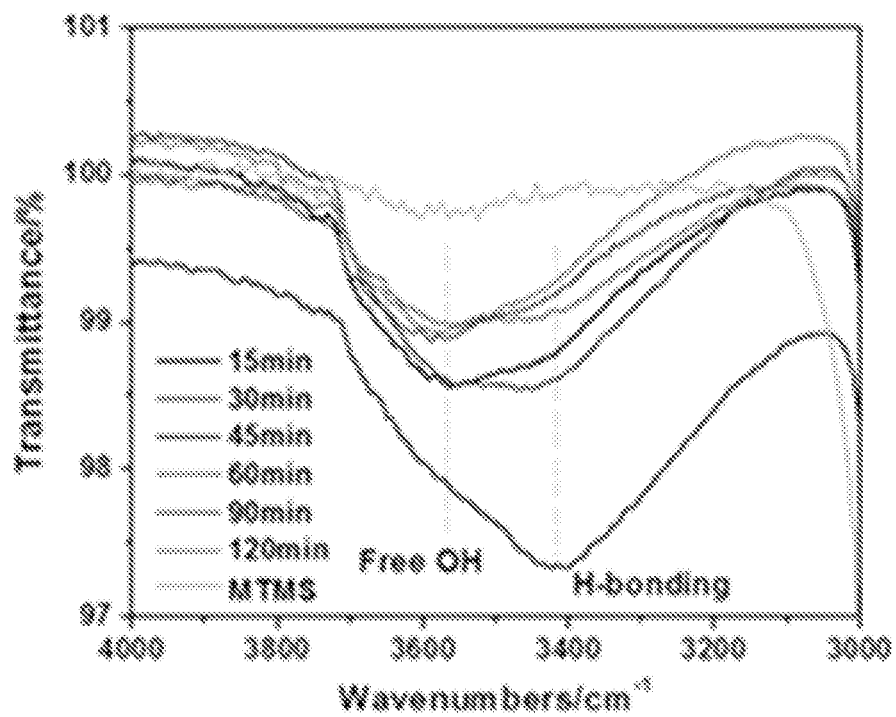
Figure 30:
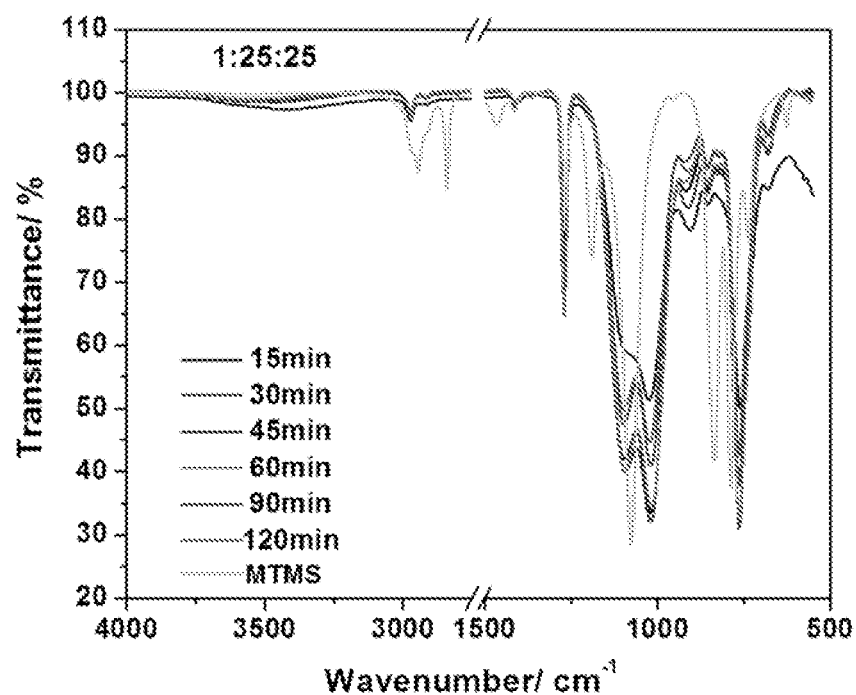
FIG. 30 shows FTIR traces of dried 1:25:25 formulation at different reaction times and MTMS control.

Fourier-transform infrared spectroscopy (FTIR) was used to decipher the mechanism behind the MTMS-based coating formation. FIGS. 26A-26B and FIG. 30 displayed the characteristic vibration signals associated with species resulting from hydrolysis and condensation of MTMS and identified in dry 1:25:25 formulation at different reaction times. As seen in FIG. 26A, the FTIR traces were marked by the presence of a broad absorption band split centered at 1095 cm$^{-1}$ and 1020 cm$^{-1}$ arising from asymmetric Si—O—Si vibration, typically assigned to insoluble silica derivatives. The asymmetric Si—OH vibration was detected at 903 cm$^{-1}$. The C—H vibration band was positioned at 1270 cm$^{-1}$, identical to pure MTMS. The MTMS characteristic Si—C (1189 cm$^{-1}$) and Si—O (1077 cm$^{-1}$) absorption peaks disappeared while Si—O—C (836 cm$^{-1}$) stretching band significantly decreased in intensity and shifted upfield to 856 cm$^{-1}$ in the 1:25:25 formulation. The presence of small traces of the latter signal in the condensation products suggested that the resulting silica species may have a few active sites that can further undergo condensation under favorable reaction condition (e.g., presence of NH$_4$OH catalyst).

The gelation tendency of the mixture, especially at very early and after long reaction times (15 min, 90 min, 120 min) and upon resting, may support this assumption. This behavior is not characteristic for silica produced from pure tetraethyl orthosilicate homologue. The absorption bands associated with free hydroxyl (OH) groups and H-bonding were apparent in the 4000-3000 cm$^{-1}$ range, as shown in FIG. 26B. At early reaction times (15 min) the stretching of OH in H-bonding was more pronounced (3600 cm$^{-1}$) than that of free OH (~3400 cm$^{-1}$) which became dominant at intermediate times (45 min). Between 60-120 min, the absorption band associated with H-bonding (3600 cm$^{-1}$) was the main spectral feature. These observations suggested that the reaction species have terminal silanol group (Si—OH) as a result of MTMS hydrolysis and condensation and, more importantly, are highly interactive. Drying effects are not ruled out and it is possible that they may accentuate these interactions.

Figure 27A:
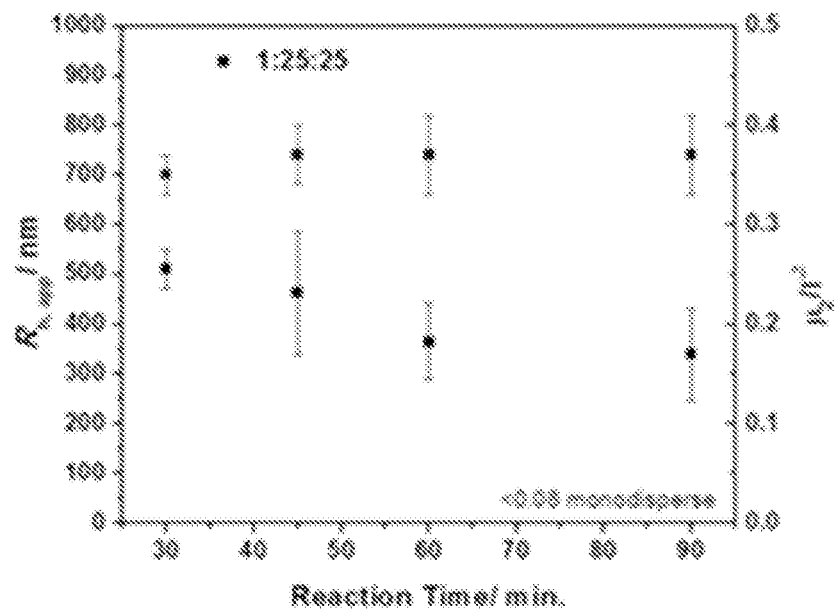
FIG. 27A-27C show the apparent hydrodynamic radius, Rh, app and polydispersity index, $\mu_2 \cdot T^{-2}$, as a function of reaction time (27A), SEM images of dried 1:25:25 formulation at 30 min (27B) and 120 min (27C).

Multi-angle dynamic light scattering (MADLS) was used to investigate the size and polydispersity of the reaction mixture species. Autocorrelation functions extracted from the scattering light intensity showed a bimodal (fast and slow decay) behavior and were fitted to a two-exponential function. FIG. 27A shows the apparent hydrodynamic radius, $R_{h,\,app}$ extrapolated to zero scattering vector magnitude, q, and plotted as a function of reaction time. These values were associated with the fast decay mode. The slow mode behavior of the correlation function did not obey accurately to the fitting, likely due to the low number of large particles/aggregates in the scattering volume that cause severe fluctuations in the scattered intensity and masks those arising from Brownian motion. Contrary to what was expected, the $R_{h,\,app}$ values decreased with increase in the reaction time. At the same time, the polydispersity index, taken as the ratio between the second-order cumulant and squared decay rate, $\mu_2 \cdot \Gamma^{-2}$, slightly increased from 0.35±0.02 (30 min) to 0.37±0.04 (45 min) and plateau at the latter value over the remaining reaction time range.

Figure 27B:
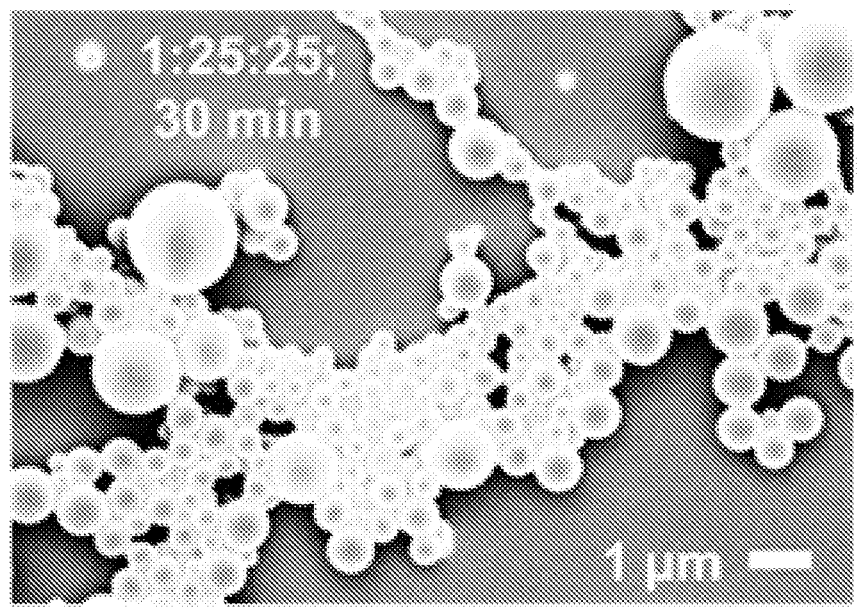
Figure 27C:
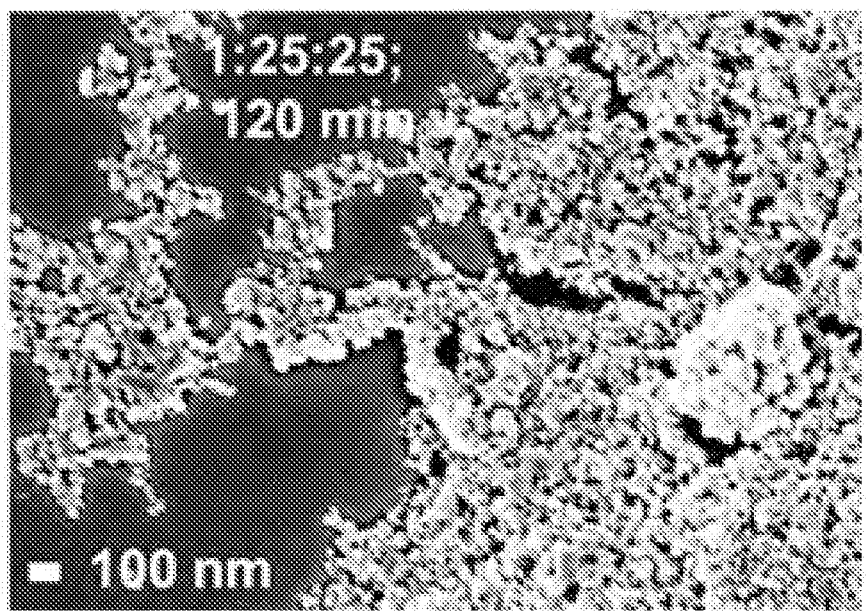

These values indicated that the system is highly polydisperse; a polydispersity index as high as 0.08 is typically assigned to nearly monodisperse scattering objects. The trends in size and size polydispersity were confirmed by SEM analysis. At 30 min (FIG. 27B), 1:25:25 dispersion consisted of clearly shaped spherical particles ranging from a few hundreds of nanometers to approximately three microns. Significantly smaller and lacking clear spherical shape particulates were visible at long reaction times (120 min, FIG. 27C). Large aggregates and coalesced particles were also identified. Very early stages of the reaction (<15 min) were difficult to analyze by MADLS due to gelation during measurements. At very late times, the correlation functions were strongly affected by the number of fluctuations, suggesting that either large scattering objects sediment fast or they coalesce into even larger structures. This observation resonates with the SEM images (FIG. 27C). The observed decrease in particle size is intriguing and it is opposite to that observed in acid-catalyzed MTMS mixtures. Early reports on silica particles formation pointed out that hydrolysis and condensation at basic pH yielded a variety of oligomeric species, both linear and cyclic, that initiate nucleation and growth of particles. Due to the steric hindrance imposed by its methyl inactive arm, MTMS may, initially, generate structures that are not highly cross-linked. This notion is supported by the soft appearance of particles (FIG. 27A) and the absorption band at 1095 cm$^{-1}$. The morphology of the resulting silica was similar to swollen gel systems that are able to deswell under an applied stimulus. In the case of MTMS-based mixture, the base catalyst trapped within the structure interstices combined with the interaction between different reaction species as well as local pH gradients may initiate further condensation of the active sites evidenced by FTIR (836 cm$^{-1}$, FIG. 26A), thus increasing the cross-linking density that concomitantly may induce shrinkage. Breakage of the soft structures is also possible due to vigorous stirring. This behavior was also observed in other gel-like systems.

Altogether the FTIR, MADLS and SEM data indicated that the base-catalyzed sol-gel process facilitates the evolution of MTMS into species that render a variety of sizes and morphologies. These species consume their active Si—OH sites by cross-linking and continuously generate differently sized homologues.

Stability and Durability of the Superhydrophobic MTMS Coating on PET Fabrics

The stability and durability of superhydrophobicity of MTMS coated PET fabrics were evaluated through exposure to different abrasion and weathering conditions. MTMS had been employed to functionalize other hydroxyl-group-rich surfaces, forming strong covalent bonds. It was expected that such covalent bonds formed between PET fibre and low-surface-energy MTMS could effectively enhance the stability and durability of fabric superhydrophobicity. Two simple abrasion tests were applied to the above superhydrophobic MTMS-coated PET fabric (MTMS:$NH_4OH$:EtOH=1:25:25, reaction time 120 min). The results are shown in Table 12. For tape peeling and sand falling tests, there were no obvious visible morphological changes on the fabric surface. The wetting behavior, including ICA, ROA and spray test rating, were the same as for the control sample (which is), indicating the stability of MTMS coatings to these abrasion tests. Furthermore, the durability of superhydrophobic MTMS coating was also examined by harsh accelerated weathering using a weatherometer. The MTMS coating was partially removed after this accelerated weathering test, which resulted in slightly decreasing ICA and lower spray test rating. However, the SCA still kept ~150°, suggesting the micro-structure of MTMS on PET fibers was still stable under this harsh test.

TABLE 12

The ICA, ROA and standard spray test rating of $NH_4OH$-catalyzed MTMS coated PET fabrics at 120 min reaction times (MTMS:$NH_4OH$:EtOH = 1:25:25) before and after mechanical tests.

| Samples | ICA (°) | ROA (°) | Spray Test Rating |
|---|---|---|---|
| 120 min | 152 ± 4 | 30 ± 2 | 100 |
| After tape peeling | 150 ± 3 | 33 ± 2 | 100 |
| After falling sand test | 150 ± 4 | 32 ± 2 | 100 |
| After accelerated weathering test | 130 ± 4 | >90 | 50 |

This Example demonstrates a facile and novel coating strategy to fabricate superhydrophobic PET fabrics with controllable hierarchical MTMS nanostructures through one-step dip-coating in water-based solution of fluoro-free hydrolyzed MTMS. The hydrophobicity of coated PET fabrics is tuned by the surface-coated silica morphologies, varying from thin film to hierarchical structures. The synergetic effect of the pH and MTMS reaction time on the consequent coating behaviors was systematically studied for optimizing the water repellent efficacy of PET fabrics. The results indicated the best coating performance of water-repellent PET fabrics could be obtained by achieving a balance between MTMS reaction rates for forming hierarchical coating structures. Indeed, this approach for generating superhydrophobicity with tunable hierarchical coatings may be extended to other organosilanes with one-functional group and multiple hydrolysable alkoxy substituents for a wide variety of other functions and applications (e.g., cross-linking and adhesion of sealants and adhesives). Finally, a new and simple method of impact contact angle (ICA) measurement was developed to quickly assess liquid droplet adhesion after impact on a surface; this method was shown to correlate well with the standard AATCC 22-2005 spray test and could very well be used as a simpler substitute.

Example 3. Further Development of the Coating Method

Additional reaction mixtures and conditions were tested as in Table 13.

TABLE 13

Coating mixtures and pH used in Example 3.

| Sample Name | Total Reagent Ratio@Volume/mL MTMS:$NH_4OH$:EtOH | Pre-dilution Reagent Ratio@Volume/mL MTMS:EtOH | Reaction pH |
|---|---|---|---|
| 1:4:22 | 1:4:22 @ 3.75:15:81 | 1:4 @ 3.75:15 | 9.0 |
| 1:7:22 | 1:7:22 @ 3.75:26.25:81 | 1:4 @ 3.75:15 | 10.5 |
| 1:10:22 | 1:10:22 @ 3.75:37.5:81 | 1:4 @ 3.75:15 | 11.5 |
| 1:5:25 | 1:5:25 @ 2.4:12:60 | — | 10.0 |
| 1:25:25 | 1:25:25 @ 2:50:50 | — | 11.0 |
| 1:30:25 | 1:30:25 @ 2.4:72:60 | — | 12.0 |

Static and impact contact angles were measured before (SCA and ICA) and after peeling (PSCA, PICA). ICA and PICA measure liquid adherence to the fabric surface, while SCA and PSCA measure mechanical robustness of the coating. When using polyester fabrics, close SCA-ICA values mean the liquid will "roll off", while close PSCA-SCA values mean the modified fabric resists applied mechanical stress.

It was found that contact angle values did not depend on r-s time nor on reagent ratio. Further, the non-wettability behavior of coated PET fabrics was near the broadly used lower limit for superhydrophobicity (>150°), Table 14.

TABLE 14

SCA and ICA values for PET fabrics coated with 1:4:22 and 1:25:25 mixtures.

| | 1:4:22 | | 1:25:25 | |
|---|---|---|---|---|
| R-S/min | SCA/degrees | ICA/degrees | SCA/degrees | ICA/degrees |
| 30-10 | 133.6 ± 2.0 | 95.0 ± 10.0 | 130.3 ± 5.0 | 124.0 ± 1.0 |
| 30-30 | 134.0 ± 2.0 | 97.4 ± 5.0 | 132.0 ± 5.0 | 117.0 ± 5.0 |
| 60-5 | 135.0 ± 4.0 | 100.0 ± 9.5 | 123.5 ± 2.0 | 112.5 ± 5.5 |
| 60-15 | 131.0 ± 2.0 | 103.5 ± 10.0 | 130.0 ± 5.0 | 125.2 ± 2.0 |
| 120-2 | 137.5 ± 3.0 | 101.0 ± 4.0 | 132.5 ± 6.0 | 122.0 ± 1.0 |

Figure 31A:
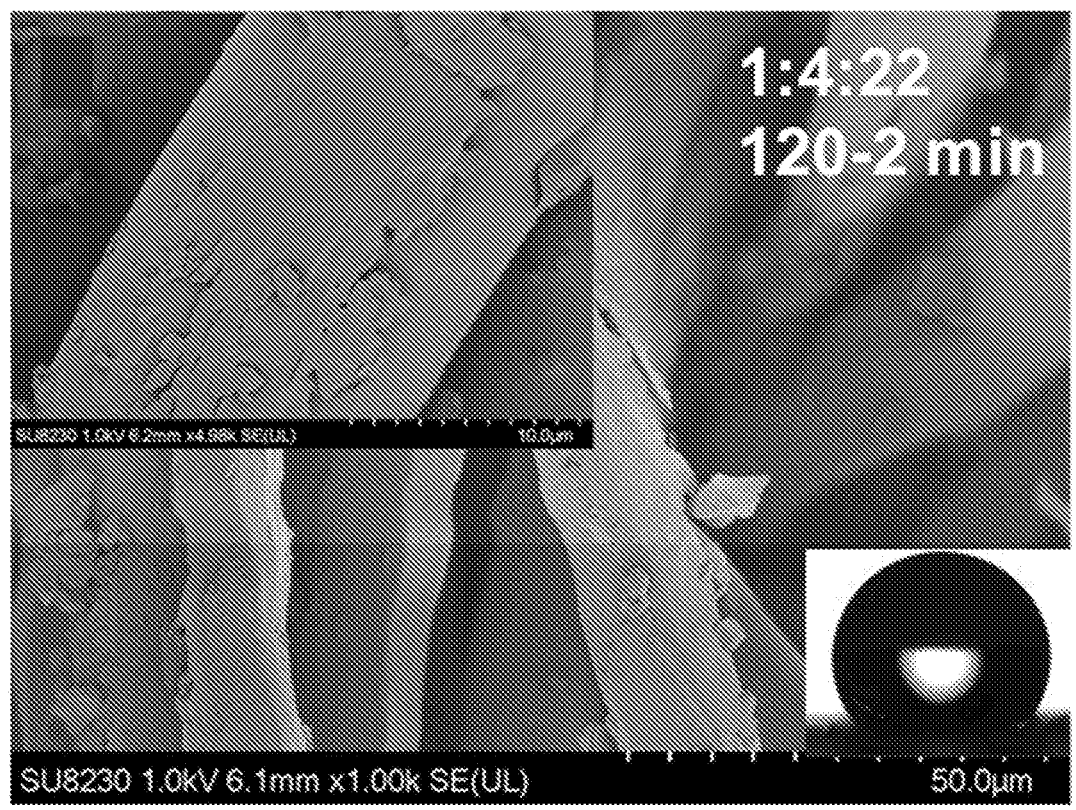
FIG. 31A-31B show SEM images of MTSM-coated PET fabrics, with MTMS:$NH_4OH$:EtOH of 1:4:22 (31A) and 1:25:25 (31B). Both coatings had a reaction time of 120 minutes and a soaking time of 2 minutes.
Figure 31B:
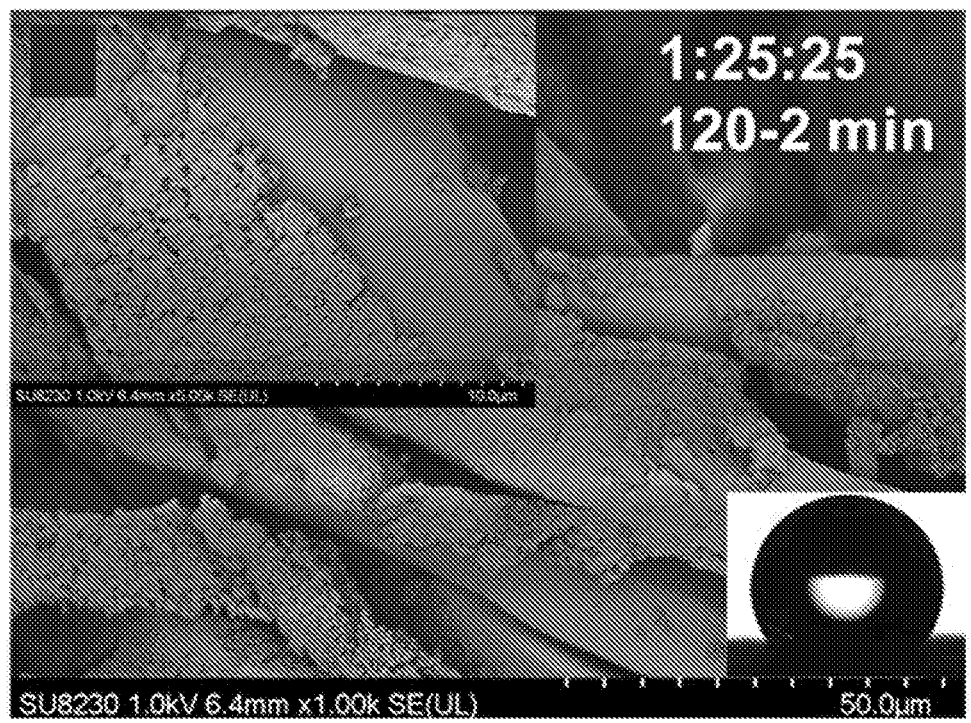

The morphology of the coating can be tuned from smooth to rough and porous just by predilution or no dilution of MTMS prior to reagent mixing (FIG. 31A-31B).

Figure 32A:
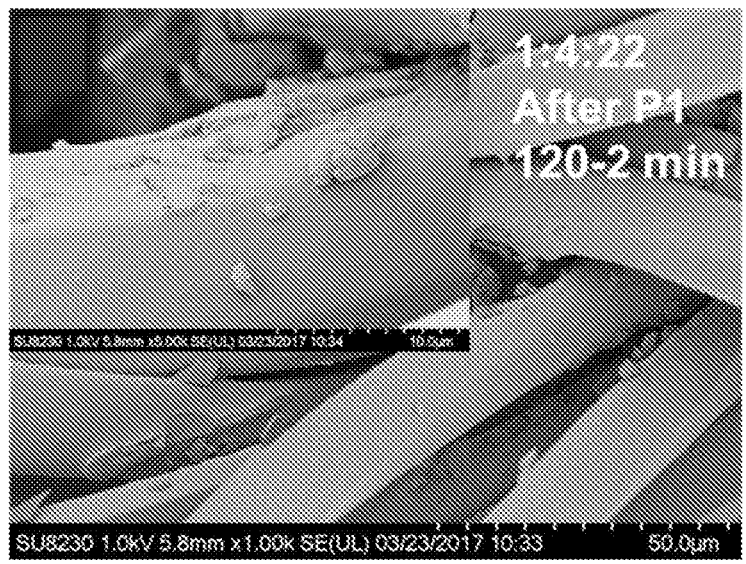
FIG. 32A-32B show SEM images of MTSM-coated PET fabrics after peeling, with MTMS:$NH_4OH$:EtOH of 1:4:22 (32A) and 1:25:25 (32B). Both coatings had a reaction time of 120 minutes and a soaking time of 2 minutes.
Figure 32A:
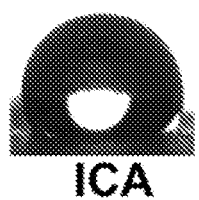
Figure 32A:
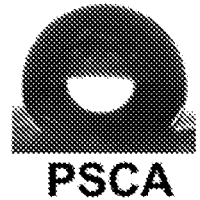
Figure 32A:
Figure 32B:
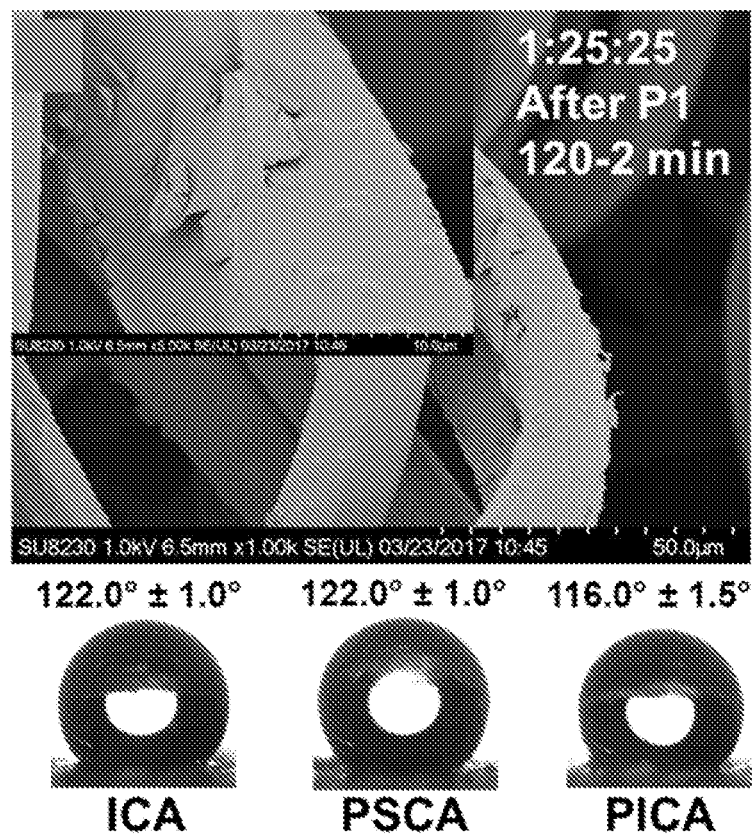

'Shedding' by peeling did not influence the hydrophobic character due to strong bonding of the coating to the fiber surface. Instead, the MTMS-coated fabric preserved its highly water-repellent behavior after peeling and impact conditions (FIG. 32A-32B and Table 15). Peeling seems to remove some coating 'debris' (FIG. 32A-32B).

TABLE 15

SCA and ICA values for PET fabrics coated with 1:4:22 and 1:25:25 mixtures, after peeling.

| | 1:4:22 | | 1:25:25 | |
|---|---|---|---|---|
| R-S/min | PSCA/degrees | PICA/degrees | PSCA/degrees | PICA/degrees |
| 30-10 | 125.0 ± 9.0 | 97.5 ± 12.0 | 124.3 ± 1.0 | 103.7 ± 1.0 |
| 30-30 | 119.0 ± 6.0 | 99.0 ± 2.5 | 117.0 ± 4.5 | 107.0 ± 2.0 |
| 60-5 | 123.7 ± 2.5 | 94.5 ± 6.5 | 112.5 ± 5.5 | 111.0 ± 1.0 |

TABLE 15-continued

SCA and ICA values for PET fabrics coated with
1:4:22 and 1:25:25 mixtures, after peeling.

| | 1:4:22 | | 1:25:25 | |
|---|---|---|---|---|
| R-S/ min | PSCA/ degrees | PICA/ degrees | PSCA/ degrees | PICA/ degrees |
| 60-15 | 127.0 ± 9.5 | 116.0 ± 5.0 | 125.5 ± 2.0 | 122.5 ± 3.5 |
| 120-2 | 119.0 ± 6.5 | 97.4 ± 4.5 | 122.0 ± 1.0 | 116.0 ± 1.5 |

Figure 33:
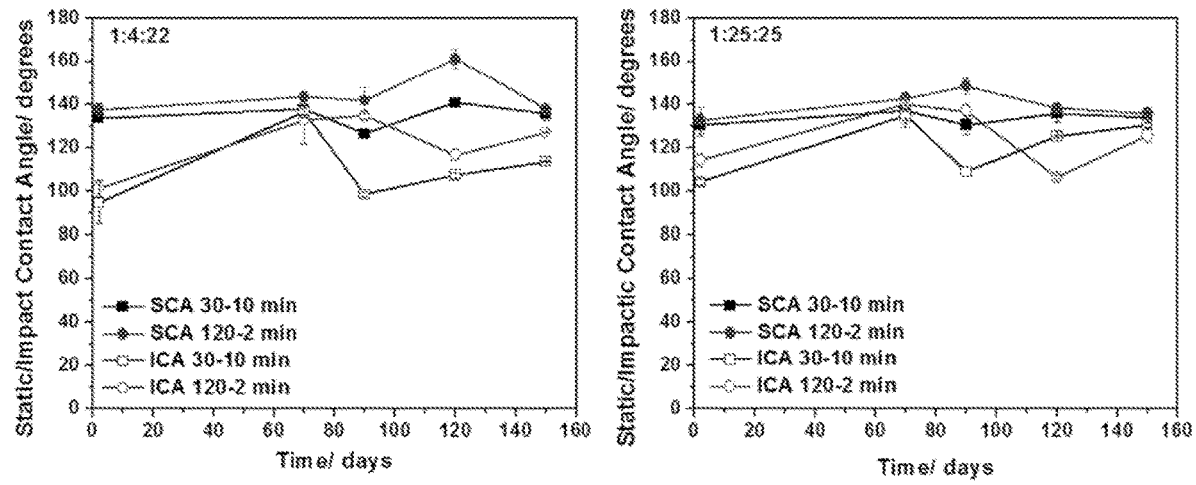
FIG. 33 shows water-repellent behavior of MTSM-coated PET fabrics over time, with MTMS:$NH_4OH$:EtOH of 1:4:22 (left panel) and 1:25:25 (right panel). Both coatings had a reaction time of 120 minutes and a soaking time of 2 minutes.
Figure 34A:
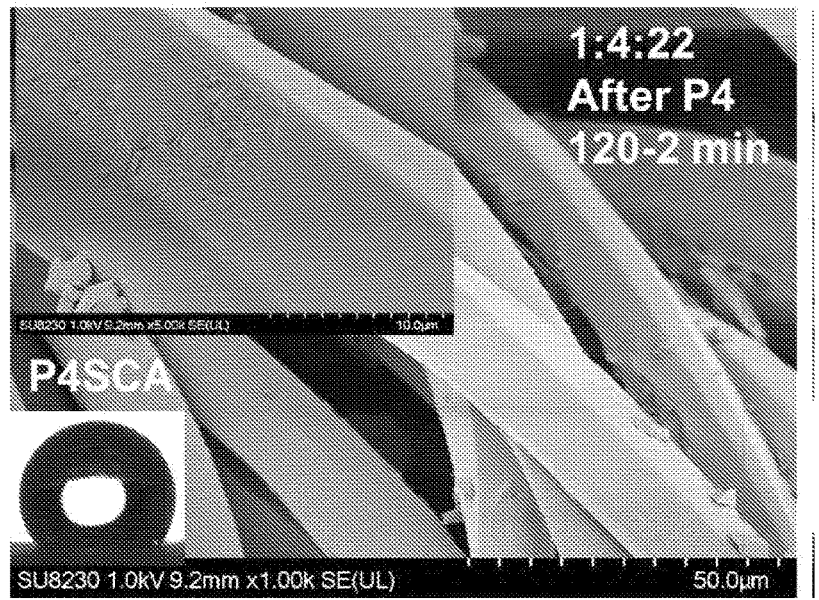
FIG. 34A-34B show SEM images of MTSM-coated PET fabrics after sequential aging and peeling tests, with MTMS:$NH_4OH$:EtOH of 1:4:22 (34A) and 1:25:25 (34B). Both coatings had a reaction time of 120 minutes and a soaking time of 2 minutes.
Figure 34B:
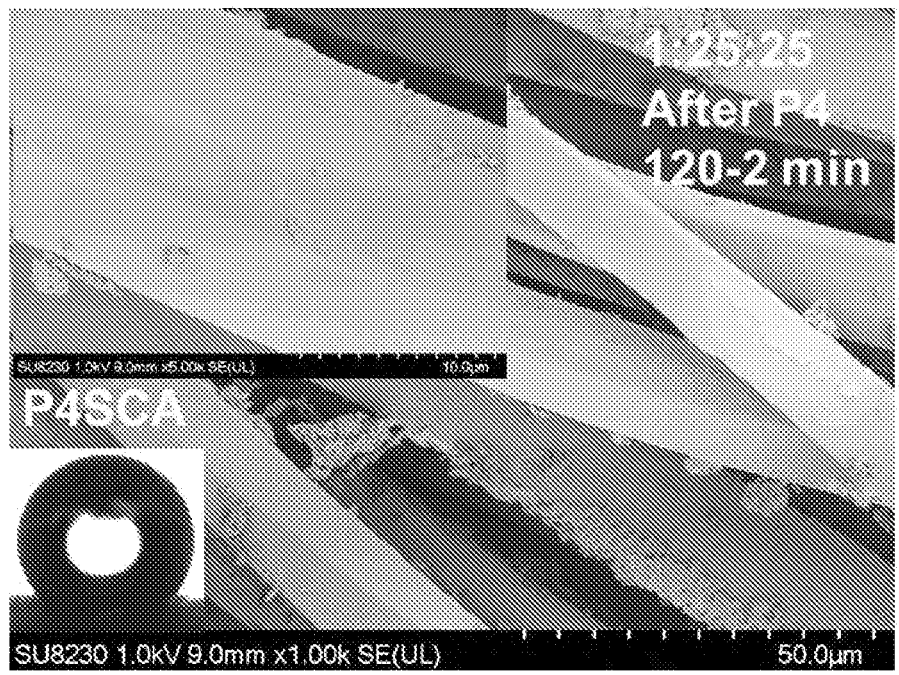

Sequential aging and peeling revealed the ability of the coatings to continuously rejuvenate their water repellency. The water-repellent behavior was not influenced by the ambient conditions over a long period of time (FIGS. 33 and 34A-34B).

XPS investigations demonstrated that a significant amount of coating (45%) is still present at the fiber surface after 'shedding' (FIG. 5A, 5C, 5E, Table 16). XPS confirmed several coating properties: (1) high adhesion to substrate, (2) mechanical robustness, and (3) durability.

TABLE 16

XPS values for PET fabrics coated
with 1:4:22 and 1:25:25 mixtures.

| Sample | C | O | Si | Peak Height C:O ratio | Area Peak C:O Ratio |
|---|---|---|---|---|---|
| Plain PET | 75.9 | 24.0 | — | 1.10 | 3.16 |
| PET no peeling | 52.4 | 33.2 | 14.3 | 0.59 | 1.57 |
| PET after P4 | 62.5 | 29.1 | 8.3 | 0.79 | 2.14 |

After custom laundry and prolonged heat exposure fabrics still displayed excellent water repellent behavior. Contrary to expectation, samples sequentially peeled and aged showed improved surface resistance to liquid adhesion (smaller SCA-ICA and P4SCA-P4ICA difference, Table 17).

TABLE 17

SCA and ICA values for PET fabrics coated with 1:4:22
and 1:25:25 mixtures, after peeling and aging.

| | 1:4:22, 120-2 min | | | 1:25:25, 120-2 min | | |
|---|---|---|---|---|---|---|
| Angle/ degrees | After P4 | Cold Water (18° C.) | Warm water (44° C.) | After P4 | Cold Water (18° C.) | Warm Water (44° C.) |
| SCA | 138 ± 4 | 136 ± 3 | 134 ± 2 | 136 ± 3 | 142 ± 5 | 133 ± 3 |
| ICA | 127 ± 1 | 127 ± 2 | 122 ± 2 | 126 ± 3 | 131 ± 3 | 122 ± 2 |
| P4SCA | 141 ± 3 | 133 ± 2 | 136 ± 2 | 137 ± 3 | 143 ± 5 | 138 ± 3 |
| P4ICA | 115 ± 1 | 125 ± 3 | 125 ± 1 | 119 ± 7 | 132 ± 4 | 129 ± 2 |

Cold water: 18° C., 1 h, Warm water: 44° C., 0.6% w/w, 1 h, rinse cold water 18° C., 10 min Prolonged exposure to heat seemed to improve water repellency (Table 18). This test is relevant for ground transportation of coated fabrics.

TABLE 18

SCA and ICA values for PET fabrics coated with
1:4:22 and 1:25:25 mixtures, after heating.

| | 1:4:22, 120-2 min | | 1:25:25, 120-2 min | |
|---|---|---|---|---|
| | 3 h | 1 week | 3 h | 1 week |
| SCA | 140.0 ± 4.0 | 132.5 ± 2.0 | 134.0 ± 2.5 | 140.0 ± 4.0 |
| ICA | 129.0 ± 2.0 | 123.0 ± 3.0 | 125.5 ± 4.0 | 118.0 ± 2.0 |

TABLE 18-continued

SCA and ICA values for PET fabrics coated with
1:4:22 and 1:25:25 mixtures, after heating.

| | 1:4:22, 120-2 min | | 1:25:25, 120-2 min | |
|---|---|---|---|---|
| | 3 h | 1 week | 3 h | 1 week |
| P4SCA | 139.0 ± 1.5 | 134.0 ± 1.0 | 133.5 ± 4.0 | 136.0 ± 1.0 |
| P4ICA | 130.5 ± 3.0 | 126.5 ± 2.0 | 106.0 ± 7.0 | 126.5 ± 2.5 |

Figure 35A:
FIG. 35A-35B show SEM images of MTSM-coated PET fabrics after abrasion tests, with MTMS:$NH_4OH$:EtOH of 1:4:22 (35A) and 1:25:25 (35B). Both coatings had a reaction time of 120 minutes and a soaking time of 2 minutes.
Figure 35B:

Standard abrasion materials modified the morphology of the coating layers, leading to enhanced water-repellent behaviour (FIG. 35A-35B, Table 19). SCA values suggested that modified polyester fibers became superhydrophobic. Fibers were still covered in MTMS-based coat and were not severely denatured after abrasion (FIG. 35A-35B).

TABLE 19

SCA and ICA values for PET fabrics coated with
1:4:22 and 1:25:25 mixtures, after abrasion.

| | 1:4:22 | | 1:25:25 | |
|---|---|---|---|---|
| R-S/min | SCA/degrees | ICA/degrees | SCA/degrees | ICA/degrees |
| 30-10 | 141.6 ± 4.0 | 120.0 ± 6.0 | 146.4 ± 6.5 | 117.4 ± 7.0 |
| 120-2 | 148.4 ± 8.0 | 148.0 ± 4.5 | 157.8 ± 2.0 | 150.4 ± 2.0 |

The data in this Example demonstrate that rejuvenation of water-repellent behavior was caused by reordering of MTMS-derived species at the molecular level coupled with changes in nano- and micro-scale morphology.

Example 4. Testing Different Parameters for Rinsing or Removing Excess Coating Mixture In this Example, different parameters for rinsing or removing excess coating mixture were tested. Specifically, water was tested as a possible rinsing medium.

Materials and Methods.

Preparation of coated PET fabric. 1:4:22 and 1:25:25 formulations were prepared as described in Examples 1-2 except that for the last step ethanol was replaced by water for rinsing purposes. Specifically, after the PET fabric was soaked 2 min in the reaction mixture it was transferred to a beaker filled with ~200 mL deionized (DI) water. The fabric was allowed to rest for another 2 min. The PET fabric was removed from the water, placed in a Petri dish and allowed to dry under ambient conditions.

For sequential coating, the same mixture described above was used to coat multiple fabric samples (up to 16 samples)

to test whether the coating preserves enough active inorganic silica or silane species to render a coated fabric sample water repellent.

Results.

Figure 36:
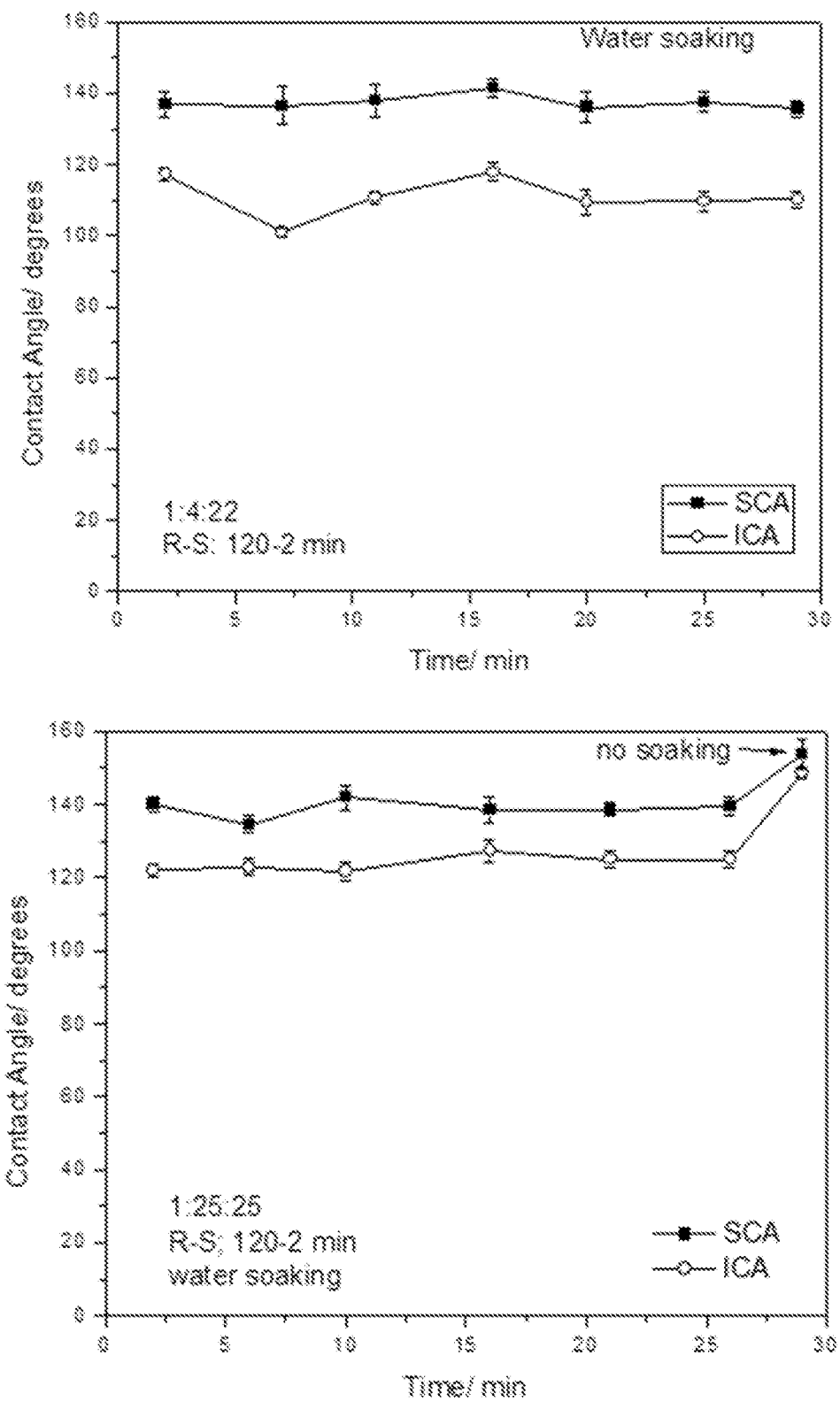
FIG. 36 shows static and impact contact angle values for 1:4:22 (top panel) and 1:25:25 (bottom panel) recorded for coated PET fabric rinsed with water instead of ethanol.
Figure 37:
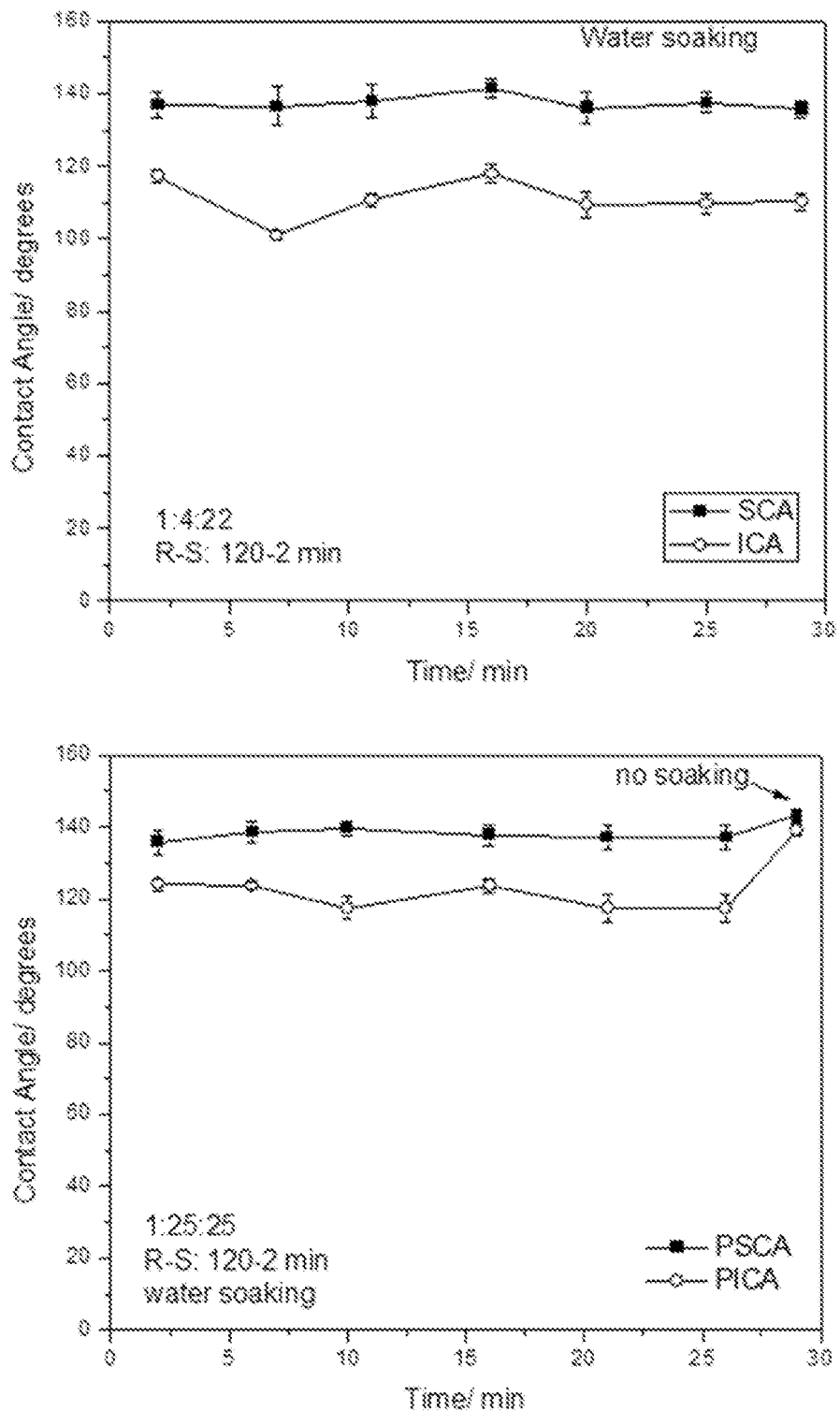
FIG. 37 shows static and impact contact angle values after tape peeling for 1:4:22 (top panel) and 1:25:25 (bottom panel) recorded for coated PET fabric rinsed with water instead of ethanol as a way to remove excess coating mixture.

Experiments in which ethanol was replaced by water in the rinsing step showed no changes in water repellent behaviour as measured by change in SCA and ICA values (FIG. 36). Abrading the surfaces using the peeling test (as described in Examples 1-2) also showed no changes in water repellent behaviour as measured by change in PSCA and PICA values (FIG. 37). These experiments were performed for 1:4:22 (top panels, FIGS. 36-37) and 1:25:25 formulations (bottom panels, FIGS. 36-37). In the bottom panel of FIGS. 36-37, the last point on the graph labeled 'no soaking' shows the contact angle values for a fabric that was not rinsed at all.

Figure 38:
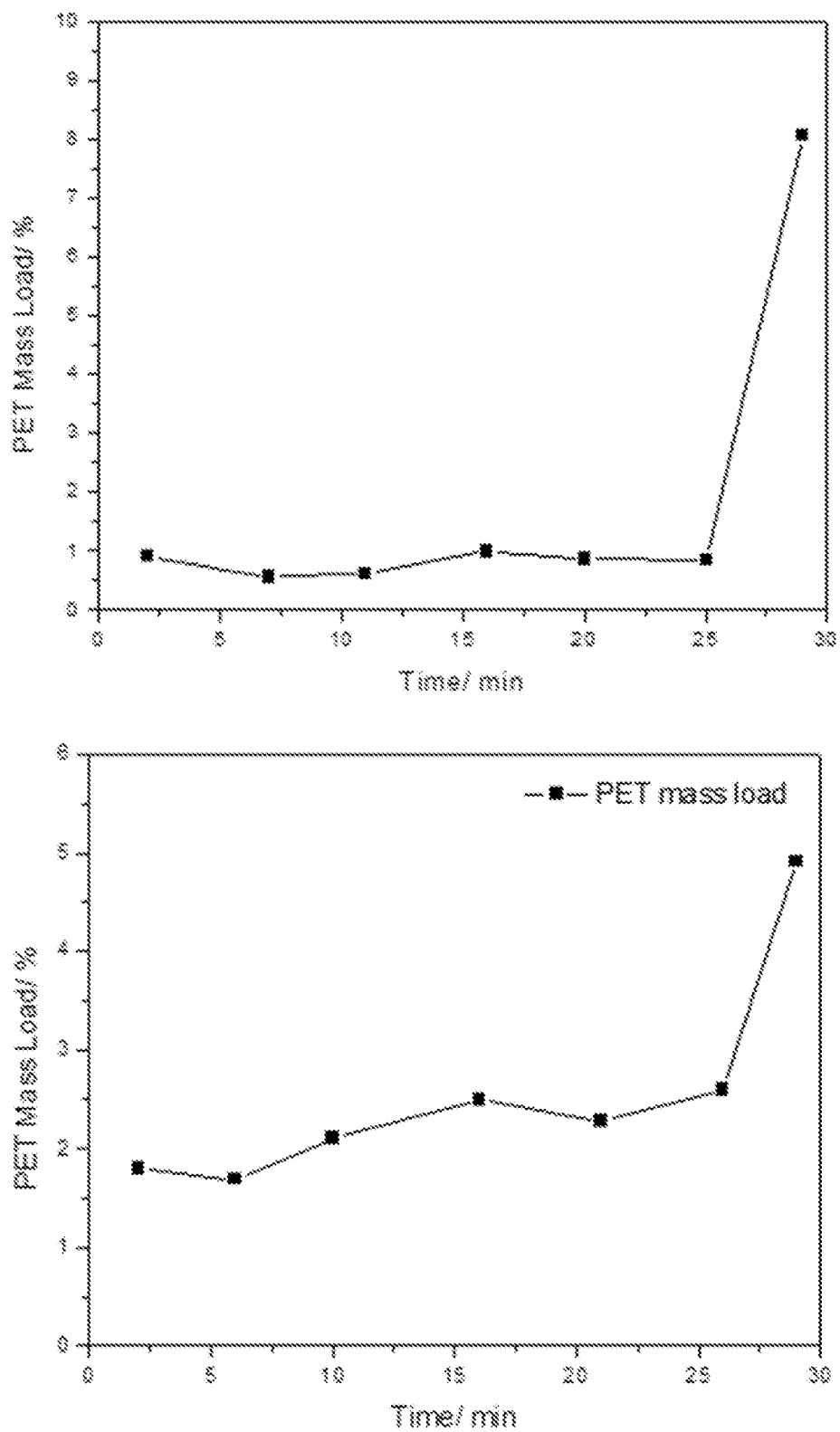
FIG. 38 shows coating mass load (percentages) for 1:4:22 (top panel) and 1:25:25 (bottom panel) formulations.

It was observed that although there was an insignificant difference seen in contact angle values, the coating mass loading was significantly higher which is not ideal (FIG. 38). The last data point in each panel of FIG. 38 represents the mass of coating for a fabric that was not rinsed (approximately 8 wt % for the 1:4:22 (top panel) and approximately 5 wt % for the 1:25:25 (bottom) formulations). For some applications, the ideal mass loading is ≤2 wt % in order to lower the likelihood that the fabric color might change, that the coating could transfer or detach from the substrate, and that the coating might crack and might allow water to penetrate through and alter water repellent behavior. Additionally, FIG. 38 shows that a single coating batch can be used for sequential coating of multiple PET fabrics without losing its active species that ultimately imparts water repellent behavior to PET fabrics.

Example 5. Determination of Coating Mixture Shelf Life

In this Example, the inventors determined the shelf (storage) stability of the coating mixture after combining the inorganic silica or silane, catalyst, and dispersion medium by testing the ability of the coating mixture to impart water repellent behavior to PET fabrics over a period of reaction at ambient conditions.

Materials and Methods.

Preparation of PET coated fabrics. 1:4:22 and 1:25:25 formulations were prepared as described in Examples 1-2, except that the coating mixtures were continuously stirred. Aliquots (25-50 mL) of the mixture were taken out at different times (days) and the fabric sampling was performed as described in Examples 1-2. For larger fabric sizes, the aliquot can be increased accordingly, e.g., for medium (5×5 in) and large (15×5 in) size fabrics the aliquot can be about 2 gallons.

Results.

Figure 39:
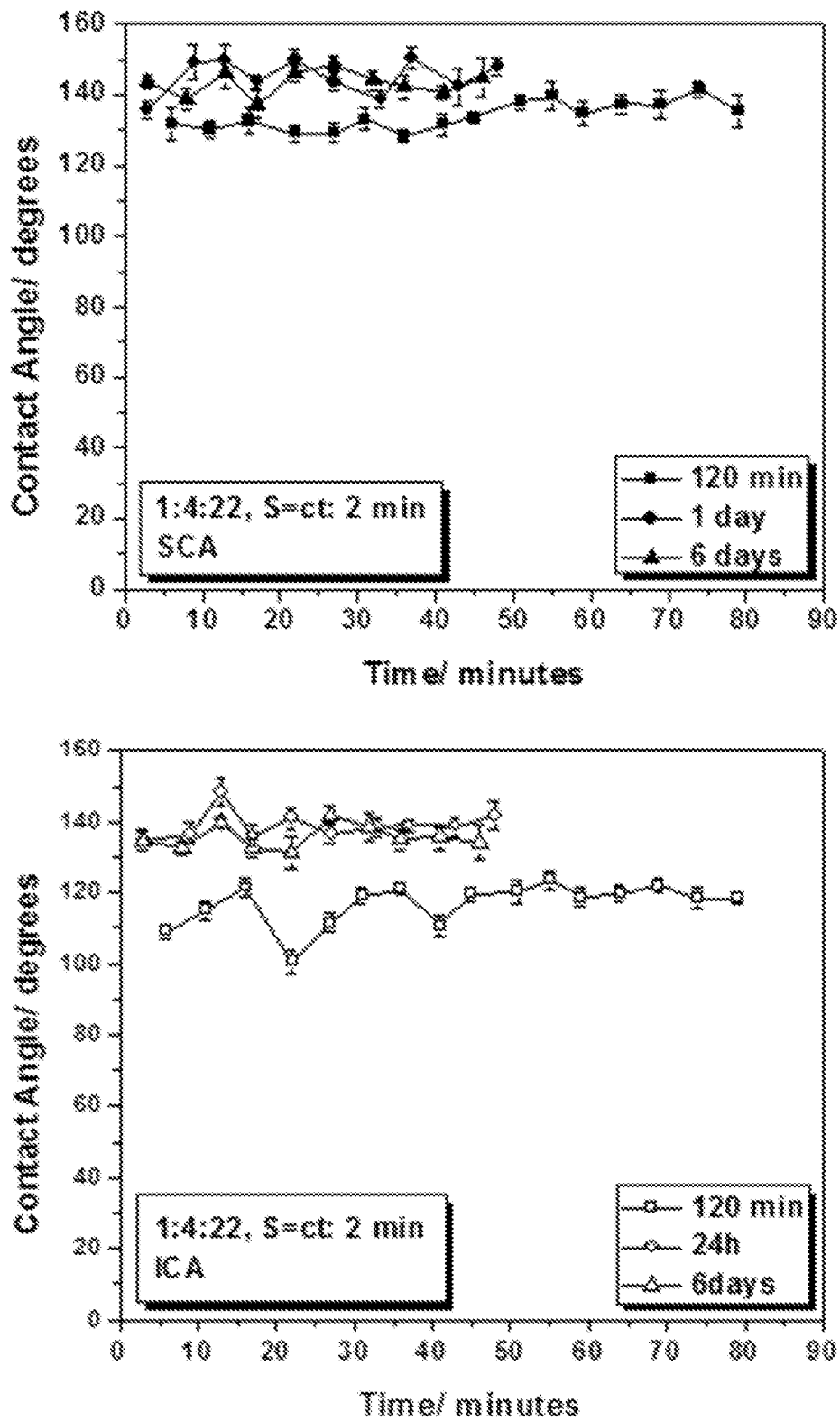
FIG. 39 shows static contact angle (top panel) and impact contact angle (bottom panel) values for sequential coating of PET fabric after 120 min (day 1), 24 h (day 2) and 6 days (day 6) (1:4:22 formulation). The fabrics were rinsed in ethanol as a way to remove excess coating mixture.
Figure 40:
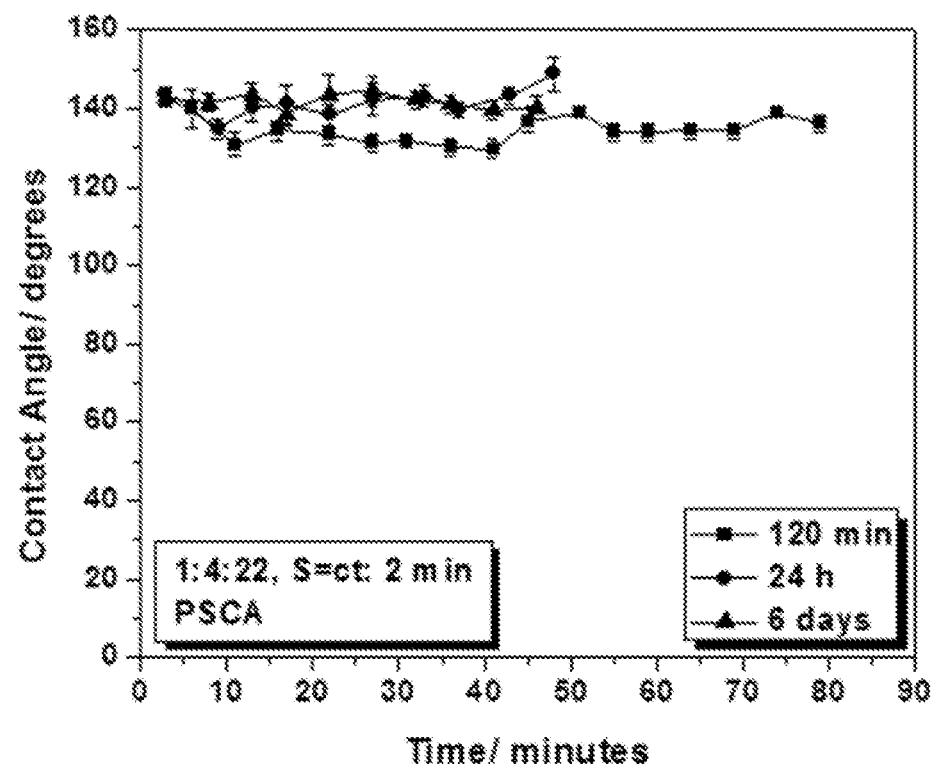
FIG. 40 shows static contact angle (top panel) and impact contact angle (bottom panel) values after tape peeling for sequential coating of PET fabric after 120 min (day 1), 24 h (day 2) and 6 days (day 6) (1:4:22 formulation). The fabrics were rinsed in ethanol as a way to remove excess coating mixture.
Figure 40:
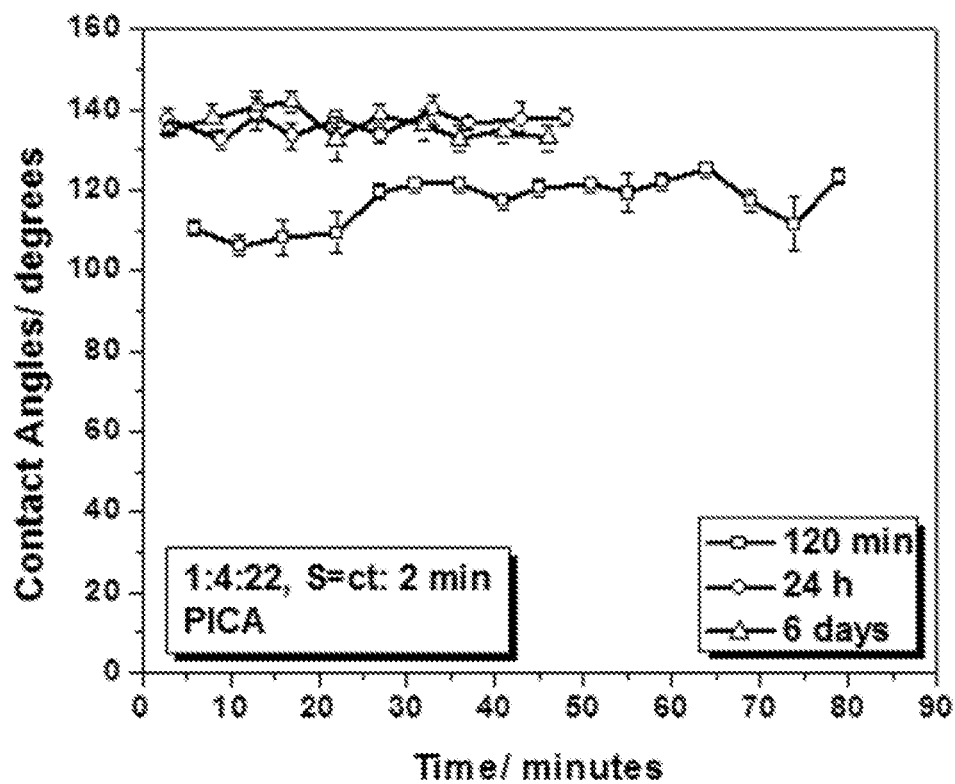
Figure 41:
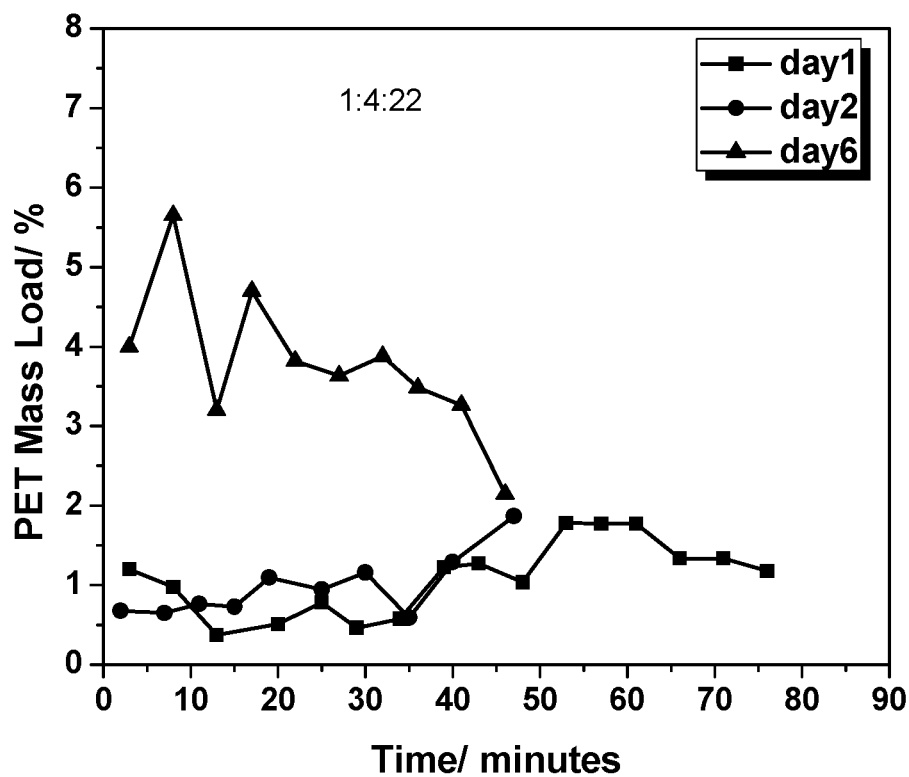
FIG. 41 shows coating mass load (percentage) recorded for the 1:4:22 formulation in the day 1, day 2 and day 6.
Figure 44:
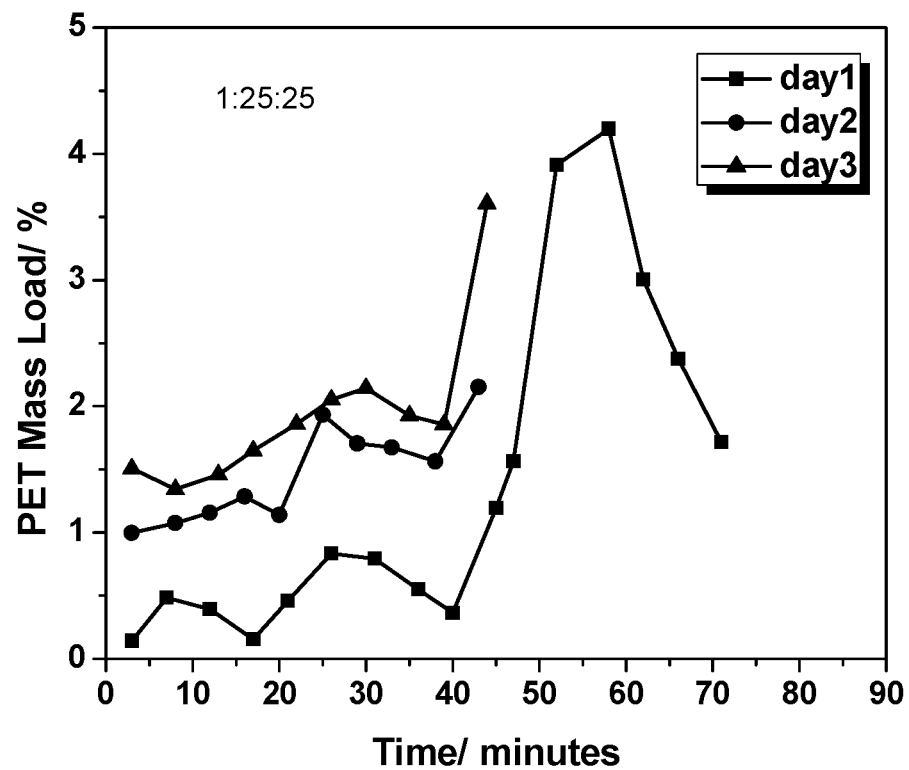
FIG. 44 shows coating mass load (percentage) recorded for the 1:25:25 formulation in the day 1, day 2 and day 3.
Figure 42:
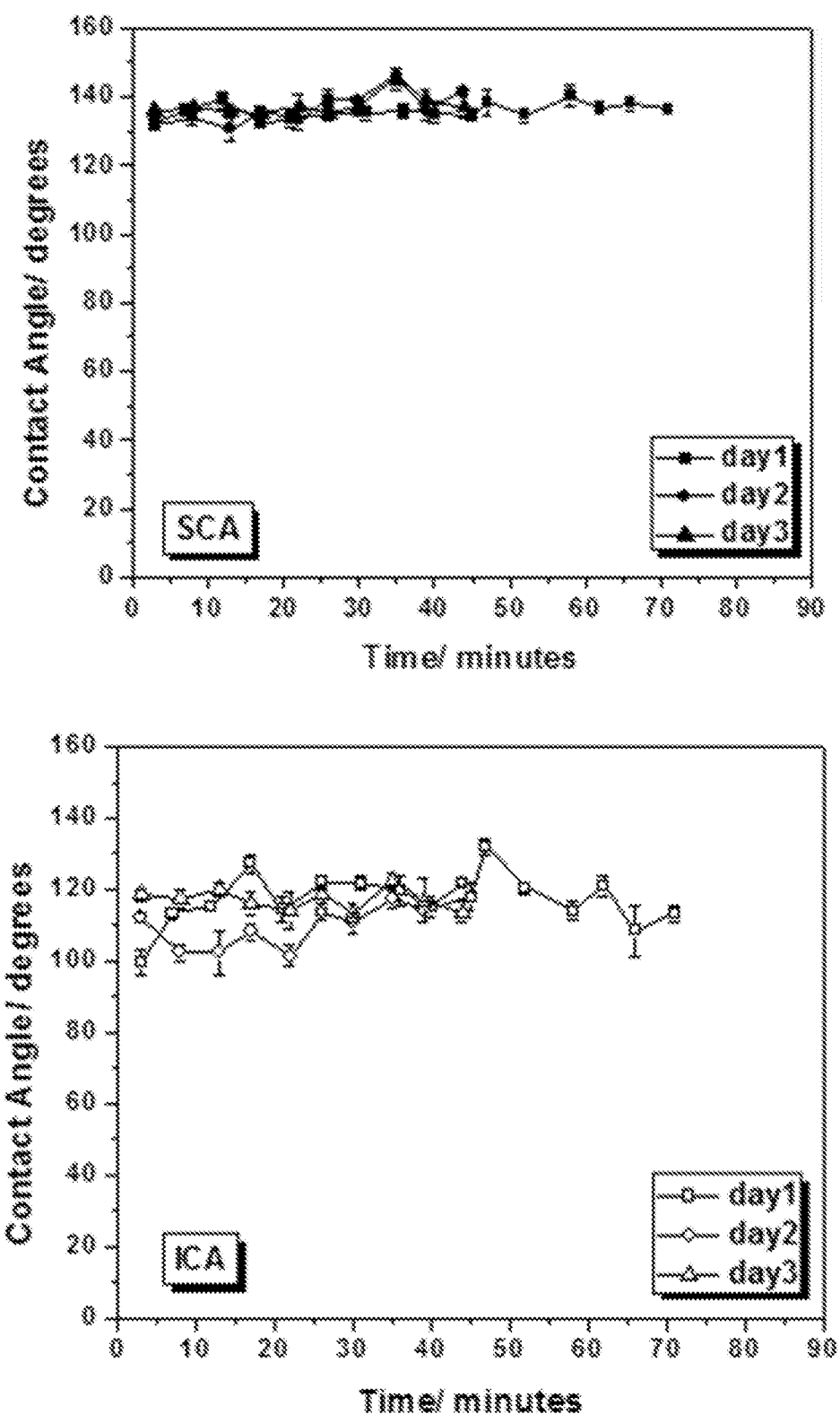
FIG. 42 shows static contact angle (top panel) and impact contact angle (bottom panel) values for sequential coating of PET fabric after 120 min (day 1), 24 h (day 2) and 3 days (day 3) (1:25:25 formulation). The fabrics were rinsed in ethanol as a way to remove excess coating mixture.
Figure 43:
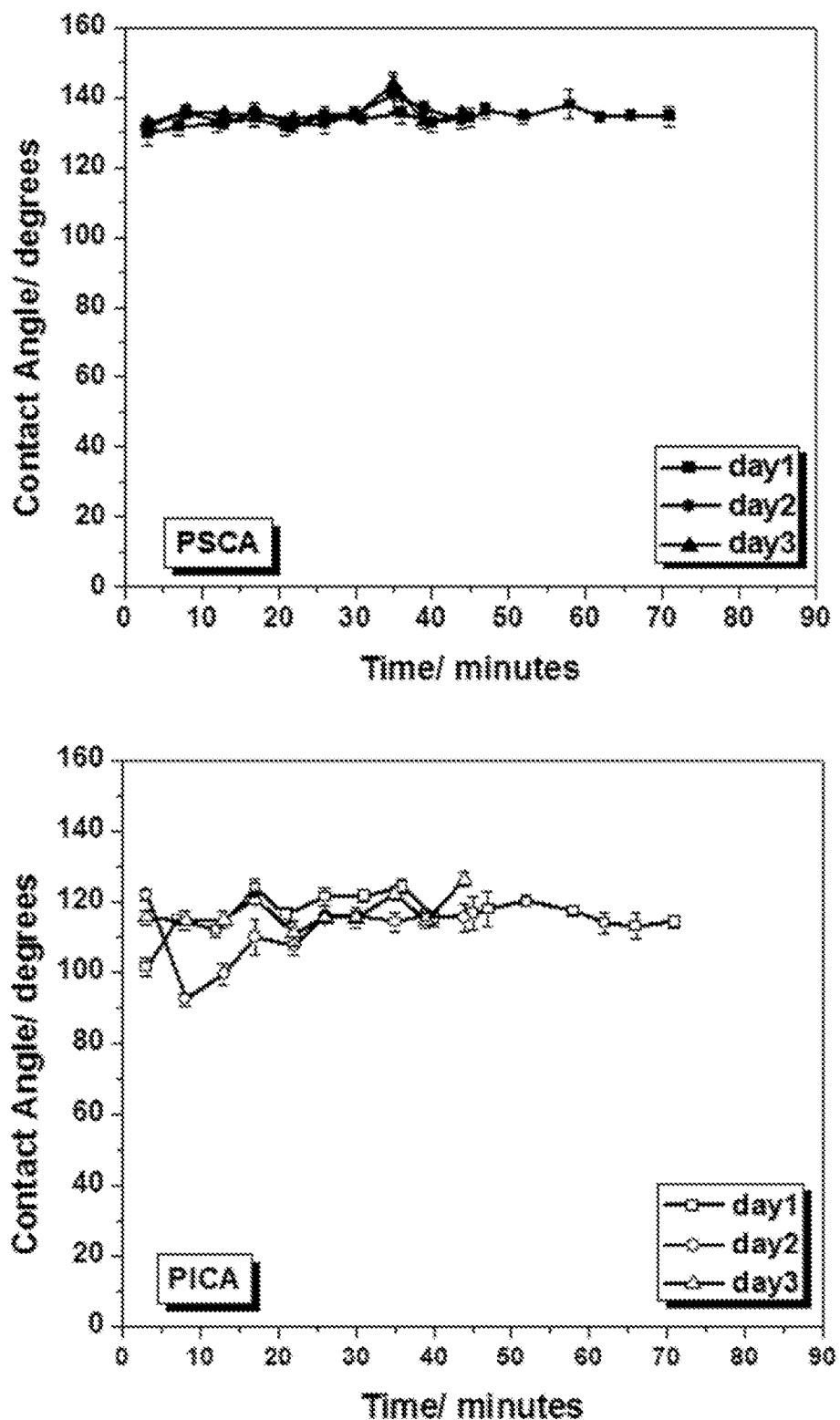
FIG. 43 shows static contact angle (top panel) and impact contact angle (bottom panel) values after tape peeling for sequential coating of PET fabric after 120 min (day 1), 24 h (day 2) and 3 days (day 3) (1:25:25 formulation). The fabrics were rinsed in ethanol as a way to remove excess coating mixture.

It was found that the coating mixture can react for much longer than the 240 min reaction time used in Example 2, with no effect on the ability of the coating mixture to impart water repellent behavior to the PET fabric. Longer reaction times may be desired for situations where the coating is not prepared at, or in a different location from, the location where the substrate undergoes the coating process (e.g., the coating is prepared at a different facility or location within the same facility than the one where the substrate is coated). Therefore, a transportation and/or storage time for the coating mixture is needed in such situations. Alternatively, the coating mixture may be used for many coating batches over a period of several days without changing or refreshing the coating mixture. FIGS. 39-40 showed that the same coating mixture could be used up to 6 days after the initial mixing for the 1:4:22 formulation, based on the observation that there was no change in SCA or ICA values (FIG. 39) or PSCA or PICA values (FIG. 40) over the 6-day period. FIG. 41 shows the coating mass loading of samples coated with the 1:4:22 coating over the 6-day period; the samples coated on day 6 had a higher coating mass loading than those coated on days 1 and 2. FIGS. 42-43 showed that the same coating mixture could be used up to 3 days after the initial mixing for the 1:25:25 formulation, based on the observation that there was no change in SCA or ICA values (FIG. 42) or PSCA or PICA values (FIG. 43) over the 3-day period. FIG. 44 shows the coating mass loading of samples coated with the 1:25:25 coating over the 3-day period; increasing the soaking time led to an increase in the coating mass loading for samples coated with the mixture on each of days 1, 2 and 3.

While several possible embodiments are disclosed above, embodiments of the present disclosure are not so limited. These exemplary embodiments are not intended to be exhaustive or to unnecessarily limit the scope of the disclosure, but instead were chosen and described in order to explain the principles of the present disclosure so that others skilled in the art may practice the disclosure. Indeed, various modifications of the disclosure in addition to those described herein will become apparent to those skilled in the art from the foregoing description. Such modifications are intended to fall within the scope of the appended claims.

All patents, applications, publications, test methods, literature, and other materials cited herein are hereby incorporated by reference in their entirety as if physically present in this specification.

What is claimed is:

1. A coating process comprising:
   mixing a non-fluorinated inorganic silica- or silane-based coating mixture comprising methyltrimethoxysilane (MTMS), an ammonium hydroxide catalyst, and an ethanol dispersion medium in a ratio of about 1:4:22 by volume for a reaction time of about 120 minutes;
   coating a polyester fabric substrate with the mixture by soaking the polyester fabric substrate in the mixture for a soaking time of about 2 minutes;
   drying the coated substrate at a temperature of from about 80° C. to about 100° C.;
   annealing or curing the dried substrate at a temperature of from about 100° C. to about 130° C. for up to 24 hours; and
   removing excess mixture from the coated substrate by dilution, by gravity, or by physical means;
   wherein the reaction time is sufficient to enable hydrolysis and condensation of the methyltrimethoxysilane (MTMS).

2. The process of claim 1, wherein the mixing comprises:
   mixing a first solution of a first portion of the ammonium hydroxide catalyst and a first portion of the ethanol dispersion medium; and
   mixing a second solution of the methyltrimethoxysilane (MTMS), a second portion of the ammonium hydroxide catalyst, and a second portion of the ethanol dispersion medium.

3. The process of claim 2, wherein the methyltrimethoxysilane (MTMS) and ethanol dispersion medium are mixed in the second solution in a ratio of about 1:4.

4. The process of claim 1, wherein removing excess mixture is by dilution comprising a rinsing step of at most about 5 minutes in an alcoholic or aqueous dilution medium.

5. The process of claim 1, wherein the mixture has a basic pH.

6. The process of claim 5, wherein the pH of the mixture ranges from about 8 to about 12.

7. The process of claim 5, wherein the catalyst is selected from the group consisting of a strong base having a pH of about 12 and a weak base having a pH of from about 8 to about 11.

8. The process of claim 1, wherein the coating of the coated substrate is stable from at least about 30 seconds to at most about 10 days (240 hours).

9. The process of claim 8, wherein removing excess mixture is by dilution comprising a rinsing step of at most about 5 minutes in an alcoholic or aqueous dilution medium.

10. The process of claim 1, wherein the ethanol dispersion medium is an anhydrous ethanol dispersion medium.

* * * * *